US010784949B2

(12) United States Patent
Agiwal et al.

(10) Patent No.: US 10,784,949 B2
(45) Date of Patent: *Sep. 22, 2020

(54) METHOD AND APPARATUS FOR MANAGING USER PLANE OPERATION IN WIRELESS COMMUNICATION SYSTEM

(71) Applicant: Samsung Electronics Co., Ltd., Suwon-si, Gyeonggi-do (KR)

(72) Inventors: Anil Agiwal, Suwon-si (KR); Mangesh Abhimanyu Ingale, Karnataka (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/588,820

(22) Filed: Sep. 30, 2019

(65) Prior Publication Data
US 2020/0028564 A1 Jan. 23, 2020

Related U.S. Application Data

(63) Continuation of application No. 15/673,287, filed on Aug. 9, 2017, now Pat. No. 10,432,291.

(30) Foreign Application Priority Data

Aug. 9, 2016 (IN) .............................. 201641027192
May 3, 2017 (IN) .............................. 201741015620
Aug. 8, 2017 (IN) .............................. 201641027192

(51) Int. Cl.
*H04W 4/00* (2018.01)
*H04B 7/06* (2006.01)
(Continued)

(52) U.S. Cl.
CPC ...... *H04B 7/0697* (2013.01); *H04M 3/42229* (2013.01); *H04M 3/537* (2013.01);
(Continued)

(58) Field of Classification Search
CPC .... H04M 3/54; H04M 3/42229; H04M 3/537; H04W 88/02; H04W 76/19;
(Continued)

(56) References Cited

U.S. PATENT DOCUMENTS 7,266,105 B2  9/2007  Wu
8,155,596 B2  4/2012  Eckert et al.
(Continued)

FOREIGN PATENT DOCUMENTS

EP    2869633 A1    5/2015
WO    2012060565 A2    5/2015

OTHER PUBLICATIONS

European Patent Office, "Supplementary European Search Report," Application No. EP17839816.0, dated Jul. 1, 2019, 6 pages.
(Continued)

*Primary Examiner* — Marceau Milord

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). Embodiments herein achieve a UE for managing a user plane operation in a wireless communication system. The UE includes a user plane management unit coupled to a memory and a processor. The user plane management unit is configured to receive a signaling message from a gNodeB. Further, the user plane management unit is configured to determine whether the signaling message includes control information comprising one of a PDCP re-establish indication and a security key change indication. Further, the user plane management unit is configured to perform the at least one operation for at least one data radio bearer based on the determination.

24 Claims, 28 Drawing Sheets

(51) Int. Cl.

| | |
|---|---|
| *H04W 76/19* | (2018.01) |
| *H04W 12/04* | (2009.01) |
| *H04W 80/02* | (2009.01) |
| *H04W 12/00* | (2009.01) |
| *H04M 3/42* | (2006.01) |
| *H04M 3/537* | (2006.01) |
| *H04W 24/02* | (2009.01) |
| *H04W 48/16* | (2009.01) |
| *H04W 88/02* | (2009.01) |
| *H04B 7/0408* | (2017.01) |
| *H04B 7/10* | (2017.01) |
| *H04M 3/54* | (2006.01) |

(52) U.S. Cl.
CPC ....... *H04W 12/0013* (2019.01); *H04W 12/04* (2013.01); *H04W 24/02* (2013.01); *H04W 48/16* (2013.01); *H04W 76/19* (2018.02); *H04W 80/02* (2013.01); *H04B 7/0408* (2013.01); *H04B 7/10* (2013.01); *H04M 3/54* (2013.01); *H04W 88/02* (2013.01)

(58) Field of Classification Search
CPC . H04W 12/0013; H04W 24/02; H04W 48/16; H04W 80/02; H04B 7/0697; H04B 7/0408; H04B 7/10
USPC .......................................... 370/328, 329, 331
See application file for complete search history.

(56) References Cited

U.S. PATENT DOCUMENTS

| | | | |
|---|---|---|---|
| 8,483,090 B2 | 7/2013 | Yi et al. | |
| 8,774,108 B2 | 7/2014 | Yi et al. | |
| 8,804,656 B2 | 8/2014 | Kitazoe | |
| 8,965,426 B2 | 2/2015 | Sambhwani et al. | |
| 8,977,279 B2 | 3/2015 | Kanamarlapudi et al. | |
| 9,007,974 B2 | 4/2015 | Ge et al. | |
| 9,036,578 B2 | 5/2015 | Cai et al. | |
| 9,930,720 B2 | 3/2018 | Jung et al. | |
| 9,954,789 B2 | 4/2018 | Basu Mallick et al. | |
| 10,075,881 B2 | 9/2018 | Yi et al. | |
| 10,432,291 B2* | 10/2019 | Agiwal | H04W 12/0013 |
| 2009/0149189 A1 | 6/2009 | Sammour et al. | |
| 2009/0175163 A1 | 7/2009 | Sammour et al. | |
| 2013/0135987 A1 | 5/2013 | Wang et al. | |
| 2014/0169238 A1* | 6/2014 | Cai | H04L 1/1887 370/280 |
| 2014/0169284 A1* | 6/2014 | Cai | H04L 1/18 370/329 |
| 2014/0171054 A1 | 6/2014 | Cai et al. | |
| 2014/0171091 A1* | 6/2014 | Cai | H04W 76/28 455/450 |
| 2016/0014647 A1 | 1/2016 | Yi et al. | |
| 2016/0044639 A1* | 2/2016 | Yi | H04W 12/04 370/329 |
| 2016/0095034 A1* | 3/2016 | Hampel | H04W 36/14 370/331 |
| 2016/0112924 A1* | 4/2016 | Turakhia | H04W 36/30 370/332 |
| 2016/0135214 A1* | 5/2016 | Chendamarai Kannan | H04L 5/14 370/280 |
| 2016/0157148 A1 | 6/2016 | Kato et al. | |
| 2016/0286590 A1* | 9/2016 | Cheng | H04W 4/90 |
| 2017/0070543 A1* | 3/2017 | Balasubramanian | H04W 8/082 |
| 2017/0332192 A1* | 11/2017 | Edge | H04W 64/00 |
| 2018/0368046 A1* | 12/2018 | Zhang | H04W 16/32 |

OTHER PUBLICATIONS

ETSI TS 136 323 V13.1.0 (Apr. 2016), LTE; Evolved Universal Terrestrial Radio Access (E-UTRA); Packet Data Convergence Protocol (PDCP) specification (3GPP TS 36.323 version 13.1.0 Release 13), Apr. 2016, 41 pages.
ISA/KR, "International Search Report," Application No. PCT/KR2017/008654, dated Nov. 10, 2017, 4 pages.
ISA/KR, "Written Opinion of the International Searching Authority," Application No. PCT/KR2017/008654, dated Nov. 10, 2017, 9 pages.
3GPP TR 38.801 V14.0.0 (Mar. 2017), 3rd Generation Partnership Project; Technical Specification Group Radio Access Network; Study on new radio access technology: Radio access architecture and interfaces (Release 14), 91 pages.
3GPP TS 38.300 V0.3.0 (May 2017), 3rd Generation Partnership Project; Technical Specification Group Radio Access Network; NR; NR and NG-RAN Overall Description; Stage 2 (Release 15), 48 pages.
ETSI MCC, Report of 3GPP TSG RAN2 meeting #97bis, Spokane, USA, R2-1704001, 3GPP TSG-RAN WG2 Meeting #98, Hangzhou, China, May 15-19, 2017, 173 pages.
RAN3, "LS on Status of Higher-Layer Functional split between Central and Distributed unit," R2-1703886, 3GPP TSG RAN WG2#97bis, Spokane, USA, Apr. 3-7, 2017, 1 page.
Samsung, "Mobility in NR Connected-Active," R2-1700027, 3GPP TSG-RAN WG2 Meeting #96bis, Spokane, USA, Jan. 17-19, 2017, 4 pages.
Samsung, "Mobility in NR Connective-Acitve," R2-1701148, 3GPP TSG-RAN WG2 Meeting #97, Athens, Greece, Feb. 13-17, 2017, 5 pages.
Examination report in connection with Indian Application No. 201641027192 dated Jun. 2, 2020, 5 pages.

* cited by examiner

METHOD AND APPARATUS FOR MANAGING USER PLANE OPERATION IN WIRELESS COMMUNICATION SYSTEM

CROSS-REFERENCE TO RELATED APPLICATIONS

This application is a continuation of application Ser. No. 15/673,287, filed Aug. 9, 2017, which claims priority to Indian Patent Application No. 201641027192, filed Aug. 9, 2016, Indian Patent Application No. 201741015620, filed May 3, 2017, and Indian Patent Application No. 201641027192, filed Aug. 8, 2017, the disclosures of which are incorporated herein by reference in their entireties.

BACKGROUND

1. Field

The embodiments herein relate to a wireless communication system, and more particularly, to a method and apparatus for managing a user plane operation in a wireless communication system such as 5G communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The next generation wireless system is expected to address different use cases having quite different requirements in terms of data rate, latency, reliability, mobility etc. However, the next generation wireless system is expected that the design of an air-interface of the next generation would be flexible enough to serve a set of User Equipment's (UEs) having quite different capabilities depending on the use case and market segment the UE cater service to an end customer. Few example use cases, the next generation wireless system is expected to address an enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go.

The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the conventional systems, the UE in a connected state communicates with an Enhanced Node B (eNB). A radio protocol stack for communication between the UE and the eNB comprises of Packet Data Convergence Protocol (PDCP), Radio link control (RLC), a Medium Access Control (MAC) and Physical (PHY) sub layers. One or more data radio bearers (DRBs) are established between the UE and the eNB for exchanging user plane packets. Each DRB is associated with one PDCP entity and one or more RLC entities. Each DRB is associated with a logical channel in the MAC sub layer. There is one MAC entity in the UE for the eNB.

In the conventional systems, the main services and functions of the MAC sublayer include: mapping between logical channels and transport channels, Multiplexing/de-multiplexing of MAC SDUs belonging to one or different logical channels into/from transport blocks (TB) delivered to/from the physical layer on the transport channels, scheduling information reporting, error correction through HARQ, priority handling between the logical channels of one UE, priority handling between the UEs by means of dynamic scheduling, transport format selection and padding.

The main services and functions of the RLC sublayer include: transfer of upper layer PDUs, error correction through ARQ (only for Acknowledged Mode (AM) data transfer), concatenation, segmentation and reassembly of RLC SDUs (only for Un-acknowledgement Mode (UM) and AM data transfer), re-segmentation of the RLC data PDUs (only for the AM data transfer), reordering of the RLC data PDUs (only for the UM and AM data transfer), duplicate detection (only for the UM and AM data transfer), protocol error detection (only for the AM data transfer), the RLC SDU discard (only for the UM and AM data transfer), and RLC re-establishment.

Functions of the RLC sub layer are performed by the RLC entities. The RLC entity can be configured to perform the data transfer in one of the following three modes: Transparent Mode (TM), Unacknowledged Mode (UM), and Acknowledged Mode (AM). Consequently, the RLC entity is categorized as a TM RLC entity, an UM RLC entity and an AM RLC entity depending on the mode of data transfer that the RLC entity is configured to provide. The TM RLC entity is configured either as a transmitting TM RLC entity or a receiving TM RLC entity. The transmitting TM RLC entity receives RLC SDUs from an upper layer (i.e. PDCP) and sends RLC PDUs to its peer receiving the TM RLC entity via lower layers (i.e. MAC). The receiving TM RLC entity delivers the RLC SDUs to the upper layer (i.e. PDCP) and receives the RLC PDUs from its peer transmitting the TM RLC entity via the lower layers (i.e. MAC).

Further, the UM RLC entity is configured either as a transmitting UM RLC entity or a receiving UM RLC entity. The transmitting UM RLC entity receives the RLC SDUs from the upper layer and sends the RLC PDUs to its peer receiving UM RLC entity via the lower layers. The receiving UM RLC entity delivers the RLC SDUs to the upper layer and receives the RLC PDUs from its peer transmitting the UM RLC entity via the lower layers. The AM RLC entity consists of a transmitting side and a receiving side. The transmitting side of the AM RLC entity receives the RLC SDUs from the upper layer and sends the RLC PDUs to its peer AM RLC entity via the lower layers. The receiving side of the AM RLC entity delivers the RLC SDUs to the upper layer and receives the RLC PDUs from its peer AM RLC entity via the lower layers.

The main services and functions of the PDCP sublayer for the user plane include: header compression and decompression: ROHC only, transfer of user data, in-sequence delivery of the upper layer PDUs at PDCP re-establishment procedure for RLC AM, For split bearers in the DC (only support for the RLC AM): PDCP PDU routing for transmission and PDCP PDU reordering for reception, duplicate detection of the lower layer SDUs at the PDCP re-establishment procedure for the RLC AM, retransmission of the PDCP SDUs at handover and, for split bearers in DC, of PDCP PDUs at PDCP data-recovery procedure, for RLC AM, ciphering and deciphering, and timer-based SDU discard in an uplink (UL). Functions of the PDCP sub layer are performed by the PDCP entities. Each PDCP entity carries the data of one radio bearer. Due to the UE mobility, the UE may handover from one eNB to another eNB. In DC due to UE mobility, the UE may handover from one MeNB to another MeNB or SCG change from one SeNB to another SeNB. The eNB may support multiple cells and the UE may also handover from one cell to another cell of same eNB. After the handover, the user plane protocols for the DRBs configured with the RLC layer in the AM mode are handled as follows in a legacy system: a PDCP SN is maintained on a bearer basis; a source eNB informs the target eNB about the next DL PDCP SN to allocate to a packet which does not have a PDCP sequence number yet (either from the source eNB or from a serving gateway); For security synchronisation, a Hyper Frame Number (HFN) is also maintained; the source eNB provides to the target one reference HFN for the UL and one for the DL i.e., HFN and corresponding SN; Security keys are refreshed; the UE sends PDCP status report to the target eNB if the PDCP is configured with the target eNB. The configuration to send status report is per bearer; the target eNB may send the PDCP status report to the UE and the UE does not need to wait to resume UL transmission; the UE re-transmits in the target eNB or the target cell, all uplink PDCP SDUs starting from the first PDCP SDU following the last consecutively confirmed PDCP SDU i.e., the oldest PDCP SDU that has not been acknowledged at the RLC in the source, excluding the PDCP SDUs of which the reception is acknowledged through the PDCP SN based reporting by the target eNB. The target eNB re-transmits and prioritizes all downlink PDCP SDUs forwarded by the source eNB (i.e., the target eNB should send data with the PDCP SNs from X2 before sending data from S1), with the exception of the PDCP SDUs of which the reception is acknowledged through the PDCP SN based reporting by the UE; the ROHC is reset; and the RLC/MAC is reset. The PDCP PDUs stored in the PDU reordering buffer are deciphered and decompressed and kept in the PDCP, associated with COUNT.

Alternately, after the handover the user plane protocols for DRBs configured with RLC in the UM mode are handled as follows in legacy system: the PDCP SN is reset; the HFN is reset; the security keys are refreshed; No PDCP status report is transmitted; No PDCP SDUs are retransmitted in the target eNB; The UE PDCP entity does not attempt to retransmit any PDCP SDU in the target cell for which transmission had been completed in the source cell. Instead UE PDCP entity starts the transmission with other PDCP SDUs; ROHC is reset; and RLC/MAC is reset.

In case of intra eNB handover from one cell to another, a PDCP entity location is unchanged (i.e., remain in same eNB), so that the security key refresh is unnecessary in a legacy procedure and leads to delay in data transmission/reception in the target cell as new keys needs to be synchronized between the UE and the target cell and data which are already encrypted in the source cell needs to be re-encrypted using the new key.

In the next generation communication system, new radio access network architecture comprising of centralized units (CUs) and distributed units (DUs) is being considered. There can be one or more DUs under one CU. The radio protocol stack or functions for communication may be split between the CU and the DUs in various manners. For example, in one option PDCP layer/functions are located in the CU and the RLC/MAC/PHY functions/layers are located in the DU. In another option, the PDCP/RLC layers/functions are located in the CU and the MAC/PHY layers/functions are located in the DU. Similarly there can be other options to split functionality between the CU and the DU. In such a radio access network architecture, due to the UE mobility, the UE may move from one DU to another DU within same CU or the UE may move from one DU to another DU in different CU. In another scenario, the UE may detect a Radio Link Failure (RLF) on the serving DU and then it switches to the target DU within same CU or different CU. For these scenarios i.e., inter CU DU change or intra CU DU change handling of the user plane protocols/functions is not defined for both RLF and non RLF cases. The simplest approach would be to follow the same operation as defined for handover in the legacy system. However, this is not efficient.

The above information is presented as background information only to help the reader to understand the present invention. Applicants have made no determination and make no assertion as to whether any of the above might be applicable as Prior Art with regard to the present application.

SUMMARY

To address the above-discussed deficiencies, it is a primary object to provide a method and apparatus for user plane operation in wireless communication system.

Another object of the embodiments is to disclose various operations performed by the UE during TRP/DU switch for the radio protocol stack or user plane functions where the user plane functions may be split between a CU and a TRP/DU in various manners.

Another object of the embodiments disclose an inter CU DU change or intra CU DU change handling for both RLF and non RLF cases.

Embodiments herein disclose a method for managing a user plane operation in a wireless communication system. The method includes receiving, by a UE, a signaling message from a gNodeB. Further, the method includes determining, by the UE, whether the signaling message includes control information comprising one of a Packet Data Convergence Protocol (PDCP) re-establish indication and a security key change indication. Further, the method includes performing, by the UE, the at least one operation for at least one data radio bearer based on the determination.

In an embodiment, performing, by the UE, the at least one operation for the at least one data radio bearer in response to determine that the signaling message including the control information comprising one of the PDCP re-establish indication and the security key change indication comprises: re-generating at least one of access stratum security keys, re-setting a header compression protocol, setting a transmit state parameter to zero for a UM uplink data radio bearer, where the transmit state parameter indicates COUNT value of the next PDCP SDU to be transmitted, setting a receive state parameter to zero for a UM downlink data radio bearer, where the receive state parameter indicates COUNT value of the next PDCP SDU to be received, setting a receive state parameter to zero for a UM downlink data radio bearer, where the receive state parameter indicates COUNT value following the COUNT value associated with the PDCP Data PDU which has triggered start of reordering timer, maintaining a current value of transmit state parameter for uplink AM data radio bearer, where the transmit state parameter indicates COUNT value of the next PDCP SDU to be transmitted, maintaining a receive state parameter for an AM downlink data radio bearer, where the receive state parameter indicates COUNT value following the COUNT value associated with the PDCP Data PDU which has triggered start of reordering timer, maintaining a current value of a receive state parameter for a downlink AM data radio bearer, where the receive state parameter indicates COUNT value of the next PDCP SDU to be received; and performing one of: retransmitting all the PDCP SDUs of an AM DRB which are already associated with the PDCP SNs in ascending order of the COUNT values associated to the PDCP SDU prior to the PDCP entity re-establishment from the first PDCP SDU for which the successful delivery of the corresponding PDCP Data PDU has not been confirmed by the RLC, transmitting all the PDCP SDUs of an AM DRB which are already associated with the PDCP SNs in ascending order of the COUNT values associated to the PDCP SDU prior to the PDCP entity re-establishment, where the discard timer is not restarted for the PDCP SDUs, header compression and ciphering is performed for the PDCP SDUs, transmitting the PDCP SDUs of an UM DRB which are not yet transmitted and which are already associated with the PDCP SNs in the ascending order of the COUNT values associated to the PDCP SDU prior to the PDCP entity re-establishment, where the discard timer is not restarted for the PDCP SDUs, the header compression and ciphering are performed for the PDCP SDUs, and the sequence number and the COUNT value are re-assigned for the PDCP SDUs.

In an embodiment, performing, by the UE, the at least one operation for the at least one data radio bearer which is part of current UE configuration in response to determine that the signaling message does not include one of the PDCP re-establish indication and the security key change indication comprises: using existing at least one of access stratum security keys, maintaining a header compression protocol, maintaining a current value of a transmit state parameter for an uplink data radio bearer, where the transmit state parameter indicates COUNT value of the next PDCP SDU to be transmitted, maintaining a current value of a receive state parameter for a downlink data radio bearer, wherein the receive state parameter indicates COUNT value of the next PDCP SDU to be received, maintaining a receive state parameter for a downlink data radio bearer, wherein the receive state parameter indicates a COUNT value following the COUNT value associated with the PDCP Data PDU which has triggered start of reordering timer, and retransmitting all the PDCP Data PDUs of the AM DRB previously submitted to re-establish the AM RLC entity in ascending order of the associated COUNT values from the first PDCP Data PDU for which the successful delivery has not been confirmed by the RLC.

In an embodiment, the signaling message is a handover command.

In an embodiment, the signaling message is a secondary node change.

In an embodiment, the signaling message is a bearer change.

In an embodiment, the operation is performed by the UE for each data radio bearer which is part of current UE configuration.

In an embodiment, the operation is performed by the UE for at least one data radio bearer indicated in the signaling message.

In an embodiment, the PDCP re-establish indication is indicated by including a one bit indicator in the signaling message.

In an embodiment, the security key change indication is indicated by including a one bit key change indicator in the signaling message.

In an embodiment, the security key change indication is indicated by including security information in the signaling message.

In an embodiment, performing, by the UE, the at least one operation for the at least one data radio bearer in response to determining that the signaling message including the control information comprising one of the PDCP re-establish indication and the security key change indication comprises: re-generating the one or more access stratum security keys, re-establishing the PDCP entity for the AM data radio bearer, re-establishing the PDCP entity for the UM data radio bearer, re-establishing a RLC entity for the AM data radio bearer, re-establishing the RLC entity for the UM data radio bearer, and re-setting a MAC entity.

In an embodiment, performing, by the UE, at least one operation for the at least one data radio bearer in response to determining that the signaling message comprising the control information does not include one of the PDCP re-establish indication and the security key change indication comprises: using the existing one or more access stratum security keys, initiating a data recovery procedure for the AM data radio bearer, re-establishing the RLC entity for the AM data radio bearer, re-establishing the RLC entity for the UM data radio bearer, and re-setting the MAC entity.

In an embodiment, re-establishing the PDCP entity of the data radio bearer comprises: setting a transmit state parameter to zero for the UM data radio bearer, where the transmit state parameter indicates the COUNT value of the next PDCP SDU to be transmitted, setting a receive state parameter to zero for a UM data radio bearer, wherein the receive state parameter indicates a COUNT value of the next PDCP SDU to be received, setting a receive state parameter to zero for a UM data radio bearer, wherein the receive state parameter indicates a COUNT value following the COUNT value associated with the PDCP Data PDU which has triggered start of reordering timer, re-setting a header compression protocol, retransmitting all the PDCP SDUs of a AM data radio bearer which are already associated with PDCP SNs in ascending order of the COUNT values associated to the PDCP SDU prior to the PDCP entity re-establishment from the first PDCP SDU for which the successful delivery of the corresponding PDCP Data PDU has not been confirmed by RLC, and transmitting each PDCP SDU of a UM DRB and AM DRB already associated with a PDCP SN but for which a corresponding PDU has not previously been submitted to a lower layer in ascending order of the COUNT value associated to the PDCP SDU prior to the PDCP re-establishment by performing header compression and ciphering for the PDCP SDUs of UM and AM DRBs, re-assigning sequence number and COUNT value for the PDCP SDUs of UM DRBs and without restarting a discard timer.

In an embodiment, initiating the data recovery procedure for an AM data radio bearer comprises: retransmitting all the PDCP data PDUs previously submitted to re-established AM RLC entity in ascending order of the associated COUNT values from the first PDCP Data PDU for which the successful delivery has not been confirmed by the RLC; and transmitting a PDCP status report if the PDCP status report is requested by the gNodeB, where a request for the PDCP status report is included in signaling message received from the gNodeB.

In an embodiment, the header compression protocol is reset by receiving a request from the gNodeB.

Embodiments herein disclose a method for managing a user plane operation in a wireless communication system. The method includes determining, by a gNodeB, whether an anchor point in a network for a PDCP entity associated with at least one data radio bearer established for a UE is changed. Further, the method includes transmitting, by the gNodeB, a signaling message including control information to the UE. The control information includes one of a PDCP re-establish indication and a security key change indication in response to determining that the anchor point in the network for the PDCP entity associated with the at least one data radio bearer established for the UE is changed.

Embodiments herein disclose a UE for managing user plane operations in a wireless communication system. The UE includes a user plane management unit coupled to a memory and a processor. The user plane management unit is configured to receive a signaling message from a gNodeB. Further, the user plane management unit is configured to determine whether the signaling message includes control information comprising one of a PDCP re-establish indication and a security key change indication. Further, the user plane management unit is configured to perform the at least one operation for at least one data radio bearer based on the determination.

Embodiments herein disclose an apparatus for managing user plane operations in a wireless communication system. The apparatus includes a user plane management unit coupled to a memory and a processor. The user plane management unit is configured to determine whether an anchor point in a network for a PDCP entity associated with at least one data radio bearer established for the UE is changed. Further, the user plane management unit is configured to transmit a signaling message including control information to the UE. The control information includes one of a PDCP re-establish indication and a security key change indication if the anchor point in the network for the PDCP entity associated with at least one data radio bearer established for the UE is changed.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts

DETAILED DESCRIPTION

Figure 1A:
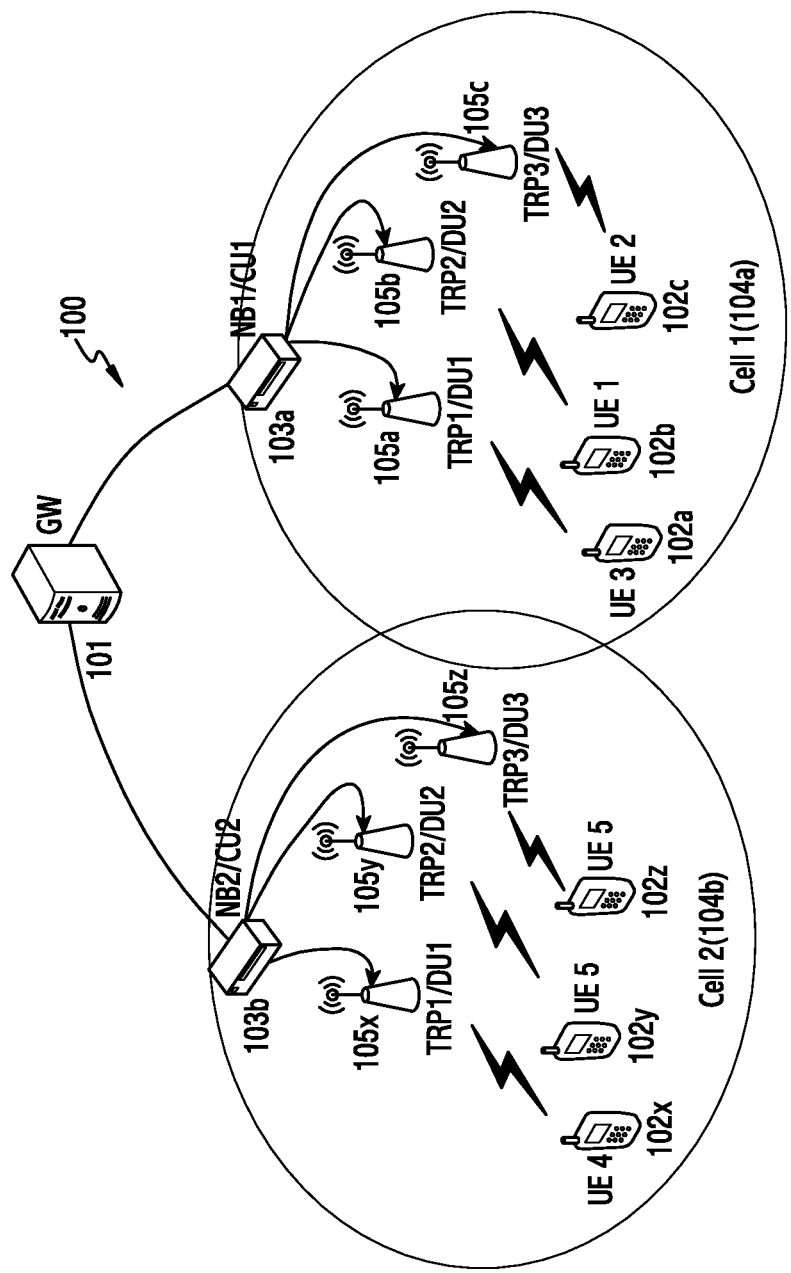
FIG. 1A is an example illustration a Radio Access Network (RAN) architecture of a next generation wireless communication system, according to an embodiment as disclosed herein.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention Embodiments herein provide a UE for managing a user plane operation in a wireless communication system. The UE includes a user plane management unit coupled to a memory and a processor. The user plane management unit is configured to receive a signaling message from a gNodeB. Further, the user plane management unit is configured to determine whether the signaling message includes control information comprising one of a PDCP re-establish indication and a security key change indication. Further, the user plane management unit is configured to perform the at least one operation for at least one data radio bearer based on the determination.

Unlike the conventional methods and the systems, in the next generation communication systems, a new radio access network (RAN) architecture includes centralized units (CUs) and distributed units (DUs). There can be one or more DUs under one CU. The radio protocol stack or functions for communication may be split between the CUs and the DUs in various manners. In such RAN architecture, due to mobility scenario, the UE may move from one DU to another DU within same CU or the UE may move from one DU to another DU in different CU. Also, the UE may detect RLF on the serving DU and then switches to a target DU within same CU or different CU.

Definitions for certain words and phrases are provided throughout this patent disclosure, those of ordinary skill in the art should understand that in many, if not most instances, such definitions apply to prior, as well as future uses of such defined words and phrases. For example the 5G communication systems or Next generation of IMT-Advanced systems is simply referred as next generation wireless system (NG) or next generation RAT (NR) throughout this patent disclosure. Another example, the terminal is referred as a User Equipment (UE) throughout the patent disclosure. It is to be noted that term 'CU' and 'NB' are used interchangeably in the description of application. It is to be noted that term 'Cell', 'Coverage Area', 'Transmission Reception Points (TRPs) Group' and 'DU group' are used interchangeably in the description of application. It is to be noted that terms, 'TRP' and 'DU' are used interchangeably in the description of application.

The present disclosure is adapted in the 3GPP TR 38.801 standard and 3GPP TS 38.300 standard. The standards have agreed the RAN architecture for CU-DU split where the PDCP entity resides in the CU while the RLC and MAC entity resides in the DU. Based on the agreed RAN architecture for CU-DU split, there is standard progress and agreements for user plane operation/function handling.

Unlike in the LTE system, in order to assist the UE for performing appropriate action related to the user plane operation, the network sends one or more functional indications. These functional indications can be sent in the RRC connection reconfiguration message or any other signaling message used for TRP/DU switching to indicate the UE what action it has to take associated with the corresponding function of user plane processing.

Referring now to the drawings, and more particularly to FIGS. 1A through 14, there are shown preferred embodiments.

FIG. 1A is an example illustration a RAN architecture of a next generation wireless communication system 100, according to an embodiment as disclosed herein. In an embodiment, the next generation wireless communication system 100 includes a gateway (GW) 101, a set of UE's 102a, 102b, 102c, 102x, 102y, and 102z (hereafter, the label of the UE is 102), a set of eNBs or CU 103a, 103b (hereafter, the label of the eNB or the CU is 103), a set of cells 104a, 104b (hereafter, the label of the cell is 104), and a set of TRPs or DU 105a, 105b, 105x, and 105y (hereafter, the label of the TRP or DU is 105).

The UEs 102 may be dispersed throughout the next generation wireless communication system 100. The UE 102 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The UE 102 can be, for example, but not limited to a cellular phone, a smart phone, a Personal Digital Assistant (PDA), a wireless modem, a wireless communication device, a handheld device, a tablet computer, a laptop computer, a wireless local loop (WLL) station, a Universal Serial Bus (USB) dongle, a wireless router, etc.

The eNB 103 may also include or be referred to by those skilled in the art as a base station, a base transceiver station, a radio base station, an access point, a radio transceiver, a NodeB, 5G-eNB, gNB, gNodeB, NB, or some other suitable terminology.

In the present disclosure, the mmWave/cmWave band is considered as common scenario for deployment of next generation RAT and hence the procedures are described taking the radio characteristics in those bands. However, in practical deployments it is possible to apply the air-interface of the next generation wireless communication system 100 even below 10 GHz band, therefore the applicability of the next generation RAT and the procedure disclosed in the present disclosure should not be considered strictly limited to mmWave/cmWave bands. Since the radio characteristics is different for frequencies in the mmWave/cmWave bands compared to frequencies in sub 6 GHz bands, it is also expected next generation wireless communication system 100 would have native support for beamforming techniques for both broadcast and unicast transmissions towards the UE 102 to overcome short propagation distances of radio signals at the mmWave/cmWave frequencies.

The eNB/CU 103 is configured to determine whether the anchor point in the network for the PDCP entity associated with the at least one data radio bearer established for the UE 102 is changed. Further, the eNB/CU 103 is configured to transmit the signaling message including the control information to the UE 102. The control information includes one of the PDCP re-establish indication and the security key change indication in response to determine that the anchor point in the network for the PDCP entity associated with the at least one data radio bearer established for the UE 102 is changed.

The UE 102 is configured to receive the signaling message from the gNodeB (e.g., eNB/CU 103). After receiving the signaling message from the gNodeB, the UE 102 is configured to determine whether the signaling message includes the control information comprising one of the PDCP re-establish indication and the security key change indication. Further, the UE 102 is configured to perform the at least one operation for the at least one data radio bearer based on the determination.

In an embodiment, if the UE 102 determines that the signaling message includes the control information comprising one of the PDCP re-establish indication and the security key change indication then, the UE 102 performs one or more operations for at least one data radio bearer. The operation corresponds to re-generate at least one of access stratum security keys, re-set a header compression protocol, set a transmit state parameter to zero for the UM uplink data radio bearer, where the transmit state parameter indicates COUNT value of the next PDCP SDU to be transmitted, set a receive state parameter to zero for a UM downlink data radio bearer, where the receive state parameter indicates COUNT value of the next PDCP SDU to be received, set a receive state parameter to zero for a UM downlink data radio bearer, where the receive state parameter indicates COUNT value following the COUNT value associated with the PDCP Data PDU which has triggered start of reordering timer, maintain a current value of transmit state parameter for uplink AM data radio bearer, where the transmit state parameter indicates COUNT value of the next PDCP SDU to be transmitted, maintaining a receive state parameter for an AM downlink data radio bearer, where the receive state parameter indicates COUNT value following the COUNT value associated with the PDCP Data PDU which has triggered start of reordering timer, maintain a current value of a receive state parameter for a downlink AM data radio bearer, where the receive state parameter indicates COUNT value of the next PDCP SDU to be received; and perform one of: retransmit all the PDCP SDUs of an AM DRB which are already associated with the PDCP SNs in ascending order of the COUNT values associated to the PDCP SDU prior to the PDCP entity re-establishment from the first PDCP SDU for which the successful delivery of the corresponding PDCP Data PDU has not been confirmed by the RLC, and transmit all the PDCP SDUs of an AM DRB which are already associated with the PDCP SNs in ascending order of the COUNT values associated to the PDCP SDU prior to the PDCP entity re-establishment wherein the discard timer is not restarted, and the header compression and ciphering is performed for the PDCP SDUs, and transmit the PDCP SDUs of an UM DRB which are not yet transmitted and which are already associated with the PDCP SNs in ascending order of the COUNT values associated to the PDCP SDU prior to the PDCP entity re-establishment wherein the discard timer is not restarted, the header compression and ciphering are performed for the PDCP SDUs, and the sequence number and the COUNT value are re-assigned for the PDCP SDUs.

In an embodiment, the UE 102 can be configured to perform one or more operations for the at least one data radio bearer which is part of current UE 102 configuration in response to determining that the signaling message comprising the control information does not include one of the PDCP re-establish indication and the security key change indication. The operation corresponds to use existing at least one of access stratum security keys, maintain the header compression protocol, maintain the current value of the transmit state parameter for the uplink data radio bearer, where the transmit state parameter indicates the COUNT value of the next PDCP SDU to be transmitted, maintaining the current value of the receive state parameter for the downlink data radio bearer, where the receive sequence number parameter indicates COUNT value of the next PDCP SDU to be received, maintain the receive state parameter for the downlink data radio bearer, where the receive state parameter indicates the COUNT value following the COUNT value associated with the PDCP data PDU which has triggered start of reordering timer and retransmit all the PDCP Data PDUs of AM DRB previously submitted to re-established AM RLC entity in ascending order of the associated COUNT values from the first PDCP Data PDU for which the successful delivery has not been confirmed by the RLC.

In an embodiment, the signaling message is the handover command.

In an embodiment, the signaling message is the secondary node change.

In an embodiment, the signaling message is a bearer change.

In an embodiment, the operation is performed by the UE 102 for each data radio bearer which is part of current UE 102 configuration.

In an embodiment, the operation is performed by the UE 102 for at least one data radio bearer indicated in the signaling message.

In an embodiment, the PDCP re-establish indication is indicated by including a one bit indicator in the signaling message.

In an embodiment, the security key change indication is indicated by including a one bit key change indicator in the signaling message.

In an embodiment, the security key change indication is indicated by including security information in the signaling message.

In an embodiment, the UE 102 can be configured to perform one or more operations for the at least one data radio bearer in response to determining that the signaling message includes one of the PDCP re-establish indication and the security key change indication. The operation corresponds to re-generate the one or more access stratum security keys, re-establish the PDCP entity for the AM data radio bearer, re-establishes the PDCP entity for the UM data radio bearer, re-establishes the RLC entity for the AM data radio bearer, re-establish the RLC entity for the UM data radio bearer, and re-set the MAC entity.

In an embodiment, the UE 102 can be configured to perform one or more operations for at least one data radio bearer in response to determining that the signaling message including the control information does not include one of the PDCP re-establish indication and the security key change indication. The operation corresponds to perform use the existing one or more access stratum security keys, initiate a data recovery procedure for the AM data radio bearer, re-establishes the RLC entity for the AM data radio bearer, re-establishes the RLC entity for the UM data radio bearer, and re-set the MAC entity.

In an embodiment, re-establish the PDCP entity of the data radio bearer comprises: set the transmit state parameter to zero for the UM data radio bearer, where the transmit state parameter indicates the COUNT value of the next PDCP SDU to be transmitted, set a receive state parameter to zero for the UM data radio bearer, wherein the receive state parameter indicates the COUNT value of the next PDCP SDU to be received, set the receive state parameter to zero for the UM data radio bearer, wherein the receive state parameter indicates the COUNT value following the COUNT value associated with the PDCP data PDU which has triggered start of reordering timer, re-set the header compression protocol, retransmit all the PDCP SDUs of the AM data radio bearer which are already associated with PDCP SNs in ascending order of the COUNT values associated to the PDCP SDU prior to the PDCP entity re-establishment from the first PDCP SDU for which the successful delivery of the corresponding PDCP Data PDU has not been confirmed by RLC, and transmit each PDCP SDU of the UM DRB and AM DRB already associated with the PDCP SN but for which a corresponding PDU has not previously been submitted to the lower layer in ascending order of the COUNT value associated to the PDCP SDU prior to the PDCP re-establishment by performing header compression and ciphering for the PDCP SDUs of AM and UM DRBs, re-assigning sequence number and COUNT value for the PDCP SDUs of UM DRBs and without restarting a discard timer for the PDCP SDUs of AM and UM DRBs.

In an embodiment, initiate the data recovery procedure for the AM data radio bearer comprises: retransmitting all the PDCP data PDUs previously submitted to re-established AM RLC entity in ascending order of the associated COUNT values from the first PDCP Data PDU for which the successful delivery has not been confirmed by the RLC, and transmit the PDCP status report if the PDCP status report is requested by the gNodeB, where a request for the PDCP status report is included in signaling message received from the gNodeB.

In an embodiment, the header compression protocol is reset by receiving a request from the gNodeB.

Further, the GW 101 can be connected to 5G nodes of next generation RAT i.e., 5G NBs/CUs 103 for handling the frequency carrier(s) in the coverage area 104. One CU 103 may be connected to more than one GW 101. Within the coverage of 5G NB1/CU1 and 5G NB2/CU2 103, the plurality of UE's 102 which support multiple RAT functionalities (like GSM, UMTS, LTE, etc.,) and also next generation RAT functionalities (5G) are served in one or more cell(s) 104. Regardless of the UE 102 support type, each UE 102 can access at least one carrier based on the next generation RAT.

The next generation wireless communication system 100 hierarchy would consist of the set of 5G CU/NB nodes 103 such that each CU 103 node serves 1 . . . m coverage areas or cell(s) or DU groups or TRP groups 104. Further, one 5G cell or coverage area 104 or the DU groups or the TRP groups consists of 1 . . . n TRPs or DUs 105 so on and so forth, 'n' can be one i.e., each DU can be a cell. A front haul between the CU 103 and TRPs/DUs 105 etc., can be ideal or non-ideal.

The TRPs/DUs 105 of one 5G cell or coverage area 104 controlled by the 5G CU/NB 103 will operate to provide 1 . . . p "DL coverage beams". Further, it seems reasonable to assume all TRPs/DUs belonging to the same cell or coverage area are "time synchronized" i.e., same radio frame and System Frame Number (SFN) timing. However in some implementation, the TRPs/DUs 105 may not be time synchronized. The radio frame duration of the IMT-Advanced is 10 ms and the SFN range is 0-1023. The numerology of the next generation RAT is assumed such that the IMT-Advanced radio frame is either multiple of radio frame of next generation RAT or radio frame of next generation RAT is exactly 10 ms. Therefore, the SFN range of the next generation RAT is either 0-1023 or multiple of IMT-Advanced SFN range. This is needed to support co-existence of the next generation RAT and the IMT-Advanced RAT. This is also needed to support non-standalone deployment of the next generation wireless system 100, where the IMT-Advanced RAT acts as the mobility and RRC connection anchor. It is expected that the initial deployment of next generation wireless system 100 operating in mmWave/ cmWave bands would operate as non-standalone system to provide additional radio resources to the UE 102 which would be connected to IMT-Advanced or previous generation system for coverage purpose. With the assumption that next generation wireless system 100 would be added as a capacity layer to existing IMT-Advanced deployments then from the initial standardization phase perspective the RAN architecture would be based on mechanisms similar to Carrier Aggregation (CA) or Dual-Connectivity (DC) framework specified by $3^{rd}$ Generation Partnership Project (3GPP). The maximum number of the DL coverage beams 'p' will typically depend on the frequency used, i.e., can be larger in higher frequency bands due to smaller antenna separation at the TRPs/DUs 105 of 5G CU/NB 103. The cell 104 of the next generation wireless system 100 is identified by a "Cell Identifier" (Cell-Id) or simply Physical Cell Identifier (PCI). This can also be a coverage area-Id or a TRP/DU group ID. The UE 102 can obtain the cell id/coverage area id/TRP group id/DU group ID or the PCI from the Synchronization Signal (SS) transmitted by the 5G Cell 104 of the next generation RAT i.e., NR-SS or from the minimum system information broadcasted periodically on a Physical Broadcast Channel (PBCH) by the 5G cell 104.

It is assumed that the UE 102 which supports legacy RAT, IMT-Advanced RAT and next generation RAT is aware of DUs/TRPs 105 of the next generation wireless system 100. The TRPs/DUs 105 operate together to provide beams to the UE 102 and notion of TRP/DU 105 is visible to the UE 102 in the form of the PCI. Therefore, there is a "TRP Identifier (TRP-Id)" i.e., the PCI is provided to the UE 102 over the radio of next generation RAT by decoding the NR-SS. The TRP-Id can also be named as DU-id or the PCI.

Further, the UE 102 is aware of cell/TRP group/DU group of the CU 103, the TRP/DU 105 and beams served by the respective TRP. The UE 102 shall detect and decode the Synchronization Signal (NR-SS) and the PBCH to determine the Cell Id/DU Id/TRP group Id and TRP-Id/DU Id/PCI and also decode the Beam Index Sequence or time index to determine a "Beam Identifier" (Beam-Id). Further, two types of DL beams are considered: 1) Coverage Beams and 2) Dedicated Beams. The coverage beams transmitted by the TRPs 105 etc., under the control of 5G CU/NB 103 provides the coverage for the cell 104 of the next generation system 100 with a fixed set of directed coverage beams, also called as "grid of beams" on which the NR-SS is transmitted in a beam sweeping manner.

Further, the coverage beams cover a relatively wide area and can thus only support relatively low data rates. For example, in the cell 104 there could be less than 10 DL coverage beams and more than 10 dedicated beams transmitted by each TRP/DU 105. As an example, each DL coverage beam from the respective TRP/DU 105 could cover 30-60 degree sector angle such that grid of coverage beams cover 100-250 m radius circular area. Each coverage beam is identified by a "Beam-Id" in the form beam index sequence or the time index or time index sequence. The coverage beams transmit the Synchronization Signal (NR-SS), PBCH and reference signals for beam signal strength measurements. These reference signals are generically referred as Beam Reference Signal (BRS) or Channel State Information-Reference signals Type 1 (i.e., CSI-RS set1) and used for Radio Resource Management (RRM) measurements.

Further, the coverage beams are used for transmitting DL common channel signaling e.g., RACH response. The coverage beams carry control channel transmissions like enhanced Physical Downlink Control Channel (ePDCCH) and user data Physical Downlink Shared Channel (PDSCH) can also be transmitted on the coverage beams when dedicated beams to the UE 102 have been lost. For demodulation purpose when ePDCCH/PDSCH is transmitted on the coverage beam then Demodulation Reference Signal (DMRS) is also transmitted. Dedicated transmissions towards the UE 102 (ePDCCH/PDSCH) may potentially use even more directed and sharp beams (e.g., UE 102 specific pre-coding) on so called "Dedicated Beams".

Further, the coverage area of the dedicated beams would be much smaller in terms of beam width compared to coverage beams (e.g., ½, ¼ or ⅛th of coverage beam area). The dedicated beams are managed based on the UE 102 measurement on the Channel-State Information-Reference Signal Type 2 (i.e., CSI-RS set2) and the UE 102 provides the CSI feedback at the PHY layer or the MAC layer. This is referred as beam switching or beam management which can occur within the beams of the serving TRP/DU 105 or across the beams of different TRP/DU 105.

Further, the beam switching or beam management within the same TRP/DU 105 i.e., same cell 104 is managed at the PHY or MAC layer based on the CSI feedback from the UE 102. The CSI feedback which is PHY layer measurement averaged over few measurement samples (i.e., L1 filtered measurements) is sent on an uplink control channel like PUCCH or can also be transmitted on a shared data channel like PUSCH. The beam switching or beam management within the same TRP/DU 105 does not have any impact on the user plane functions/layers. However, for beam switching between different TRP/DU 105 of the same NB/CU or different NB/CU the UE 102 needs to undergo TRP/DU 105 switching which has impacts on the user plane functions/layers depending on the user plane architecture involving the NB/CU 103 and the TRP/DU 105.

In order to demodulate ePDCCH/PDSCH carried on the dedicated beams, the DMRS is also transmitted on the dedicated beam. Since the UE 102 just obtains the DMRS kind of reference signals coming from the cell 104 of the next generation system 100, the notion of coverage beam and dedicated beam is transparent to the UE 102 for the PDSCH reception point of view. However, notion of the coverage beam is known to the UE 102 for reception of synchronization signal (NR-SS) and the BRS i.e. CSI-RS set1 measurement. The BRS or the CSI-RS set is periodically transmitted signals on the coverage beams or wider beams are cell-specific reference signals, however, the CSI-RS set is 1. However, the BRS or the CSI-RS set1 are not ALWAYS ON signals i.e. BRS or CSI-RS set 1 can be turned ON/OFF depending on the presence of a connected mode UE 102 in the TRP/DU 105 or the cell 104. On the other hand the NR-SS is ALWAYS ON periodically transmitted signals on the coverage beams or wider beams are cell-specific reference signals. Therefore, when TRPs/DUs 105 of the CU 103 detects the UE 102 has lost dedicated beams based on the CSI-RS measurement feedback i.e. feedback on CSI-RS set2 and the UE 102 is scheduled data on the coverage beam then the UE 102 will not be aware that whether the transmission is coming from the coverage beam. A cell edge bitrates on the coverage beams will be much lower than the cell edge bitrates achievable by the dedicated beams. The UE 102 transmission in the UL may also be carried on the UL beams. However, the number of the UL beams are expected to be less compared to the number of DL beams considering the UE 102 size and number of antenna's at the UE 102.

The FIG. 1A shows the limited overview of the next generation wireless communication system 100 but, it is to be understood that other embodiments are not limited thereto. Further, the next generation wireless communication system 100 can include any number of hardware or software components communicating with each other. Further, the labels are only used for illustrative purpose and not limiting the scope of the invention. For example, the component can be, but not limited to, a process running in the controller or processor, an object, an executable process, a thread of execution, a program, or a computer.

Figure 1B:
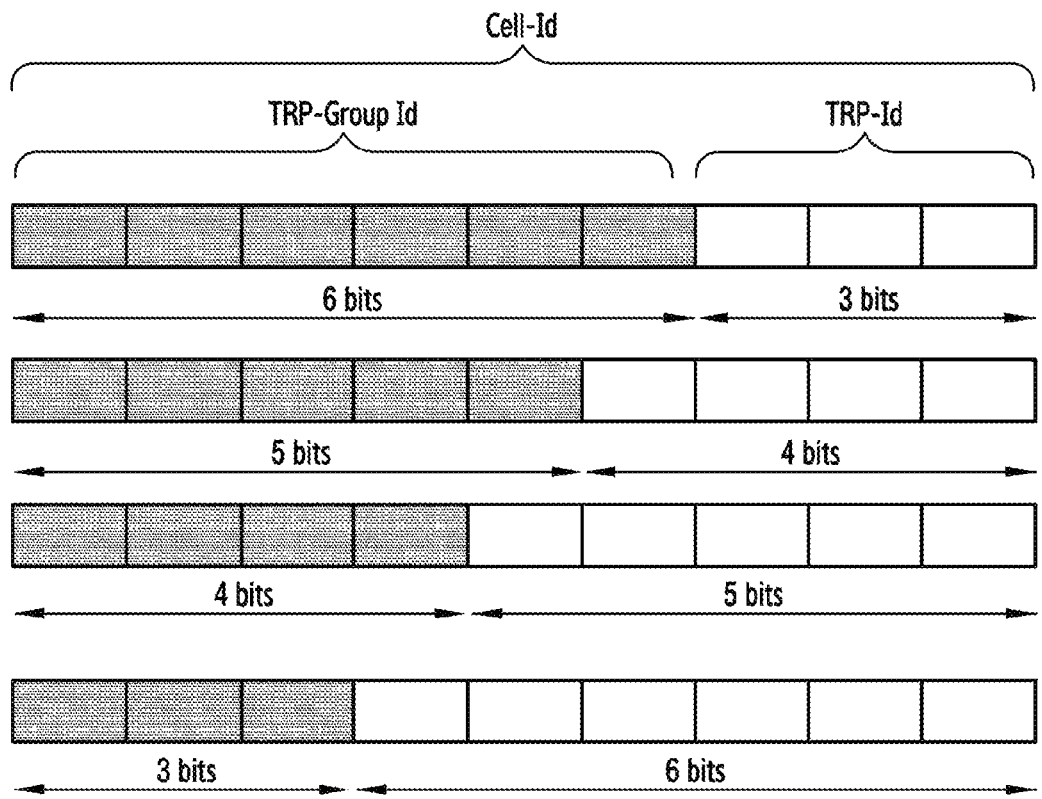
FIG. 1B illustrates fragmentation of a cell-identifier into TRP-Group Id and TRP Id, according to an embodiment as disclosed herein.

Minimizing SI Acquisition:

FIG. 1B is illustration of fragmentation of the Cell-Id into TRP Group Id and TRP-Id according to one embodiment of the present invention. The "Cell Identifier" (Cell-Id) is identified by decoding the synchronization signal like PSS and SSS in the LTE. The Cell-Id or the PCI is the frequency specific in the LTE i.e. cells 104 with same identifier on different carrier frequencies can be served from the same eNB 103. The transmitted synchronization signals (i.e., PSS and SSS) are pre-defined unique sequences which upon decoding by the UE 102 represents the physical identity and physical identity group. The NR-SS is composed of the PSS, SSS and the NR-SS block may also comprise the beam index sequence or the time index sequence. The PSS uses three sequences for the physical identity while the SSS uses 168 sequences for the physical identity group, which together determines one out of the 504 physical cell identities (Cell-Id) represented by 9 bits. For 5G/NR similar approach can be considered wherein upon decoding the PSS/SSS the 9 bits of Cell-Id can be used to determine the TRP-Group Id (or Area ID) and the TRP-Id. The TRP-Id may be 3 bits, 4 bits, 5 bits or 6 bits depending upon the number of TRPs 105 within the TRP-Group Id as depicted in the FIG. 1B.

Further, the number of bits used for the TRP-Group Id and the TRP-Id provide flexibility to the network operator for supporting network deployment with different architecture options. The TRP-Id size can be included in the minimum system information (i.e. MIB) broadcasted on the PBCH. For e.g., the parameter "TRP-Id Size" can be 2-bit indication in MIB broadcasted on the PBCH which indicates the size of the TRP-Id such that '00' indicates TRP-Id is 3-bits, '01' indicates as TRP-Id is 4-bits, '10' indicates TRP-Id is 5-bits and '11' indicates TRP-Id is 6-bits. The "TRP-Id Size" parameter can also be just 1-bit indication such that '0' indicates TRP-Id is either 3/4 bits and '1' indicates TRP-Id is 6/5 bits. Upon decoding the Cell-Id and determining the TRP-Id size after acquiring the minimum system information (i.e. MIB) the UE 102 can determine the TRP-Id of the TRP/DU on which the UE 102 decides to camp. The TRP-Group Id is determined implicitly from the remaining bits of Cell-Id after determining the TRP-Id. In an embodiment, "TRP-Id Size" can be fixed in the system and upon decoding the Cell-Id, the UE 102 can determine the TRP-Group Id and TRP ID from the Cell-Id.

The Cell-Id space of 9 bits based on 504 identities is taken as an example to illustrate the fragmentation of the Cell-Id into the TRP-Group Id and the TRP-Id and should not be considered as a limiting case. In some implementation, there may be no fragmentation of the Cell-Id space. One advantage of the fragmentation of the Cell-Id is that the UE 102 can assume the system information applicable for a newly detected TRP on the serving frequency after decoding the PSS/SSS is same if the TRP-Group Id remains same as that of the currently serving/camped TRP. A network operator can plan or co-ordinate the configuration of the system information to be same within the TRP-Group Id. This means a cluster of TRPs 105 can be configured with the same system information for e.g., the RACH configuration, some L1/L2 configuration, MIMO configuration can be same across the cluster of TRPs 105. The TRP-Group Id can used to identify a cluster/group of TRPs, wherein the cluster of TRPs 105 may belong to same CU/NB 103 or may belong to different CU/NB 103. The FIG. 1A depicts 5G NB1/CU1 103 serving only one cell i.e. Cell 1 104 which is a simple example for illustration purpose but in practical deployments one 5G NB1/CU1 103 may be serving multiple cells.

If the TRP-Group Id of the newly detected intra-frequency cell/TRP remains same then the UE 102 can assume the currently applied system information is also applicable for the newly detected cell/TRP. Such an approach of fragmenting the Cell-Id into the TRP Group Id and the TRP-Id avoids the requirement for the UE 102 to read the MIB i.e. PBCH for every newly detected cell/TRP or when the UE 102 changes the camped beam of the serving TRP and hence useful for reducing the UE 102 battery power consumption.

It can be possible to design the synchronization signals i.e., NR-SS as combination of PSS/SSS and beam index sequences within a NR-SS block. The beam index sequence or time index sequence can also represent a 9 bit space which can be partitioned into "Beam Identifier" i.e. Beam-Id and "System Information Identifier" i.e. SI-Id. This could be fixed partition of 3 bits of MSB for "System Information Identifier" i.e. SI-Id and remaining 6 bits for Beam-Id. Alternately, the 4 bits of the MSB can indicate the SI-Id while remaining 5 bits represents the Beam-Id. The SI-Id indicates the system information configuration applicable in the detected cell/TRP. The actual parameters for system information are provided in one or more system information blocks which can be broadcasted or some of the blocks can be sent in the UE 102 dedicated manner. If a fixed partitioning approach is considered then the number of bits for Beam-Id depends upon the maximum number of coverage beams to be supported in the system. If the flexible partitioning approach is considered then the number of bits for Beam-Id can be indicated with a parameter "Beam-Id Size" in the minimum system information similar to the parameter "TRP-Id Size".

Upon acquiring the minimum system information (i.e. MIB and SIB1) and determining the TRP-Id size and Beam-Id size (optionally), the UE 102 is able to determine the TRP-Id, the TRP-Group Id, the Beam-Id and the SI-Id. If the SI-Id of the newly detected intra-frequency cell/TRP remains same then the UE 102 can assume the currently applied system information is also applicable for the newly detected cell/TRP. If the SI-Id is indicated through the synchronization signal like beam index sequence then the system information can be different for the same TRP-Group Id. This means a cluster of TRPs 105 having the same system information is independent of the TRP-Group Id but linked to the SI-Id. The SI-Id identifies such a cluster/group of TRPs 105 having same system information, wherein the cluster of TRPs 105 may belong to same CU/NB 103 or may belong to different CU/NB 103. Therefore based on SI-Id indicated through the physical layer signal like beam index sequence the UE 102 is able to determine whether system information needs to be re-acquired or not.

Further, the main purpose of the synchronization signals like PSS/SSS and beam index sequence is for downlink timing reference, sub-frame or radio frame boundary identification and additional scrambling of the physical channels such as LTE equivalent of PDCCH, PDSCH, PUSCH, PUCCH etc. The identity space provided by these sequences i.e. PSS/SSS and beam index sequence is exploited for conveying one or more identities such as Cell-Id, TRP-Id, TRP-Group Id, Beam-Id, SI-Id etc., required for the overall system operation like cell detection, TRP-Id switching, beam switching and beam tracking, beam management and system information acquisition so on and so forth.

FIGS. 2A to 2E illustrate various user plane architectures, according to an embodiment as disclosed herein.

Figure 2A:
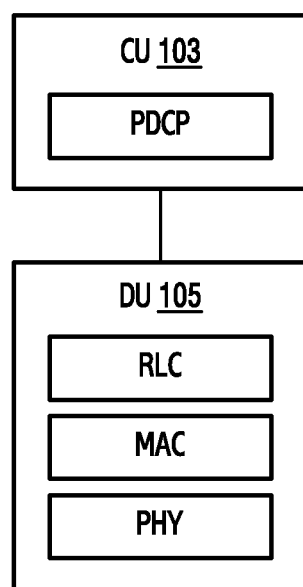
FIGS. 2A to 2E illustrate various user plane architectures, according to an embodiment as disclosed herein.

In the architecture option illustrated in the FIG. 2A, the PDCP sub layer or L2 functions such as header (de-) compression, security i.e. encryption/decryption and integrity protection, reordering, sequence numbering and timer based SDU discard is located in the CU 103. The RLC sublayer or the L2 functions such as ARQ, fragmentation/re-assembly, duplicate detection, reordering is located in the DU 105. In an embodiment, the reordering function can be located in only CU 103. The MAC sublayer or L2 functions such as mapping between the logical channels and transport channels, multiplexing/de-multiplexing of the MAC SDUs belonging to one or different logical channels into/from the TB delivered to/from the physical layer on the transport channels, scheduling information reporting, error correction through the HARQ, priority handling between the logical channels of one UE 102, the priority handling between the UEs 102 by means of dynamic scheduling, the transport format selection and padding are located in the DU 105. The PHY sublayer or L1 functions such as forward error correction (FEC), bits to symbol mapping (modulation), IFFT, CP insertion, BRS and DMRS insertion etc., is located in the DU 105.

Figure 2B:
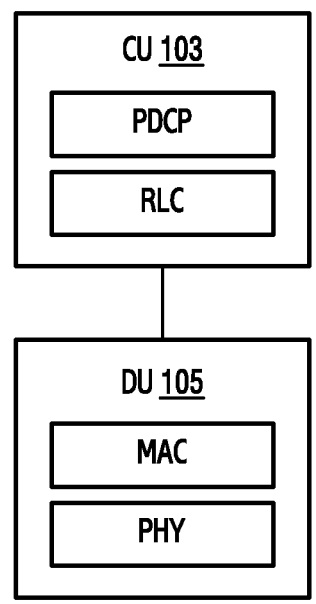

In the architecture option illustrated in the FIG. 2B, the PDCP sub layer or the L2 functions such as header (de-) compression, security i.e. encryption/decryption and integrity protection, reordering, sequence numbering and timer based SDU discard is located in the CU 103. The RLC sublayer or the L2 functions such as ARQ, fragmentation/re-assembly, duplicate detection, reordering is also located in the CU 103. The MAC sublayer or the L2 functions such as mapping between the logical channels and the transport channels, multiplexing/de-multiplexing of the MAC SDUs belonging to one or different logical channels into/from the TB delivered to/from the physical layer on the transport channels, scheduling information reporting, the error correction through the HARQ, the priority handling between the logical channels of one UE 102, the priority handling between the UE's 102 by means of dynamic scheduling, the transport format selection and padding are located in DU 105. The PHY sublayer or the L1 functions is located in the DU 105.

Figure 2C:
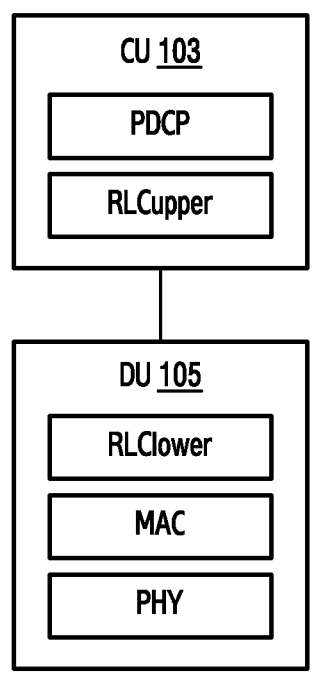

In the architecture option illustrated in the FIG. 2C, the PDCP sub layer or the L2 functions such as header (de-) compression, security i.e. encryption/decryption and integrity protection, reordering, sequence numbering and timer based SDU discard is located in the CU 103. The part of the RLC sublayer or the L2 functions such as ARQ, duplicate detection, reordering is also located in the CU 103. Part of the RLC sublayer or the L2 functions such as fragmentation/reassembly is located in the DU 105. The MAC sublayer or L2 functions such as mapping between the logical channels and the transport channels, multiplexing/de-multiplexing of the MAC SDUs belonging to one or different logical channels into/from the TB delivered to/from the physical layer on the transport channels, scheduling information reporting, error correction through the HARQ, priority handling between the logical channels of one UE 102, priority handling between the UEs 102 by means of dynamic scheduling, transport format selection and padding are also located in the DU 105. The PHY sublayer is located in the DU 105. The PHY sublayer or L1 functions is located in the DU 105.

Figure 2D:
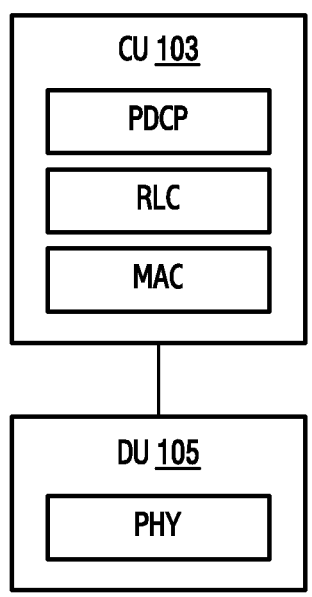

In the architecture option illustrated in the FIG. 2D, the PDCP sub layer or the L2 functions such as header (de-) compression, security, reordering, sequence numbering and timer based SDU discard is located in the CU 103. The RLC sublayer or the L2 functions such as ARQ, fragmentation/re-assembly, duplicate detection, reordering is also located in the CU 103. The MAC sublayer or L2 functions such as mapping between the logical channels and the transport channels, multiplexing/de-multiplexing of the MAC SDUs belonging to one or different logical channels into/from the TB delivered to/from the physical layer on the transport channels, scheduling information reporting, error correction through the HARQ, priority handling between the logical channels of one UE 102, priority handling between the UEs 102 by means of dynamic scheduling, transport format selection and padding are also located in the CU 103. Only the PHY sublayer or L1 functions is located in the DU 105. When the UE 102 undergo the TRP/DU 105 switching within the same NB/CU or different NB/CU then there are impacts to the user plane functions/layers depending on the user plane architecture involving the NB/CU 103 and the TRP/DU 105. The UE 102 behavior for the user plane operation depends on the architecture option described in the FIGS. 2A-2D. However, the UE 102 may not necessarily be aware of the architecture option deployed and the different actions the UE 102 needs to take for user plane operation needs to be informed to the UE 102 explicitly.

Figure 2E:
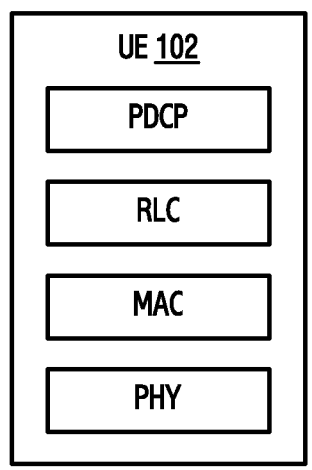

The FIG. 2E illustrates the user plane architecture at the UE 102 side regardless of the architecture at the network side.

Figure 3:
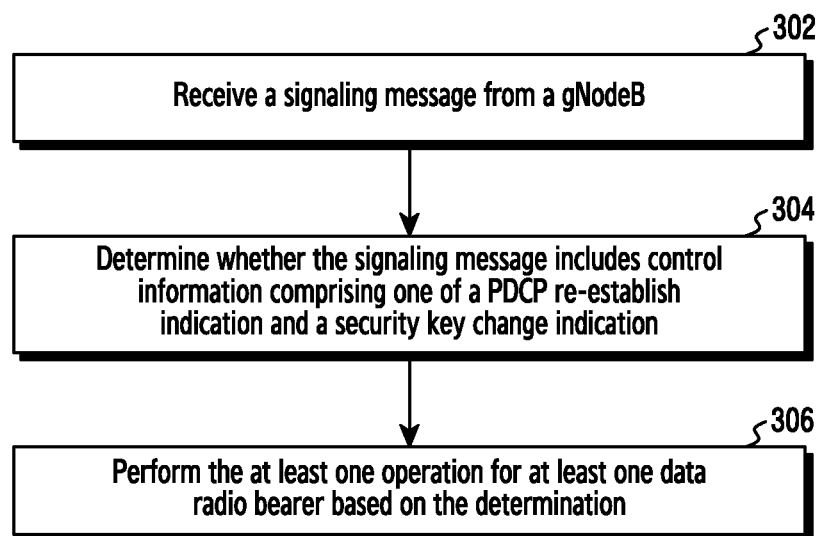
FIG. 3 is a flow diagram illustrating a method for managing, by a UE, a user plane operation in the next generation wireless communication system, according to an embodiment as disclosed herein.

FIG. 3 is a flow diagram illustrating a method for managing, by the UE 102, the user plane operation in the wireless communication system 100, according to an embodiment as disclosed herein.

At 302, the method includes receiving the signaling message from the gNodeB. The signaling message can be the RRC reconfiguration message e.g. handover command message, secondary node change message or the like. At 304, the method includes determining whether the signaling message includes the control information comprising one of the PDCP re-establish indication and the security key change indication. At 306, the method includes performing the at least one operation for at least one data radio bearer in response to the determination.

In an embodiment, performing, by the UE 102, the at least one operation for the at least one data radio bearer in response to determine that the signaling message including the control information comprising one of the PDCP re-establish indication and the security key change indication comprises: re-generating the at least one of access stratum security keys, re-setting the header compression protocol, setting the transmit state parameter to zero for the UM uplink data radio bearer, where the transmit state parameter indicates COUNT value of the next PDCP SDU to be transmitted, setting the receive state parameter to zero for the UM downlink data radio bearer, where the receive state parameter indicates COUNT value of the next PDCP SDU to be received, setting the receive state parameter to zero for the UM downlink data radio bearer, where the receive state parameter indicates COUNT value following the COUNT value associated with the PDCP Data PDU which has triggered start of reordering timer, maintaining a current value of transmit state parameter for uplink AM data radio bearer, where the transmit state parameter indicates COUNT value of the next PDCP SDU to be transmitted, maintaining a receive state parameter for an AM downlink data radio bearer, where the receive state parameter indicates COUNT value following the COUNT value associated with the PDCP Data PDU which has triggered start of reordering timer, maintaining a current value of a receive state parameter for a downlink AM data radio bearer, where the receive state parameter indicates COUNT value of the next PDCP SDU to be received; and performing one of: retransmitting all the PDCP SDUs of an AM DRB which are already associated with the PDCP SNs in ascending order of the COUNT values associated to the PDCP SDU prior to the PDCP entity re-establishment from the first PDCP SDU for which the successful delivery of the corresponding PDCP Data PDU has not been confirmed by the RLC, and transmitting all the PDCP SDUs of an AM DRB which are already associated with the PDCP SNs in ascending order of the COUNT values associated to the PDCP SDU prior to the PDCP entity re-establishment wherein the discard timer is not restarted, the header compression and the ciphering are performed for the PDCP SDUs and transmitting the PDCP SDUs of the UM DRB which are not yet transmitted and which are already associated with the PDCP SNs in the ascending order of the COUNT values associated to the PDCP SDU prior to the PDCP entity re-establishment, where the discard timer is not restarted, the header compression and the ciphering are performed for the PDCP SDUs, and the sequence number and the COUNT are re-assigned for the PDCP SDUs.

In an embodiment, performing, by the UE 102, the at least one operation for the at least one data radio bearer which is part of current UE 102 configuration in response to determine that the signaling message does not include one of the PDCP re-establish indication and the security key change indication comprises: using existing at least one of access stratum security keys, maintaining the header compression protocol, maintaining the current value of the transmit state parameter for the uplink data radio bearer, where the transmit state parameter indicates the COUNT value of the next PDCP SDU to be transmitted, maintaining the current value of the receive state parameter for the downlink data radio bearer, wherein the receive sequence number parameter indicates COUNT value of the next PDCP SDU to be received, maintaining the receive state parameter for a downlink data radio bearer, wherein the receive state parameter indicates the COUNT value following the COUNT value associated with the PDCP Data PDU which has triggered start of reordering timer and retransmitting all the PDCP Data PDUs of AM DRB previously submitted to re-establish the AM RLC entity in ascending order of the associated COUNT values from the first PDCP Data PDU for which the successful delivery has not been confirmed by the RLC.

In an embodiment, the signaling message is at least one of the handover command, the secondary node change and the bearer change.

In an embodiment, the operation is performed by the UE 102 for each data radio bearer which is part of current UE 102 configuration.

In an embodiment, the operation is performed by the UE 102 for at least one data radio bearer indicated in the signaling message.

In an embodiment, the PDCP re-establish indication is indicated by including a one bit indicator in the signaling message.

In an embodiment, the security key change indication is indicated by including a one bit key change indicator in the signaling message.

In an embodiment, the security key change indication is indicated by including security information in the signaling message.

In an embodiment, performing, by the UE 102, one or more operations for at least one data radio bearer in response to determining that the signaling message comprising the control information includes one of the PDCP re-establish indication and the security key change indication comprises: re-generating the one or more access stratum security keys, re-establishing a PDCP entity for the AM data radio bearer, re-establishing the PDCP entity for the UM data radio bearer, re-establishing the RLC entity for the AM data radio bearer, re-establishing the RLC entity for the UM data radio bearer, and re-setting the MAC entity.

In an embodiment, performing, by the UE 102, one or more operations for at least one data radio bearer in response to determining that signaling message comprising the control information does not include one of the PDCP re-establish indication and the security key change indication comprises: using the existing one or more access stratum security keys, initiating the data recovery procedure for the AM data radio bearer, re-establishing the RLC entity for the AM data radio bearer, re-establishing the RLC entity for the UM data radio bearer, and re-setting the MAC entity.

In an embodiment, re-establishing the PDCP entity of the data radio bearer comprises: setting the transmit state parameter to zero for the UM data radio bearer, where the transmit state parameter indicates the COUNT value of the next PDCP SDU to be transmitted, setting the receive state parameter to zero for the UM data radio bearer, wherein the receive state parameter indicates the COUNT value of the next PDCP SDU to be received, setting the receive state parameter to zero for the UM data radio bearer, wherein the receive state parameter indicates the COUNT value following the COUNT value associated with the PDCP Data PDU which has triggered start of reordering timer, re-setting the header compression protocol, retransmitting all the PDCP SDUs of a AM data radio bearer which are already associated with PDCP SNs in ascending order of the COUNT values associated to the PDCP SDU prior to the PDCP entity re-establishment from the first PDCP SDU for which the successful delivery of the corresponding PDCP Data PDU has not been confirmed by RLC, and transmitting each PDCP SDU of a UM DRB and AM DRB already associated with a PDCP SN but for which a corresponding PDU has not previously been submitted to a lower layer in ascending order of the COUNT value associated to the PDCP SDU prior to the PDCP re-establishment by performing the header compression and ciphering for the PDCP SDUs of the AM and UM DRBs, re-assigning sequence number and COUNT value for the PDCP SDUs of UM DRBs and without restarting the discard timer for the PDCP SDUs of the AM and UM DRBs.

In an embodiment, initiating the data recovery procedure for an AM data radio bearer comprises: retransmitting all the PDCP data PDUs previously submitted to re-established AM RLC entity in ascending order of the associated COUNT values from the first PDCP Data PDU for which the successful delivery has not been confirmed by the RLC; and transmitting a PDCP status report if the PDCP status report is requested by the gNodeB, where a request for the PDCP status report is included in signaling message received from the gNodeB.

In an embodiment, the header compression protocol is reset by receiving a request from the gNodeB.

In an embodiment, performing, by the UE 102, one or more operations for the at least one data radio bearer in response to determining that the signaling message comprising the control information includes the PDCP re-establish indication comprises: re-generating the one or more access stratum security keys, re-establishing the PDCP entity for the AM data radio bearer, re-establishing the PDCP entity for the UM data radio bearer, re-establishing the RLC entity for the AM data radio bearer, re-establishing the RLC entity for the UM data radio bearer, and re-setting the MAC entity.

In an embodiment, performing, by the UE 102, one or more operations for the at least one data radio bearer in response to determining that the signaling message does not include the PDCP re-establish indication and the security key change indication comprises: using the existing one or more access stratum security keys, initiating the data recovery procedure for the AM data radio bearer, re-establishing the RLC entity for the AM data radio bearer, re-establishing the RLC entity for the UM data radio bearer, and re-setting the MAC entity.

In an embodiment, performing, by the UE 102, one or more operations for the at least one data radio bearer in response to determining that the signaling message does not include the PDCP re-establish indication and includes the security key change indication comprises: re-generating the one or more access stratum security keys, re-establishing the RLC entity for the AM data radio bearer, re-establishing the RLC entity for the UM data radio bearer, re-setting the MAC entity, retransmitting all the PDCP SDUs of a AM data radio bearer which are already associated with PDCP SNs in ascending order of the COUNT values associated to the PDCP SDU prior to receiving the security key change indication from the first PDCP SDU for which the successful delivery of the corresponding PDCP Data PDU has not been confirmed by RLC, and transmitting each PDCP SDU of a UM DRB and AM DRB already associated with a PDCP SN but for which a corresponding PDU has not previously been submitted to a lower layer in ascending order of the COUNT value associated to the PDCP SDU prior to receiving the security key change indication wherein ciphering is performed for the PDCP SDUs and discard timer is not started. The security change indication can be indicated by including the security configuration or parameters in signaling message.

Figure 4:
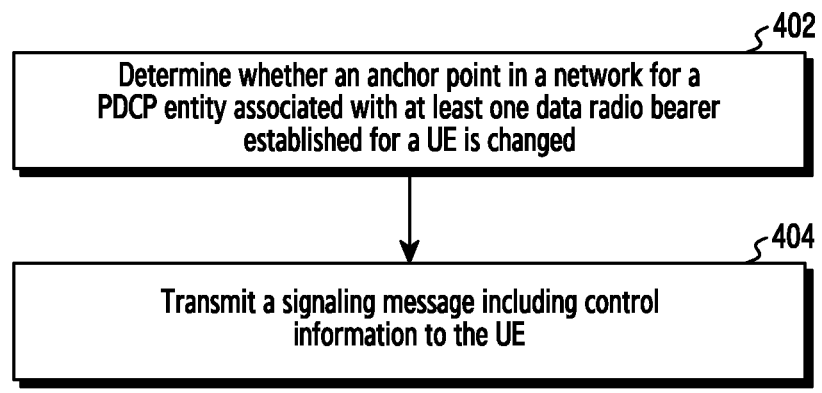
FIG. 4 is a flow diagram illustrating a method for managing, by a gNodeB, the user plane operation in the next generation wireless communication system, according to an embodiment as disclosed herein.

FIG. 4 is a flow diagram illustrating a method for managing, by the gNodeB, the user plane operation in the wireless communication system 100, according to an embodiment as disclosed herein.

At 402, the method includes determining whether the anchor point in the network for the PDCP entity associated with the at least one data radio bearer established for the UE 102 is changed. At 404, the method includes transmitting the signaling message including the control information to the UE 102. The control information includes one of the PDCP re-establish indication and the security key change indication in response to the anchor point in the network for the PDCP entity associated with at least one data radio bearer established for the UE 102 is changed. The signaling message can be the RRC reconfiguration message e.g. handover command message, secondary node change message, bearer type change message or the like. In an embodiment, if the anchor point in the network for the PDCP entity associated with the at least one data radio bearer established for the UE 102 is not changed but the security key refresh is required then the gNodeB transmits the signaling message including one of PDCP re-establish indication and the security key change indication.

In an embodiment, if the anchor point in the network for the PDCP entity associated with the at least one data radio bearer established for the UE 102 is changed then the gNodeB transmits the signaling message including the PDCP re-establish indication. If the anchor point in the network for the PDCP entity associated with the at least one data radio bearer established for the UE 102 is not changed and the security key refresh is also not needed then the gNodeB transmits the signaling message without PDCP re-establish indication and security key change indication. If the anchor point in the network for the PDCP entity associated with the at least one data radio bearer established for the UE 102 is not changed and the security key refresh is needed then the gNodeB transmits the signaling message with security key change indication but without PDCP re-establish indication.

The UE 102 can be configured to operate in a dual connectivity (DC) mode of operation, where the UE 102 maintains the RRC connection with a serving cell from the master node (MN) and the UE 102 can be configured with one or more serving cells from the secondary node (SN) for addition data throughput. The DRB established on the serving cell of the MN has the PDCP anchor point terminated at the MN and such DRB is referred as MCG DRB. The DRB established on the serving cell of the SN has the PDCP anchor point terminated at the SN and such that the DRB is referred as the SCG DRB. The UE 102 can be configured with the split DRB wherein the PDCP PDUs can be transmitted through the two RLC entities established in the MN and SN for that DRB. The PDCP anchor point of such split DRB can be configured to be terminated either at the MN or SN and it is decided by the MN. If the PDCP termination point of the split DRB is MN then the DRB is referred as MCG Split DRB. If the PDCP termination point of the split DRB is SN then the DRB is referred as SCG Split DRB. For the LTE and NR interworking based on DC i.e. EN-DC mode of operation where the MN is LTE eNB and SN is NR gNB, the MCG DRB can be configured with either LTE PDCP or NR PDCP whereas the split DRB (regardless of the PDCP termination point) and SCG DRB is configured for NR PDCP.

If the MCG DRB is configured with LTE PDCP then for performing the bearer type reconfiguration to the SCG or Split DRB, the PDCP version is changed from the LTE PDCP to the NR PDCP for the MCG DRB through the handover procedure which involves PDCP re-establishment. During the UE mobility from the legacy LTE to Rel-15 LTE node, for EN-DC capable UE the PDCP version change of MCG DRB from LTE PDCP to NR PDCP can be supported through handover procedure.

From the UE 102 perspective, there are only three bearer types i.e. MCG DRB, SCG DRB and Split DRB. The split DRB can either terminate at the MN or terminates at the SN based on the MN decision. In the EN-DC, the network can configure the split bearer with the following configuration:

Split Bearer: The NR PDCP container+LTE configurations on the RLC, the MAC and the physical layers+the NR configuration container on the NR RLC, the MAC and physical layers, etc.

Split bearer whose PDCP termination point is at the MN can be termed as the split bearer terminated at the MN. The split bearer whose PDCP termination point is at the SN can be termed as the split bearer terminated at the SN. There are three options for the security keys handling in the EN-DC a. Security key per PDCP termination point i.e. 2 security keys b. Separate security key for MCG, Split and SCG bearer i.e. 3 security keys c. Security key per DRB In option, the UE 102 uses two set of keys i.e. one for all MCG DRBs and MCG-anchored split DRBs and another one for all SCG DRBs and SCG-anchored split DRBs. This is similar to Rel-12 LTE DC. In case of separate security key per network termination point, the UE 102 based on the security keys can make it out whether the split bearer terminates at the MN or terminates at the SN. In this case, the UE 102 will be aware of location of the PDCP anchor point i.e. whether the split bearer is terminated at the MN or the SN.

When the 2 security key solution is applied, there is no need to do MAC reset for the MCG DRB to/from the MCG split DRB and the SCG DRB to/from the SCG Split DRB type change. This is because the PDCP termination point will not change in these bearer type transitions and hence the security key will also not change. The security key will change for the MCG to/from SCG and MCG to/from SCG Split bearer type change or when there is handover the PCell in the MCG or when there is the SN change. However this is also applicable for option b and option c for these bearer type changes.

For option, the UE 102 based on the indicated security key for the split bearer can make out termination point of the split bearer. For option a), the MAC reset is not needed during the MCG to/from the MCG split and SCG to/from SCG Split bearer type change. For option b), the UE 102 uses different key per bearer type i.e. three separate keys for the MCG, the SCG, and Split bearers. As in this case, the split bearer terminates at MN or SN can use separate keys from the MCG and SCG bearers, so in this option, the split bearer termination point is transparent to the UE 102. The split bearer termination point is transparent to the UE for the option when security key is per DRB i.e. option c). With the security key per bearer type (option b) or Security key per DRB (option c) for the configured split bearer the UE 102 cannot make out termination point of the split bearer. In LTE-NR interworking, the bearer type change can be supported for MCG to/from the MCG split and SCG to/from the SCG Split. The option b and option c brings additional complexity to handle these bearer type changes as follows:

i) during the bearer type, changes keys will always have to be changed;

ii) the key change for the bearer type changes occurs even when the PDCP termination point has not changed (according to security principle key should be changed when PDCP termination point changes);

iii) if the keys are changed then the MAC reset is needed which can cause the impact on the other bearers also.

When option b and option c is applied then to avoid MAC reset special handling is needed to ensure that the data on other bearer is not impacted. Such special handling bring additional complexity which can be completely avoided if (option a) is applied. Option b and Option c requires MAC reset during MCG to/from MCG split and SCG to/from SCG Split bearer type change even when PDCP termination point is not changed. To avoid MAC reset special handling is required which brings additional complexity. The point of PDCP termination point for split bearer is transparent to the UE 102 when the option b and option c is applied does not really bring benefits for the UE 102 in terms of bearer type change handling or reducing complexity. Option "a" offers the same level of security protection as the options "b" and "c". In EN-DC, the security key per PDCP termination point i.e. 2 security keys can be supported.

The bearer type change from the MCG DRB (NR PDCP configured) to the SCG DRB involves the PDCP anchor point in the network for the PDCP entity associated with the MCG DRB to be changed from the MN to the SN. Since the security key used in the SN is different from the security key used in the MN, the change of the PDCP anchor point involves transmitting the signaling message including the control information to the UE 102. The control information includes one of the PDCP re-establish indication and the security key change indication in response to the change of the anchor point in the network for the PDCP entity associated with MCG DRB. The signaling message can be a bearer type change message. The signaling message is triggered for the bearer type change from the SCG DRB to the MCG DRB, where the MCG PDCP entity if configured as NR PDCP entity. The EN-DC operation should support the one step (direct) bearer type change between MCG DRB to/from split DRB and MCG DRB to/from SCG DRB, when the MCG DRB is configured with NR PDCP.

The bearer type change from MCG DRB (NR PDCP configured) to/from MCG Split DRB and SCG DRB to/from SCG Split DRB does not involve the PDCP anchor point change in the network. Since the security key is same during these bearer type changes the PDCP is not re-established during these bearer type changes but PDCP recovery procedure may be triggered for the bearer type change from split DRB to MCG/SCG DRB. The security key is not changed since there is no change of the PDCP anchor point it involves transmitting the signaling message including the control information to the UE 102. The control information does not includes one of the PDCP re-establish indication and the security key change indication in response to the bearer type change in the network for the PDCP entity associated with MCG DRB when reconfigured as MCG split DRB and vice-versa. Same is case for SCG DRB reconfiguration to SCG Split DRB and vice-versa.

The bearer type change from MCG DRB (NR PDCP configured) to SCG Split DRB involves the PDCP anchor point in the network for the PDCP entity associated with the MCG DRB to be changed from the MN to the SN. This can be achieved either with a direct change or a two-step change wherein the MCG DRB is first changed to SCG DRB and subsequently the SCG DRB is reconfigured as SCG Split DRB. Regardless of direct change or two-step change, since the security key used in the SN is different from the security key used in the MN, the change of the PDCP anchor point involves transmitting the signaling message including the control information to the UE 102. The control information includes one of the PDCP re-establish indication and the security key change indication in response to the change of the anchor point in the network for the PDCP entity associated with MCG DRB.

Handling of SCG DRB during S-KgNB (i.e. security key used in SN) is changed due to key refresh or SN change will result in SCG PDCP, SCG RLC re-establishment and SCG MAC reset. Split DRB will have one PDCP entity which will be either MCG PDCP entity or SCG PDCP entity based on termination point of split bearer. Apart from this it will also have MCG RLC/MAC entity and SCG RLC/MAC entity.

For SCG split DRB as PDCP termination point is at SN so UE will be configured with SCG PDCP entity. When S-KgNB is changed due to key refresh or SN change then the SCG PDCP/RLC need to be re-established and SCG MAC needs to be reset. Apart from this MCG RLC entity associated with this split bearer need to be re-established and MCG MAC need to be reset to discard the data with old keys.

For MCG split DRB as PDCP termination point is at MN so UE will be configured with MCG PDCP entity. When SN is changed and UE is configured with MCG split DRB then there will be no impact on MCG PDCP/RLC/MAC entity but corresponding SCG RLC/MAC entity will be impacted and need to be re-establish and reset. In this case only reset/re-establish the SCG RLC and MAC entity associated with MCG split DRB but do not re-establish the MCG PDCP entity so there is no way for recovery of lost data which happen due to SCG RLC re-establishment procedure. There is need to introduce the PDCP data recovery procedure for the MCG split DRB during SN change procedure.

Centralized deployment consist of CU, DU, and TRPs (Transmission Reception Point) nodes. One of possible type of mobility procedure due to this split architecture is intra CU—inter DU handover. In this case there will be no change in CU entity but handover can occur between two DU entities serving same CU node. During Intra CU-inter DU HO, there is no need of PDCP re-establishment as PDCP termination point does not change but it is required to perform re-establishment and Reset for RLC and MAC entity as RLC and MAC entity at NW side changes. During inter CU handover, as PDCP termination point changes then all L2 entities need to be re-established and reset. In EN-DC, for SCG DRB and split DRB, when SN does not change during handover then SCG RLC is re-established and SCG MAC is reset. In EN-DC, if bearer type change occurs through handover or SN change, then UE needs to follow the same rule as applicable during handover or SN change for bearer type change as it may involves key change or PDCP anchor point change or PDCP version change. SN change is a synchronous SCG reconfiguration procedure including reset/re-establishment of layer 2 and, if SCG DRBs are configured, refresh of security. If Bearer type change happens through handover procedure then MCG bearer, split bearer and SCG bearer, MCG/SCG PDCP/RLC should be re-established and MCG/SCG MAC should be reset. If bearer type change happens through SN change procedure then SCG PDCP re-established, SCG RLC re-established and SCG MAC is reset. Bearer type change through handover or SN change may cause data interruption in service. There are few bearer type change which does not involve change in PDCP termination point or keys. Those bearer type changes can be supported without mobility procedure i.e. handover or SN change procedure. Consider the case if UE is supporting Security key per PDCP termination point i.e. 2 security key then bearer type change between MCG and MCG split bearer does not involve any key or PDCP termination point change. In this case there is no need of any synchronous reconfiguration procedure as PDCP termination point does not change. This type of bearer change can be supported without mobility procedure (i.e. no handover) as result there will be no impact of data on other bearers. So no interruption in user plane and latency can be reduced. In case there is no change in MN/SN then bearer type change should be possible without mobility procedure. Bearer type change without mobility procedure should only be possible when keys, PDCP version and PDCP termination point does not change. The same is true for bearer type change between SCG DRB and SCG split DRB.

MCG DRB to/from SCG DRB type change option involves change in keys and PDCP termination point. During MCG to SCG bearer type change when MCG RLC entity is reconfigure to SCG RLC entity then corresponding mapping between MCG RLC entity and MCG MAC will be released and new mapping will be created between SCG RLC entity and SCG MAC entity. The same is applicable during SCG to MCG bearer type change. In this case although MCG and SCG MAC entity will have data with old keys but there is no need to reset MCG MAC and SCG MAC, as corresponding logical channel mapping will be released due to release or reconfiguration of the RLC entity. As a result old data will automatically get discarded by the MAC. Similarly during MCG split bearer to MCG or SCG split bearer to SCG bearer type change the corresponding logical channel will be released so there is no need to do MAC reset.

When bearer type change occurs between MCG DRB to/from SCG split DRB then it involves key change as well as PDCP termination point change. As a result of this MCG MAC will have data with old set of keys as corresponding mapping between RLC entity and MAC entity will not be released, due to this it is required to reset the MCG MAC entity. Bearer type change between MCG split DRB and MCG DRB or SCG split DRB and SCG DRB can be supported without re-establishing the PDCP and RLC entity and without resetting the MAC entity. This is valid for the case when there is no change in keys or PDCP termination point or PDCP version change. NW can support such bearer type change without handover or SN change procedure. There is no need to re-establish and reset the L2 entities when bearer type change occurs without mobility procedure. EN-DC operation should support the one step (direct) bearer type change between MCG DRB to/from MCG split DRB without using the handover procedure. EN-DC operation should support the one step (direct) bearer type change between SCG DRB to/from SCG split DRB without using the handover procedure or SN change procedure.

Bearer type change between the MCG and the SCG involves the key change and the PDCP termination point change so there is need of the PDCP kind of re-establishment procedure for the bearer change between MCG and SCG. There is no need of reset of the MAC entity for MCG to/from SCG bearer type change. The MCG to/from SCG bearer type change can also cause change in version of RLC i.e. LTE RLC to/from NR RLC. During the MCG to the SCG bearer type change, the UE 102 need to do the RLC re-establishment procedure as it may have buffered data due to re-ordering functionality in LTE RLC. The UE 102 can do the RLC re-establishment for the MCG entity and then reconfigure the MCG RLC entity to SCG RLC entity. During SCG to MCG bearer type change as NR RLC does not support reordering functionality so there is no need to do RLC re-establishment. The UE 102 can simply release SCG RLC entity and established the MCG RLC entity. The EN-DC operation should support the one step (direct) bearer type change between MCG to/from SCG bearer with the PDCP re-establishment kind procedure without using the handover procedure or SN change procedure. For SCG to MCG bearer type change, RLC re-establishment is not required and bearer type change can be supported by releasing the SCG RLC entity and establishing the MCG RLC entity. Bearer type change between MCG and SCG split DRB involves key change and PDCP termination point change so there is need of PDCP kind of re-establishment procedure. The MAC reset is required for bearer type change between MCG to/from SCG split DRB.

The embodiments of the user plane operation for various architectures and mobility scenario are further discussed below.

1A. Mobility Scenario: In the disclosure, the user plane operation for various architectures in the scenario when the UE 102 moves/switches from one i.e. source DU/source TRP/source cell to another i.e. target DU/target TRP/target cell in same CU/NB (i.e. CU/NB of source and target DU/TRP/cell is same) is as follows:

Architecture Option 1: When the UE 102 moves/switches from one DU/TRP/cell to another DU/TRP/cell in same CU/NB, the proposed user plane operation (for each DRB) for the architecture option 1 (illustrated in the FIG. 2A) is as follows:

A. In an embodiment, where the PDCP uses the state variables or parameters Next_PDCP_TX_SN and Next_PDCP_RX_SN, the value of Next_PDCP_TX_SN and Next_PDCP_RX_SN is maintained (i.e. it is not reset to zero) for each DRB which is part of current UE 102 configuration. Next_PDCP_TX_SN indicates PDCP sequence number of the next PDCP SDU to be transmitted. Next_PDCP_RX_SN indicates PDCP sequence number of the next PDCP SDU to be received. In another embodiment wherein the PDCP uses the state variables or parameters TX_NEXT and RX_NEXT, the value of TX_NEXT and RX_NEXT is maintained (i.e. it is not reset to zero) for each DRB which is part of current UE 102 configuration. TX_NEXT indicates the COUNT value of the next PDCP SDU to be transmitted. RX_NEXT indicates the COUNT value of the next PDCP SDU to be received. The COUNT value is composed of a HFN and the PDCP SN. X MSBs of COUNT indicates HFN and remaining bits of COUNT indicates PDCP Sequence number (SN).

B. In an embodiment, the PDCP uses the state variables or parameters TX_HFN and RX_HFN, the value of TX_HFN and RX_HFN is also maintained i.e. it is not reset to zero for each radio bearer which is part of current UE 102 configuration. TX_HFN indicates a hyper frame number value for generation of a counter value used for the PDCP PDUs to be transmitted. RX_HFN indicates a hyper frame number value for generation of a counter value used for the received PDCP PDUs.

C. In an embodiment, where the PDCP uses the state variables or parameters RX_REORD, the value of RX_REORD is also maintained i.e. it is not reset to zero. RX_REORD indicates COUNT value following the COUNT value associated with the PDCP Data PDU which has triggered start of reordering timer.

D. The security keys are not refreshed (i.e. the UE 102 does not generate new security keys for ciphering and/or integrity protection). The UE 102 uses the already established access stratum (AS) security keys for each data radio bearer which is part of current UE 102 configuration.

E. The UE 102 sends the SN status report (e.g., PDCP SN status) if the SN status report is configured by the RRC. The configuration to send the status report is per radio bearer. The network (i.e. NB/CU 103) indicates whether the UE 102 needs to send the SN status report or not. In an embodiment, this is applicable only for the AM data radio bearers.

F. The NB/CU 103 may send the SN status report (e.g., PDCP SN status) to the UE 102. The UE 102 does not need to wait for the SN status report to resume the UL transmission. In an embodiment, this is applicable only for the AM data radio bearers.

G. For the AM data radio bearer, the UE 102 re-transmits in the target DU/TRP/cell all uplink PDCP SDUs starting from the first PDCP SDU following the last consecutively confirmed PDCP SDU i.e. the oldest PDCP SDU that has not been acknowledged (e.g., at RLC) in the source DU/TRP/cell, excluding the PDCP SDUs for which the reception is acknowledged through the PDCP SN based reporting by the target DU/TRP/cell.

H. The CU/NB 103 re-transmits the PDCP SDUs that has not been successfully transmitted in the source DU/TRP/cell, with the exception of PDCP SDUs for which the reception is acknowledged through the PDCP SN based reporting by the UE 102. In an embodiment, this is applicable only for AM radio bearers.

I. The PDCP PDUs stored in the PDU reordering buffer are deciphered and decompressed and kept in the PDCP, associated with the COUNT.

J. Header compression protocol (ROHC) (if the ROHC is configured for the DRB) is not reset.

K. The RLC entity is reset/re-established for each data radio bearer which is part of current UE 102 configuration If RLC entity being reset/re-established is a Transmitting TM RLC entity, it discards all RLC SDUs. If RLC entity being reset/re-established is a receiving UM RLC entity, it performs the following when possible, reassembles RLC SDUs from the UMD PDUs with SN<VR (UH) (VR (UH) state variable holds the value of the SN following the SN of the UMD PDU with the highest SN among received UMD PDUs, and it serves as the higher edge of the reordering window), remove RLC headers when doing so and deliver all reassembled RLC SDUs to upper layer in ascending order of the RLC SN, if not delivered before;

discard all remaining UMD PDUs.

If RLC entity being reset/re-established is a Transmitting UM RLC entity, it discards all RLC SDUs. If RLC entity being reset/re-established is a AM RLC entity, when possible, reassemble RLC SDUs from any byte segments of AMD PDUs with SN<VR (MR) (VR (MR) equals VR(R)+AM Window Size, and it holds the value of the SN of the first AMD PDU that is beyond the receiving window and serves as the higher edge of the receiving window. VR(R) holds the value of the SN following the last in-sequence completely received AMD PDU, and it serves as the lower edge of the receiving window) in the receiving side, remove RLC headers when doing so and deliver all reassembled RLC SDUs to upper layer in ascending order of the RLC SN, if not delivered before;

discard the remaining AMD PDUs and byte segments of AMD PDUs in the receiving side;

discard all RLC SDUs and AMD PDUs in the transmitting side; discard all RLC control PDUs.

Each RLC entity being reset/re-established stops and resets all timers and resets all state variables to their initial values.

L. The MAC entity is reset or re-established: The MAC entity is configured to: initialize Bj for each logical channel to zero; stop (if running) all timers; consider all timeAlignmentTimers as expired and perform the corresponding actions; set the NDIs for all uplink HARQ processes to the value 0; stop, if any, ongoing RACH procedure; discard explicitly signalled ra-PreambleIndex and ra-PRACH-MaskIndex, if any; flush Msg3 buffer; cancel, if any, triggered Scheduling Request procedure; cancel, if any, triggered Buffer Status Reporting procedure; cancel, if any, triggered Power Headroom Reporting procedure; flush the soft buffers for all DL HARQ processes; for each DL HARQ process, consider the next received transmission for the TB as the very first transmission; release, if any, Temporary C-RNTI. In an embodiment, timeAlignmentTimers are considered as expired based on indication from the network. The C-RNTI can be maintained in one embodiment unless explicitly released indication received from the network or unless a new C-RNTI is received from the network.

M. If the source DU/TRP/cell and the target DU/TRP/cell belongs to same timing advance group (TAG), Random Access (RA) is not performed by the UE 102 in the target DU/TRP/cell. The network can indicate whether the UE 102 should perform RA or not.

In an embodiment, for architecture option 1 (i.e., FIG. 2A), if there is an explicit indication to the UE 102 to re-establish the PDCP in the handover command (i.e. RRC reconfiguration message with mobility control information). This is shown in the FIGS. 5A and 5B. The RLC entity is reset/re-established for each data radio bearer which is part of current UE 102 configuration on receiving the handover command. The MAC entity is also reset or re-established. In an embodiment, for the UM data radio bearers (i.e. data radio bearers configured with the RLC in the UM mode), wherein the PDCP sublayer uses parameters or variables Next_PDCP_TX_SN, Next_PDCP_RX_SN, TX_HFN and RX_HFN, the UE 102 resets the parameters or variables Next_PDCP_TX_SN, Next_PDCP_RX_SN, TX_HFN and RX_HFN. In an alternate embodiment, for the UM data radio bearers (i.e. data radio bearers configured with the RLC in the UM mode), wherein the PDCP sublayer uses parameters or variables TX_NEXT, RX_NEXT and RX_REORD, the UE 102 resets the parameters or variables TX_NEXT, RX_NEXT and RX_REORD. For the UM data radio bearers the ROHC is reset (ROHC may not be reset in alternate embodiment and whether to reset or not may be indicated in RRC reconfiguration message). In an embodiment, for the AM data radio bearers (i.e. data radio bearers configured with RLC in the AM mode) wherein the PDCP sublayer uses parameters or variables Next_PDCP_TX_SN, Next_PDCP_RX_SN, TX_HFN and RX_HFN, the UE 102 maintains (i.e. not reset to zero) the values of parameters or variables: Next_PDCP_TX_SN, Next_PDCP_RX_SN, TX_HFN and RX_HFN. In an alternate embodiment for the AM data radio bearers (i.e. data radio bearers configured with RLC in the AM mode), wherein the PDCP sublayer uses parameters or variables TX_NEXT, RX_NEXT and RX_REORD the UE 102 maintains (i.e. not reset to zero) the values of parameters or variables: TX_NEXT, RX_NEXT and RX_REORD. For the AM data radio bearers (i.e. DRBs configured with RLC in the AM mode), the ROHC is reset. The access stratum security keys for user plane and control plane is refreshed. The UE 102 sends the PDCP SN status report if the PDCP SN status report is configured by the RRC. For AM data radio bearers the UE 102 re-transmits all uplink PDCP SDUs starting from the first PDCP SDU following the last consecutively confirmed PDCP SDU i.e. the oldest PDCP SDU that has not been acknowledged (e.g., at the RLC), excluding the PDCP SDUs for which the reception was acknowledged. For UM DRBs, for each PDCP SDU already associated with a PDCP SN but for which a corresponding PDU has not previously been submitted to lower layers (i.e. RLC), consider these PDCP SDUs as received from upper layer, perform transmission of the PDCP SDUs in ascending order of the COUNT value associated to the PDCP SDU prior to the PDCP re-establishment without restarting the discard timer. Each of these PDCP SDUs will be re-assigned PDCP SN. They will be ciphered (and/or integrity protected) and header compressed again. For AM DRBs, for each PDCP SDU already associated with a PDCP SN but for which a corresponding PDU has not previously been submitted to lower layers (i.e. RLC), perform transmission of the PDCP SDUs in ascending order of the COUNT value associated to the PDCP SDU prior to the PDCP re-establishment. Each of these PDCP SDUs is not re-assigned PDCP SN. However, they will be ciphered (and/or integrity protected) and header compressed again. It is to be noted that similar indication (explicit indication to the UE 102 to re-establish PDCP) can be there in the RRC reconfiguration message for secondary node change when the UE 102 is configured with dual or multi connectivity. Similar indication can also be there in the RRC reconfiguration message for the bearer type change.

Figure 5A:
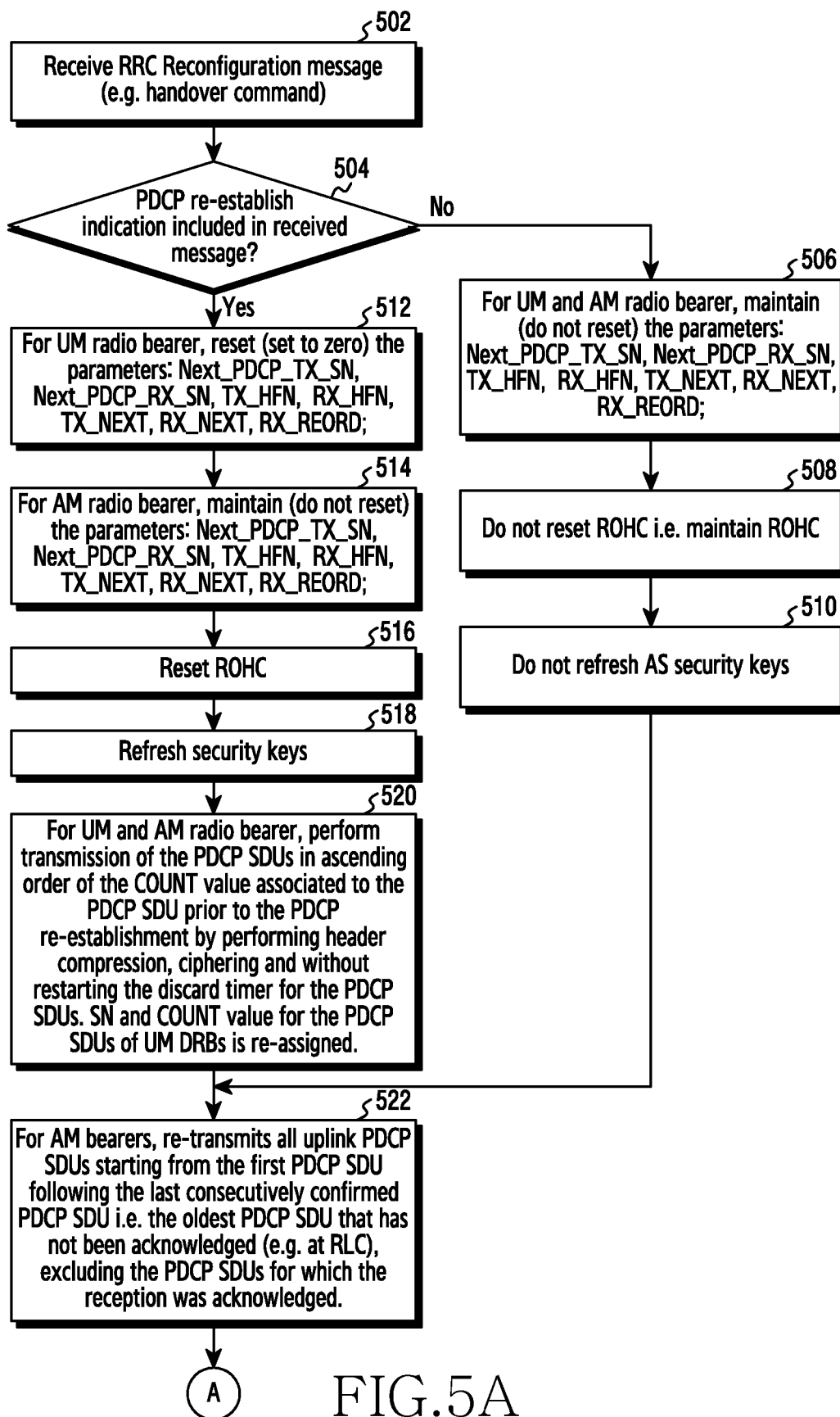
FIGS. 5A and 5B are an example operation performed by the UE based on PDCP re-establish indication information, according to an embodiment as disclosed herein.
Figure 5B:
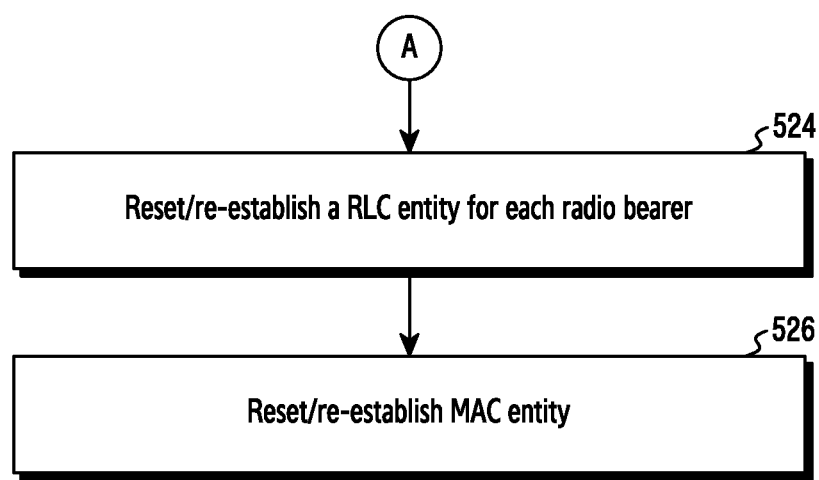

In an embodiment, for architecture option 1 (i.e., FIG. 2A) when there is no explicit indication (or explicit indication indicates do not provide the PDCP re-establish indication or explicit indication indicates UE to continue PDCP) to the UE 102 to re-establish the PDCP in the handover command (i.e. RRC reconfiguration message with the mobility control information), the PDCP entity is not re-established for each DRB which is part of current UE 102 configuration on receiving the handover command. This is shown in FIGS. 5A and 5B. The RLC is reset/re-established for each DRB which is part of current UE 102 configuration on receiving the handover command. The MAC entity is also reset or re-established. In an embodiment, for the UM as well as AM data radio bearers wherein the PDCP sublayer uses parameters or variables Next_PDCP_TX_SN, Next_PDCP_RX_SN, TX_HFN and RX_HFN, the UE 102 maintains (i.e. not reset to zero) the values of the parameters or variables Next_PDCP_TX_SN, Next_PDCP_RX_SN, TX_HFN and RX_HFN. In an alternate embodiment, for the UM as well as AM data radio bearers wherein the PDCP sublayer uses parameters or variables TX_NEXT, RX_NEXT and RX_REORD, the UE 102 maintains (i.e. not reset to zero) the values of the parameters or variables TX_NEXT, RX_NEXT and RX_REORD. For AM as well as UL DRBs, the ROHC is not reset. The access stratum security keys for user plane and control plane is not refreshed. The UE 102 may send the PDCP SN status report if configured by the RRC.

Further, for the AM data radio bearers the UE 102 re-transmits all uplink PDCP SDUs starting from the first PDCP SDU following the last consecutively confirmed PDCP SDU i.e. the oldest PDCP SDU that has not been acknowledged (e.g., at RLC), excluding the PDCP SDUs for which the reception was acknowledged. In other word, UE perform retransmission of all the PDCP Data PDUs previously submitted to re-established AM RLC entity in ascending order of the associated COUNT values from the first PDCP Data PDU for which the successful delivery has not been confirmed by lower layers (i.e. RLC).

FIGS. 5A and 5B are an example operations performed by the UE 102 based on the PDCP re-establish indication information, according to an embodiment as disclosed herein. As shown in the FIGS. 5A and 5B, at step 502, the UE 102 receives the RRC Reconfiguration Message. At 504, the UE 102 determines whether that PDCP Re-establish Indication is included in the received RRC reconfiguration Message or not. If the UE 102 determines that PDCP re-establish indication is not included in the received RRC reconfiguration Message then in an embodiment at 506, for the UM as well as AM data radio bearers wherein the PDCP sublayer uses parameters or variables Next_PDCP_TX_SN, Next_PDCP_RX_SN, TX_HFN and RX_HFN, the UE 102 maintains (i.e. not reset to zero) the values of the parameters or variables Next_PDCP_TX_SN, Next_PDCP_RX_SN, TX_HFN and RX_HFN. Alternatively at 506, for the UM as well as AM data radio bearers wherein the PDCP sublayer uses parameters or variables TX_NEXT, RX_NEXT and RX_REORD, the UE 102 maintains (i.e. not reset to zero) the values of the parameters or variables TX_NEXT, RX_NEXT and RX_REORD. At 508, the UE 102 does not reset the ROHC and at 510, the UE 102 does not refresh the AS security keys.

If the UE 102 determines that the PDCP Re-establish Indication is included in the received message then in an embodiment at 512, for the UM data radio bearers wherein the PDCP sublayer uses parameters or variables Next_PDCP_TX_SN, Next_PDCP_RX_SN, TX_HFN and RX_HFN, the UE 102 resets the parameters or variables Next_PDCP_TX_SN, Next_PDCP_RX_SN, TX_HFN and RX_HFN. In an alternate embodiment, at 512, for the UM data radio bearers wherein the PDCP sublayer uses parameters or variables TX_NEXT, RX_NEXT and RX_REORD, the UE 102 resets the parameters or variables TX_NEXT, RX_NEXT and RX_REORD. In an embodiment at 514, for AM data radio bearers wherein the PDCP sublayer uses parameters or variables Next_PDCP_TX_SN, Next_PDCP_RX_SN, TX_HFN and RX_HFN, the UE 102 maintains (i.e. not reset to zero) the values of the parameters or variables Next_PDCP_TX_SN, Next_PDCP_RX_SN, TX_HFN and RX_HFN. In an alternate embodiment, at 514, for the AM data radio bearers wherein the PDCP sublayer uses parameters or variables TX_NEXT, RX_NEXT and RX_REORD, the UE 102 maintains (i.e. not reset to zero) the values of the parameters or variables TX_NEXT, RX_NEXT and RX_REORD.

At 516, the UE 102 resets the ROHC and at 518, the UE 102 refreshes the security keys.

At 520, for the UM radio bearer, for each PDCP SDU already associated with a PDCP SN but for which a corresponding PDU has not previously been submitted to the lower layers (i.e. RLC), consider these PDCP SDUs as received newly from upper layer, perform transmission of the PDCP SDUs in ascending order of the COUNT value associated to the PDCP SDU prior to the PDCP re-establishment without restarting the discard timer. Each of these PDCP SDUs will be re-assigned PDCP SN. They will be ciphered (and/or integrity protected) and header compressed again. For AM DRBs, for each PDCP SDU already associated with a PDCP SN but for which a corresponding PDU has not previously been submitted to lower layers (i.e. RLC), perform transmission of the PDCP SDUs in ascending order of the COUNT value associated to the PDCP SDU prior to the PDCP re-establishment. Each of these PDCP SDUs is not re-assigned PDCP SN. However, they will be ciphered (and/or integrity protected) and header compressed again.

At 522, for the AM bearers, the UE 102 re-transmits all uplink PDCP SDUs starting from the first PDCP SDU following the last consecutively confirmed PDCP SDU i.e. the oldest PDCP SDU that has not been acknowledged (e.g., at RLC), excluding the PDCP SDUs for which the reception was acknowledged.

At 524, the RLC entity is reset/re-established for each radio bearer, and at 526, the MAC entity is reset/re-established.

Figure 6A:
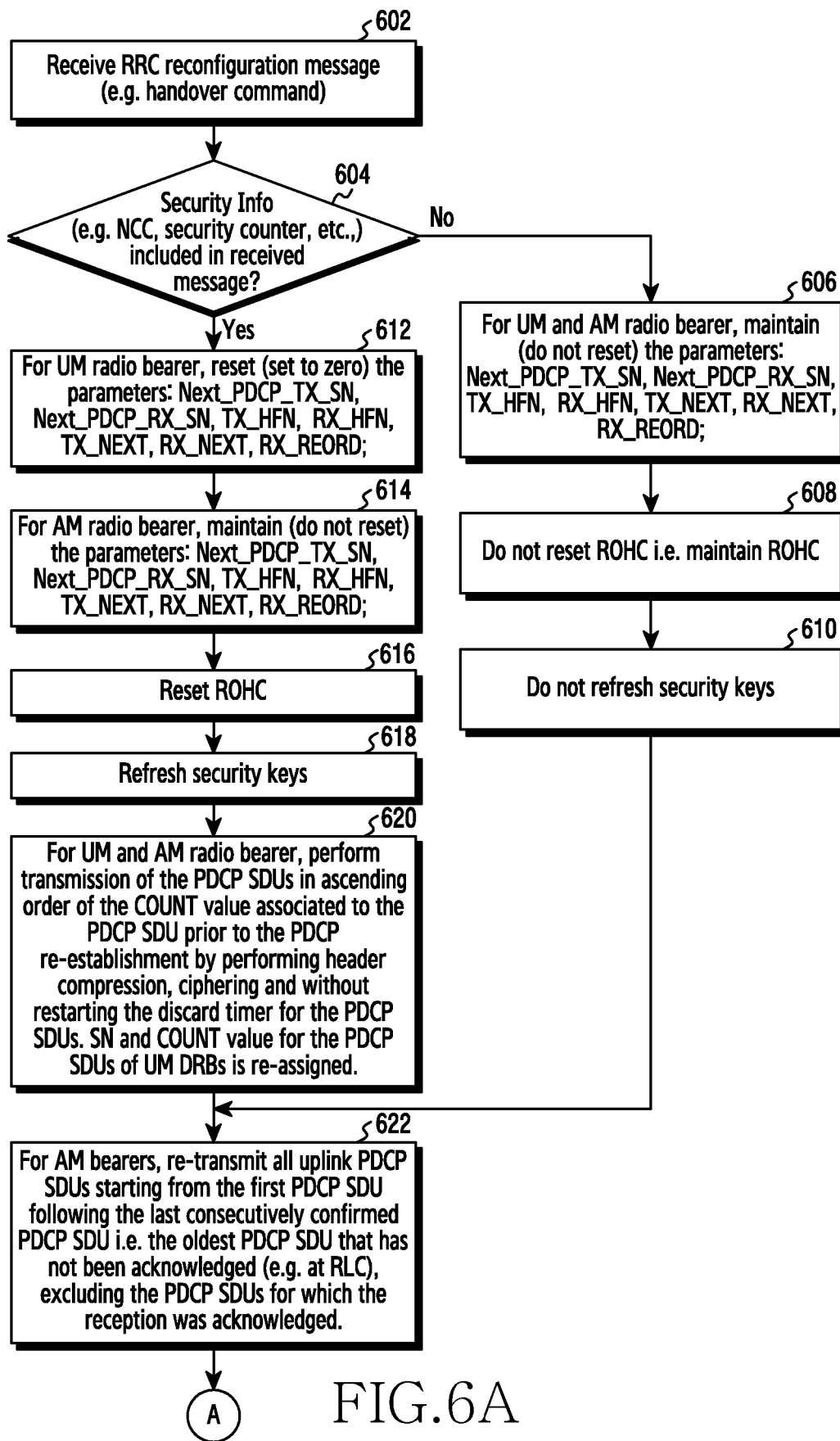
FIGS. 6A and 6B are an example operation performed by the UE based on security key change indication information, according to an embodiment as disclosed herein.
Figure 6B:
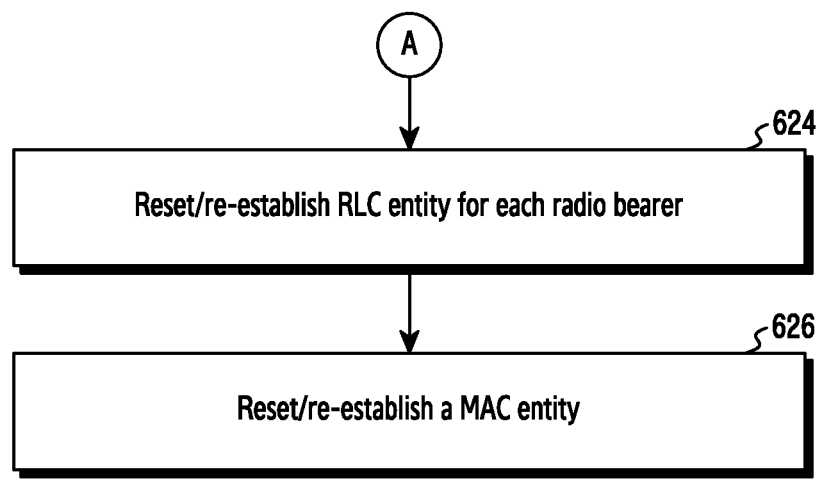

In an embodiment, instead of the explicit PDCP re-establishment indication, the PDCP re-establishment can be implicitly indicated by the presence of security info e.g., Next Hop Chaining Count (NCC) in the handover command message or Secondary Cell Group (SCG) counter in case of dual connectivity SCG change or other security configuration. This is shown in FIGS. 6A and 6B. The RLC entity is reset/re-established for each data radio bearer which is part of current UE 102 configuration on receiving the handover command (or SCG change). The MAC entity is also reset or re-established. In an embodiment, for the UM data radio bearers (i.e. data radio bearers configured with the RLC in the UM mode), wherein the PDCP sublayer uses parameters or variables Next_PDCP_TX_SN, Next_PDCP_RX_SN, TX_HFN and RX_HFN, the UE 102 resets the parameters or variables Next_PDCP_TX_SN, Next_PDCP_RX_SN, TX_HFN and RX_HFN. In an alternate embodiment, for the UM data radio bearers (i.e. data radio bearers configured with the RLC in the UM mode), wherein the PDCP sublayer uses parameters or variables TX_NEXT, RX_NEXT and RX_REORD, the UE 102 resets the parameters or variables TX_NEXT, RX_NEXT and RX_REORD. The ROHC is reset (the ROHC may not be reset in alternate embodiment and whether to reset or not may indicated in RRC reconfiguration message). In an embodiment, for the AM data radio bearers (i.e. data radio bearers configured with RLC in the AM mode) wherein the PDCP sublayer uses parameters or variables Next_PDCP_TX_SN, Next_PDCP_RX_SN, TX_HFN and RX_HFN, the UE 102 maintains (i.e. not reset to zero) the values of parameters or variables: Next_PDCP_TX_SN, Next_PDCP_RX_SN, TX_HFN and RX_HFN. In an alternate embodiment for the AM data radio bearers (i.e. data radio bearers configured with RLC in the AM mode), wherein the PDCP sublayer uses parameters or variables TX_NEXT, RX_NEXT and RX_REORD the UE 102 maintains (i.e. not reset to zero) the values of parameters or variables: TX_NEXT, RX_NEXT and RX_REORD. For the data radio bearers configured with the RLC in the AM mode, the ROHC is reset. The access stratum security key for the user plane and the control plane is refreshed. The UE 102 sends the PDCP SN status report if the PDCP SN status report is configured by the RRC. The UE 102 re-transmits all uplink PDCP SDUs starting from the first PDCP SDU following the last consecutively confirmed PDCP SDU i.e. the oldest PDCP SDU that has not been acknowledged (e.g., at the RLC), excluding the PDCP SDUs for which the reception was acknowledged. For UM DRBs, for each PDCP SDU already associated with a PDCP SN but for which a corresponding PDU has not previously been submitted to lower layers (i.e. RLC), UE 102 perform transmission of the PDCP SDUs in ascending order of the COUNT value associated to the PDCP SDU prior to the PDCP re-establishment without restarting the discard timer. Each of these PDCP SDUs will be re-assigned PDCP SN. They will be ciphered (and/or integrity protected) and header compressed again. For AM DRBs, for each PDCP SDU already associated with a PDCP SN but for which a corresponding PDU has not previously been submitted to lower layers (i.e. RLC), perform transmission of the PDCP SDUs in ascending order of the COUNT value associated to the PDCP SDU prior to the PDCP re-establishment. Each of these PDCP SDUs is not re-assigned PDCP SN. However, they will be ciphered (and/or integrity protected) and header compressed again.

In an embodiment, for architecture option 1 (the FIG. 2A) when there is no security info e.g., NCC in the handover command or SCG counter in case of dual connectivity SCG change or other security configuration, then the PDCP is not re-established. This is shown in FIGS. 6A and 6B. Upon receiving the handover command without the NCC or the SCG counter in case of dual connectivity SCG change or other security configuration, the PDCP entity is not re-established for each DRB which is part of current UE configuration. In an embodiment, for the UM as well as AM data radio bearers wherein the PDCP sublayer uses parameters or variables Next_PDCP_TX_SN, Next_PDCP_RX_SN, TX_HFN and RX_HFN, the UE 102 maintains (i.e. not reset to zero) the values of the parameters or variables Next_PDCP_TX_SN, Next_PDCP_RX_SN, TX_HFN and RX_HFN. In an alternate embodiment, for the UM as well as AM data radio bearers wherein the PDCP sublayer uses parameters or variables TX_NEXT, RX_NEXT and RX_REORD, the UE 102 maintains (i.e. not reset to zero) the values of the parameters or variables TX_NEXT, RX_NEXT and RX_REORD. The ROHC is not reset for AM as well as UM DRBs. The access stratum security key for the user plane and the control plane is not refreshed. The UE 102 may send PDCP SN status report if configured by the RRC. For the AM data radio bearers, the UE 102 re-transmits all uplink PDCP SDUs starting from the first PDCP SDU following the last consecutively confirmed PDCP SDU i.e. the oldest PDCP SDU that has not been acknowledged (e.g., at RLC), excluding the PDCP SDUs for which the reception was acknowledged. In other word, UE 102 performs retransmission of all the PDCP Data PDUs previously submitted to re-established AM RLC entity in ascending order of the associated COUNT values from the first PDCP Data PDU for which the successful delivery has not been confirmed by the lower layers (i.e. RLC).

FIGS. 6A and 6B are an example operation performed by the UE 102 based on the security key change indication information, according to an embodiment as disclosed herein.

Referring to the FIGS. 6A and 6B, at 602, the UE 102 receives the RRC reconfiguration message. At 604, the UE 102 determines that the security Info (e.g., NCC, security counter, etc.,) included in received Message? If the UE 102 determines that security Info does not included in the received Message then in an embodiment at 606, for the UM as well as AM data radio bearers wherein the PDCP sublayer uses parameters or variables Next_PDCP_TX_SN, Next_PDCP_RX_SN, TX_HFN and RX_HFN, the UE 102 maintains (i.e. not reset to zero) the values of the parameters or variables Next_PDCP_TX_SN, Next_PDCP_RX_SN, TX_HFN and RX_HFN. Alternately at 606, for the UM as well as AM data radio bearers wherein the PDCP sublayer uses parameters or variables TX_NEXT, RX_NEXT and RX_REORD, the UE 102 maintains (i.e. not reset to zero) the values of the parameters or variables TX_NEXT, RX_NEXT and RX_REORD. At 608, the UE 102 does not reset the ROHC and at 610, the UE 102 does not refresh the security keys.

If the UE 102 determines that the security Info is included in the received Message then at 612, for the UM data radio bearers wherein the PDCP sublayer uses parameters or variables Next_PDCP_TX_SN, Next_PDCP_RX_SN, TX_HFN and RX_HFN, the UE 102 resets the parameters or variables Next_PDCP_TX_SN, Next_PDCP_RX_SN, TX_HFN and RX_HFN. In an alternate embodiment at 612, for the UM data radio bearers wherein the PDCP sublayer uses parameters or variables TX_NEXT, RX_NEXT and RX_REORD, the UE 102 resets the parameters or variables TX_NEXT, RX_NEXT and RX_REORD. In an embodiment at 614, for AM data radio bearers wherein the PDCP sublayer uses parameters or variables Next_PDCP_TX_SN, Next_PDCP_RX_SN, TX_HFN and RX_HFN, the UE 102 maintains (i.e. not reset to zero) the values of the parameters or variables Next_PDCP_TX_SN, Next_PDCP_RX_SN, TX_HFN and RX_HFN. In an alternate embodiment, at 614, for the AM data radio bearers wherein the PDCP sublayer uses parameters or variables TX_NEXT, RX_NEXT and RX_REORD, the UE 102 maintains (i.e. not reset to zero) the values of the parameters or variables TX_NEXT, RX_NEXT and RX_REORD.

At 616, the UE 102 resets the ROHC and at 618, the UE 102 refreshes the security keys.

At 620, for the UM radio bearer, for each PDCP SDU already associated with a PDCP SN but for which a corresponding PDU has not previously been submitted to lower layers (i.e. RLC), consider these PDCP SDUs as received newly from upper layer, perform transmission of the PDCP SDUs in ascending order of the COUNT value associated to the PDCP SDU prior to the PDCP re-establishment without restarting the discard timer. Each of these PDCP SDUs will be re-assigned PDCP SN. They will be ciphered (and/or integrity protected) and header compressed again. For AM DRBs, for each PDCP SDU already associated with a PDCP SN but for which a corresponding PDU has not previously been submitted to lower layers (i.e. RLC), perform transmission of the PDCP SDUs in ascending order of the COUNT value associated to the PDCP SDU prior to the PDCP re-establishment. Each of these PDCP SDUs is not re-assigned PDCP SN. However, they will be ciphered (and/or integrity protected) and header compressed again.

At 622, for the AM bearers, the UE 102 re-transmits all uplink PDCP SDUs starting from the first PDCP SDU following the last consecutively confirmed PDCP SDU i.e. the oldest PDCP SDU that has not been acknowledged (e.g., at RLC), excluding the PDCP SDUs for which the reception was acknowledged.

At 624, the RLC entity is reset/re-established for each radio bearer, and at 626, the MAC entity is reset/re-established.

Architecture Option 2: When the UE 102 moves/switches from one DU/TRP to another DU/TRP in same CU (i.e. CU of source and target DU/TRP/Cell is same), the proposed user plane operation (for each DRB) for the architecture option 2 (illustrated in the FIG. 2B) is as follows:

a) The PDCP entity is not re-established.
    a. In an embodiment, where the PDCP uses the state variables or parameters Next_PDCP_TX_SN and Next_PDCP_RX_SN, the value of Next_PDCP_TX_SN and Next_PDCP_RX_SN is maintained (i.e. it is not reset to zero) for each data radio bearer which is part of current UE 102 configuration. Next_PDCP_TX_SN indicates PDCP sequence number of the next PDCP SDU to be transmitted. Next_PDCP_RX_SN indicates PDCP sequence number of the next PDCP SDU to be received. In another embodiment wherein the PDCP uses the state variables or parameters TX_NEXT and RX_NEXT, the value of TX_NEXT and RX_NEXT is maintained (i.e. it is not reset to zero) for each DRB which is part of current UE 102 configuration. TX_NEXT indicates the COUNT value of the next PDCP SDU to be transmitted. RX_NEXT indicates the COUNT value of the next PDCP SDU to be received. The COUNT value is composed of a HFN and the PDCP SN. X MSBs of COUNT indicates HFN and remaining bits of COUNT indicates PDCP Sequence number (SN).

b. In an embodiment, where the PDCP uses the state variables or parameters TX_HFN and RX_HFN, the value of TX_HFN and RX_HFN\ is also maintained i.e. it is not reset to zero for each data radio bearer which is part of current UE 102 configuration. TX_HFN indicates a hyper frame number value for generation of a counter value used for the PDCP PDUs to be transmitted. RX_HFN indicates a hyper frame number value for generation of a counter value used for the received PDCP PDUs.

c. In an embodiment, where the PDCP uses the state variables or parameters RX_REORD, the value of RX_REORD is also maintained i.e. it is not reset to zero. RX_REORD indicates COUNT value following the COUNT value associated with the PDCP Data PDU which has triggered start of reordering timer.

d. The security keys are not refreshed (i.e. the UE 102 does not generate new security keys for ciphering and/or integrity protection). The UE 102 uses the already established AS security keys for each data radio bearer which is part of current UE 102 configuration.

e. The UE 102 does not send any SN status report.

f. The UE PDCP entity does not attempt to retransmit any PDCP SDU in the target DU/TRP/Cell for which transmission had been completed in the source DU/TRP/Cell, instead UE PDCP entity starts the transmission with other PDCP SDUs.

g. No PDCP SDUs are retransmitted in the target DU 105.

h. The PDCP PDUs stored in the PDU reordering buffer are deciphered and decompressed and kept in the PDCP, associated with COUNT.

i. The ROHC is not reset.

b) The RLC is not reset/re-established for each data radio bearer which is part of current UE 102 configuration.

c) The MAC entity is reset or re-established. Further, the MAC entity is configured to:

initialize Bj for each logical channel to zero; stop (if running) all timers; consider all timeAlignmentTimersas expired and perform the corresponding actions; set the NDIs for all uplink HARQ processes to the value 0; stop, if any, ongoing RACH procedure; discard explicitly signalled ra-PreambleIndex and ra-PRACH-MaskIndex, if any; flush Msg3 buffer; cancel, if any, triggered Scheduling Request procedure; cancel, if any, triggered Buffer Status Reporting procedure; cancel, if any, triggered Power Headroom Reporting procedure; flush the soft buffers for all DL HARQ processes; for each DL HARQ process, consider the next received transmission for a TB as the very first transmission; release, if any, Temporary C-RNTI. In one embodiment, the timeAlignmentTimers are considered as expired based on indication from the network. The C-RNTI can be maintained in one embodiment unless explicitly released indication received from the network or unless a new C-RNTI is received from the network.

d) If the source and target DU/TRP/Cell belongs to same TAG, the RA is not performed by the UE 102 in target DU/TRP/Cell. The network can indicate whether the UE 102 should perform RA or not.

Architecture Option 3: When the UE 102 moves/switches from one DU/TRP/cell to another DU/TRP/cell in same CU/NB 103, the proposed user plane operation (for each DRB) for the architecture option 3 (illustrated in the FIG. 2C) is as follows:

a) The PDCP entity is not re-established.

a. In an embodiment wherein the PDCP uses the state variables or parameters Next_PDCP_TX_SN and Next_PDCP_RX_SN, the value of Next_PDCP_TX_SN and Next_PDCP_RX_SN is maintained (i.e. it is not reset to zero) for each DRB which is part of current UE 102 configuration. Next_PDCP_TX_SN indicates PDCP sequence number of the next PDCP SDU to be transmitted. Next_PDCP_RX_SN indicates PDCP sequence number of the next PDCP SDU to be received. In another embodiment wherein the PDCP uses the state variables or parameters TX_NEXT and RX_NEXT, the value of TX_NEXT and RX_NEXT is maintained (i.e. it is not reset to zero) for each DRB which is part of current UE 102 configuration. TX_NEXT indicates the COUNT value of the next PDCP SDU to be transmitted. RX_NEXT indicates the COUNT value of the next PDCP SDU to be received. The COUNT value is composed of a HFN and the PDCP SN. X MSBs of COUNT indicates HFN and remaining bits of COUNT indicates PDCP Sequence number (SN).

b. In an embodiment wherein the PDCP uses the state variables or parameters TX_HFN and RX_HFN, The value of TX_HFN and RX_HFN is also maintained i.e. it is not reset to zero for each radio bearer which is part of current UE 102 configuration. TX_HFN indicates a hyper frame number value for generation of a counter value used for the PDCP PDUs to be transmitted. RX_HFN indicates a hyper frame number value for generation of a counter value used for the received PDCP PDUs.

c. In an embodiment wherein the PDCP uses the state variables or parameters RX_REORD, the value of RX_REORD is also maintained i.e. it is not reset to zero. RX_REORD indicates COUNT value following the COUNT value associated with the PDCP Data PDU which has triggered start of reordering timer.

d. The security keys are not refreshed (i.e., the UE 102 does not generate new security keys for ciphering and/or integrity protection). The UE 102 uses the already established AS security keys for each data radio bearer which is part of current UE 102 configuration.

e. The UE 102 does not send any SN status report.

f. The UE PDCP entity does not attempt to retransmit any PDCP SDU in the target DU/TRP/cell for which transmission had been completed in the source DU/TRP/Cell instead of the UE PDCP entity starts the transmission with other PDCP SDUs.

g. No PDCP SDUs are retransmitted in the target DU/TRP/Cell.

h. The PDCP PDUs stored in the PDU reordering buffer are deciphered and decompressed and kept in the PDCP, associated with COUNT.

i. The ROHC is not reset.

b) The RLC is not reset/re-established for each data radio bearer which is part of current UE 102 configuration. The RLC SDUs given to source DU/TRP/Cell, whose transmission is not completed in the source DU/TRP/Cell, are retransmitted via the target DU/TRP/Cell. Even if the RLC SDU is partially transmitted by the source DU/TRP/Cell, complete RLC SDU is transmitted to target DU/TRP/Cell by the CU 103. Alternately, the source DU/TRP/Cell can indicate to the CU 103 which part of the SDU is not transmitted, and the CU 103 retransmits that part via the target DU/TRP/Cell.

c) The MAC entity is reset or re-established. Further, the MAC entity is configured to: initialize Bj for each logical channel to zero; stop (if running) all timers; consider all timeAlignmentTimersas expired and perform the corresponding actions; set the NDIs for all uplink HARQ processes to the value 0; stop, if any, ongoing RACH procedure; discard explicitly signalled ra-PreambleIndex and ra-PRACH-MaskIndex, if any; flush Msg3 buffer; cancel, if any, triggered Scheduling Request procedure; cancel, if any, triggered Buffer Status Reporting procedure; cancel, if any, triggered Power Headroom Reporting procedure; flush the soft buffers for all DL HARQ processes; for each DL HARQ process, consider the next received transmission for a TB as the very first transmission; release, if any, Temporary C-RNTI. In one embodiment, the timeAlignmentTimers are considered as expired based on the indication from the network. The C-RNTI can be maintained in one embodiment unless explicitly released indication received from the network or unless a new C-RNTI is received from the network.

d) If the source DU/TRP/Cell and the target DU/TRP/Cell belong to same TAG, the RA is not performed by the UE 102 in the target DU/TRP/Cell. The network can indicate whether the UE 102 should perform the RA or not.

Architecture Option 4: When the UE 102 moves/switches from one DU/TRP/Cell to another DU/TRP/Cell in same CU/NB 103, the proposed user plane operation (for each DRB) for the architecture option 4 (illustrated in the FIG. 2D) is as follows:

a) The PDCP entity is not re-established.
   a. In an embodiment, where the PDCP uses the state variables or parameters Next_PDCP_TX_SN and Next_PDCP_RX_SN, the value of Next_PDCP_TX_SN and Next_PDCP_RX_SN is maintained (i.e. it is not reset to zero) for each DRB which is part of current UE 102 configuration. Next_PDCP_TX_SN indicates PDCP sequence number of the next PDCP SDU to be transmitted. Next_PDCP_RX_SN indicates PDCP sequence number of the next PDCP SDU to be received. In another embodiment wherein the PDCP uses the state variables or parameters TX_NEXT and RX_NEXT, the value of TX_NEXT and RX_NEXT is maintained (i.e. it is not reset to zero) for each DRB which is part of current UE 102 configuration. TX_NEXT indicates the COUNT value of the next PDCP SDU to be transmitted. RX_NEXT indicates the COUNT value of the next PDCP SDU to be received. The COUNT value is composed of a HFN and the PDCP SN. X MSBs of COUNT indicates HFN and remaining bits of COUNT indicates PDCP Sequence number (SN).
   b. In an embodiment, where the PDCP uses the state variables or parameters TX_HFN and RX_HFN, The value of TX_HFN and RX_HFN is also maintained i.e. it is not reset to zero for each radio bearer which is part of current UE 102 configuration. TX_HFN indicates a hyper frame number value for generation of a counter value used for the PDCP PDUs to be transmitted. RX_HFN indicates a hyper frame number value for generation of a counter value used for the received PDCP PDUs.
   c. In an embodiment, where the PDCP uses the state variables or parameters RX_REORD, the value of RX_REORD is also maintained i.e. it is not reset to zero. RX_REORD indicates COUNT value following the COUNT value associated with the PDCP Data PDU which has triggered start of reordering timer.
   d. The security keys are not refreshed. The UE 102 uses the already established AS security keys for each data radio bearer which is part of current UE 102 configuration.
   e. The UE 102 does not send the SN status report (e.g., PDCP SN status report).
   f. The UE PDCP entity does not attempt to retransmit any PDCP SDU in the target DU/TRP/Cell for which transmission had been completed in the source DU/TRP/Cell instead of the UE PDCP entity starts the transmission with other PDCP SDUs.
   g. No PDCP SDUs are retransmitted in the target DU/TRP/Cell.
   h. The PDCP PDUs stored in the PDU reordering buffer are deciphered and decompressed and kept in the PDCP, associated with COUNT.
   i. The ROHC is not reset.
b) The RLC is not reset/re-established for each data radio bearer which is part of current UE 102 configuration.
c) The MAC entity is not reset or re-established.
d) If source and target DU/TRP/Cell belongs to same TAG, the RA is not performed by the UE 102 in target DU/TRP/Cell. Further, the network can indicate whether the UE 102 should perform RA or not.

In the mobility scenario 1A i.e. DU/TRP/Cell change within the same CU/NB since the PDCP entity is not re-located there is no need to change the access stratum security keys for user plane and control plane. There is also no need to reset the PDCP SN, the HFN and the ROHC irrespective of AM or UM DRBs.

1B. Mobility Scenario: In the user plane operation is explained, when the UE 102 moves from one DU/TRP/Cell to another DU/TRP/Cell in different CU/NB or the UE 102 moves from one CU/NB to another CU/NB.

When the UE 102 moves/switches from one DU/TRP/Cell to another DU/TRP/Cell in different CU/NB, the proposed user plane operation (for each DRB) for the all architecture options is as follows:

a) In an embodiment, for the UM data radio bearers (i.e. data radio bearers configured with the RLC in the UM mode), wherein the PDCP sublayer uses parameters or variables Next_PDCP_TX_SN, Next_PDCP_RX_SN, TX_HFN and RX_HFN, the UE 102 resets the parameters or variables Next_PDCP_TX_SN, Next_PDCP_RX_SN, TX_HFN and RX_HFN. In an alternate embodiment, for the UM data radio bearers (i.e. data radio bearers configured with the RLC in the UM mode), wherein the PDCP sublayer uses parameters or variables TX_NEXT, RX_NEXT and RX_REORD, the UE 102 resets the parameters or variables TX_NEXT, RX_NEXT and RX_REORD.
b) In an embodiment, for the AM data radio bearers (i.e. data radio bearers configured with RLC in the AM mode) wherein the PDCP sublayer uses parameters or variables Next_PDCP_TX_SN, Next_PDCP_RX_SN, TX_HFN and RX_HFN, the UE 102 maintains (i.e. not reset to zero) the values of parameters or variables: Next_PDCP_TX_SN, Next_PDCP_RX_SN, TX_HFN and RX_HFN. In an alternate embodiment for the AM data radio bearers (i.e. data radio bearers configured with RLC in the AM mode), wherein the PDCP sublayer uses parameters or variables TX_NEXT, RX_NEXT and RX_REORD the UE 102 maintains (i.e. not reset to zero) the values of parameters or variables: TX_NEXT, RX_NEXT and RX_REORD.

c) The source CU/NB informs the target CU/NB about the next DL PDCP SN to allocate to the packet which does not have the PDCP sequence number yet (either from source CU or from the serving GW 101).

d) For the UM data radio bearers the ROHC is reset (ROHC may not be reset in alternate embodiment and whether to reset or not may be indicated in RRC reconfiguration message). For the AM data radio bearers (i.e. DRBs configured with RLC in the AM mode), the ROHC is reset.

e) The security keys are refreshed (i.e. key hierarchy associated with user plane and control plane is refreshed).

f) For DRB configured with the RLC in the AM mode, the UE 102 sends the SN status report (e.g., PDCP SN status) if configured by the RRC. The RRC indicates for which radio bearer UE needs to send the status report.

g) For DRB configured with the RLC in the AM mode, the source NB/CU may send the SN status report (e.g., PDCP SN status) to the UE 102. The UE 102 does not need to wait to resume the UL transmission.

h) For DRB configured with the RLC in the AM mode, the UE 102 re-transmits in the target DU/TRP/Cell all uplink PDCP SDUs starting from the first PDCP SDU following the last consecutively confirmed PDCP SDU i.e. the oldest PDCP SDU that has not been acknowledged at RLC in the source DU/TRP/Cell, excluding the PDCP SDUs of which the reception was acknowledged through PDCP SN based reporting by the target DU/TRP/Cell. For UM DRBs, for each PDCP SDU already associated with a PDCP SN but for which a corresponding PDU has not previously been submitted to lower layers (i.e. RLC), consider these PDCP SDUs as received from upper layer, perform transmission of the PDCP SDUs in ascending order of the COUNT value associated to the PDCP SDU prior to the PDCP re-establishment without restarting the discard timer. Each of these PDCP SDUs will be re-assigned PDCP SN. They will be ciphered (and/or integrity protected) and header compressed again. For AM DRBs, for each PDCP SDU already associated with a PDCP SN but for which a corresponding PDU has not previously been submitted to lower layers (i.e. RLC), perform transmission of the PDCP SDUs in ascending order of the COUNT value associated to the PDCP SDU prior to the PDCP re-establishment. Each of these PDCP SDUs is not re-assigned PDCP SN. However, they will be ciphered (and/or integrity protected) and header compressed again.

i) The target CU re-transmits and prioritizes all downlink PDCP SDUs forwarded by the source CU (i.e. the target CU should send data with PDCP SNs from X2 before sending data from S1), with the exception of PDCP SDUs of which the reception was acknowledged through PDCP SN based reporting by the UE 102.

j) The ROHC is reset.

k) The RLC entity is reset/re-established for each data radio bearer which is part of current UE 102 configuration: If the RLC entity being reset/re-established is a Transmitting TM RLC entity, it discards all RLC SDUs. If RLC entity being reset/re-established is a Receiving UM RLC entity it performs the following: when possible, reassemble RLC SDUs from UMD PDUs with SN<VR (UH) (VR (UH) state variable holds the value of the SN following the SN of the UMD PDU with the highest SN among received UMD PDUs, and it serves as the higher edge of the reordering window.); remove RLC headers when doing so and deliver all reassembled RLC SDUs to upper layer in ascending order of the RLC SN, if not delivered before; discard all remaining UMD PDUs. If RLC entity being reset/re-established is a Transmitting UM RLC entity, it discard all RLC SDUs; If RLC entity being reset/re-established is a AM RLC entity it performs the following: when possible, reassemble RLC SDUs from any byte segments of AMD PDUs with SN<VR (MR) (VR (MR) equals VR(R)+AM_Window_Size, and it holds the value of the SN of the first AMD PDU that is beyond the receiving window and serves as the higher edge of the receiving window. VR(R) holds the value of the SN following the last in-sequence completely received AMD PDU, and it serves as the lower edge of the receiving window) in the receiving side; remove RLC headers when doing so and deliver all reassembled RLC SDUs to upper layer in ascending order of the RLC SN, if not delivered before; discard the remaining AMD PDUs and byte segments of AMD PDUs in the receiving side; discard all RLC SDUs and AMD PDUs in the transmitting side; discard all RLC control PDUs. Each RLC entity being reset/re-established stops and resets all timers; reset all state variables to their initial values.

l) The MAC entity is reset or re-established. Further, the MAC entity is configured to: initialize Bj for each logical channel to zero; stop (if running) all timers; consider all timeAlignmentTimersas expired and perform the corresponding actions; set the NDIs for all uplink HARQ processes to the value 0; stop, if any, ongoing RACH procedure; discard explicitly signalled ra-PreambleIndex and ra-PRACH-MaskIndex, if any; flush Msg3 buffer; cancel, if any, triggered Scheduling Request procedure; cancel, if any, triggered Buffer Status Reporting procedure; cancel, if any, triggered Power Headroom Reporting procedure; flush the soft buffers for all DL HARQ processes; for each DL HARQ process, consider the next received transmission for a TB as the very first transmission; release, if any, Temporary C-RNTI.

m) The RA is performed by the UE 102 in the target DU.

In mobility scenario 1B i.e. DU/TRP/Cell changes across two different CU/NBs. Since the PDCP entity is re-located from one CU/NB to another CU/NB the access stratum security keys for user plane and control plane need to be change/refresh.

The user plane operation at the network side and at the UE 102 side is different for the mobility scenario 1A and the mobility scenario 1B. Also within the mobility scenario 1A, the user plane operation is different at the network side and at the UE side 102 for different architecture options. So that when the UE 102 switches from one DU/Cell/TRP to another DU/Cell/TRP it should identify and perform appropriate operation.

FIGS. 7A to 7C and 8A and 8B are depicting various operations performed by the UE 102 when the UE 102 switches from the source TRP/DU to the target TRP/DU, according to an embodiment as disclosed herein.

Embodiment 1: In an embodiment, in order to assist the UE 102 for performing the appropriate action related to the user plane operation, the network sends one or more functional indications as listed in Table 1. These indications can be sent in the signaling message (e.g., RRC Connection Reconfiguration message or any other signaling message (e.g., beam change command)) used for TRP/DU switching to indicate the UE what action the UE 102 has to take associated with the corresponding function of user plane processing.

TABLE 1

| Functional Indications from the eNB 103 | Purpose |
| --- | --- |
| RLC_Reset_Indication | Indicates whether the RLC entity needs to be reset/re-established. This indication is related to the radio bearer or flow specific. |
| Retransmission_Indication | Indicates whether the UE 102 retransmits any SDU in the target DU for which transmission is completed in the source DU. Note that the transmission is completed which does not mean it is received successfully by the receiver. This indication is related to the radio bearer or flow specific. |
| MAC_Reset_Indication | Indicates whether the MAC needs to be reset or re-established. This indication is related to the UE 102 specific. |
| SN_Status_Report_Indication | Indicates whether the UE 102 needs to send the SN status (e.g., PDCP SN Status) report. This indication is related to the radio bearer or flow specific. |
| Key_Refresh_Indication | Indicates whether the UE 102 needs to refresh security keys. This indication can be radio bearer or flow specific or UE specific. |
| ROHC_Reset_Indication | Indicates whether the UE 102 needs to reset ROHC. This indication is radio bearer or flow specific. |
| RA_Indication | Indicates whether the UE 102 perform random access in the target DU for UL timing. In case RA is not performed, the UL timing in the source DU is used. |
| Parameter reset Indication for UM DRB | Indicates whether UE 102 needs to reset parameters or variables Next_PDCP_TX_SN, Next_PDCP_RX_SN, TX_HFN and RX_HFN, TX_NEXT, RX_NEXT and RX REORD |

Further, the UE 102 operation explained (as shown in the FIGS. 7A to 7C) after switching from the source TRP/DU/cell to target TRP/DU/cell is as follows:
  a) SN Handling: In an embodiment, for the AM data radio bearers (i.e. data radio bearers configured with RLC in the AM mode) wherein the PDCP sublayer uses parameters or variables Next_PDCP_TX_SN, Next_PDCP_RX_SN, TX_HFN and RX_HFN, the UE 102 maintains (i.e. not reset to zero) the values of parameters or variables: Next_PDCP_TX_SN, Next_PDCP_RX_SN, TX_HFN and RX_HFN. In an alternate embodiment for the AM data radio bearers (i.e. data radio bearers configured with RLC in the AM mode), wherein the PDCP sublayer uses parameters or variables TX_NEXT, RX_NEXT and RX_REORD the UE 102 maintains (i.e. not reset to zero) the values of parameters or variables: TX_NEXT, RX_NEXT and RX_REORD. For DRBs for which the RLC is configured in the UM mode, indication is there to indicate whether to reset the parameters Next_PDCP_TX_SN, Next_PDCP_RX_SN, TX_HFN and RX_HFN, TX_NEXT, RX_NEXT and RX_REORD.

b) Security Key Handling: The security keys are refreshed if the UE 102 receives the indication (i.e. Key_Refresh_Indication) from the NB to refresh the security keys where the key hierarchy associated with the user plane and the control plane is refreshed. Otherwise, the security keys are not refreshed. The UE 102 uses the already established the AS security keys for each radio bearer or radio flow which is part of current UE 102 configuration. In an alternate embodiment, the security keys are not refreshed if the UE 102 receives an indication (i.e. Key_Continue_Indication) from the NB 103 to continue using the already established security keys. Otherwise it refreshed the security keys.

c) SN Status Report Handling: The UE 102 sends the SN status report (e.g., PDCP SN status) if the UE 102 receives the indication from the eNB 103. Otherwise it does not send status report.

d) Retransmission Handling: On receiving an indication (i.e. Retransmission_Indication) from the eNB 103 to retransmit, the UE 102 re-transmits in the target DU/TRP/Cell all uplink PDCP SDUs starting from the first PDCP SDU following the last consecutively confirmed PDCP SDU i.e. the oldest PDCP SDU that has not been acknowledged (e.g., at RLC) in the source DU/TRP/Cell, excluding the PDCP SDUs for which the reception was acknowledged through PDCP SN based reporting by the target DU/TRP/Cell.

e) Reordering Handling: The PDCP PDUs stored in the PDU reordering buffer are deciphered and decompressed and kept in the PDCP, associated with the COUNT.

f) ROHC Handling: On receiving an indication (i.e., ROHC_Reset_Indication) from the eNB 103 to reset the ROHC, the UE 102 resets the ROHC. Otherwise, the UE 102 does not reset ROHC. In an alternate embodiment on receiving the indication (i.e. ROHC_Continue_Indication) from NB to not reset ROHC, UE 102 continues ROHC. Otherwise it resets.

g) RLC Handling: The RLC is reset/re-established for each radio bearer or radio flow which is part of current UE 102 configuration if the UE 102 receives the indication from the eNB 103 to reset the RLC. Otherwise it does not reset the RLC.

h) MAC Handling: The MAC entity is reset or re-established if the UE 102 receives the indication from the eNB 103 to reset the MAC. Otherwise it does not reset MAC.

i) RA Handling: In one embodiment, if the source DU/TRP/Cell and the target DU/TRP/Cell belong to same TAG, the RA is not performed by the UE 102 in the target DU/TRP/Cell. In alternate embodiment, the network can indicate whether the UE 102 should perform the RA or not.

j) C-RNTI Handling: In one embodiment, if the source DU/TRP/Cell and the target

DU/TRP/Cell belong to same CU, the C-RNTI is not released by the UE 102. In alternate embodiment, the network can indicate whether the UE 102 should maintain or release the C-RNTI.

In an embodiment, instead of the explicit one bit key refresh indication, the key refresh can be indicated by including the SecurityConfig in the RRC connection reconfiguration. Absence of the SecurityConfig indicates that security key is not refreshed. In yet another embodiment, instead of the explicit one bit key refresh indication, absence of the NCC or the SCG counter implicitly indicate that security key refresh is not needed else if included then the security is refreshed/changed. These embodiments are applicable for the handover scenario is single connectivity scenario where the UE 102 has one radio link connection with the CU/gNB 103 and also for the SCG change in dual connectivity scenario where the UE 102 has two radio link connections with a Master node (MN) and secondary node (SN).

In one embodiment, if the UE 102 is able to detect itself that the CU 103 has changed then the UE 102 can refresh keys and reset the ROHC even without Key_Refresh_Indication and ROHC_Reset_Indication respectively.

The NB in this embodiment of the proposed invention can set the indications based on the mobility scenario and its architecture as shown in Table 2.

such system. For example, for network supporting only architecture option 1, Key_Refresh_Indication, ROHC_Reset_Indication and parameter reset Indication for the UM DRB is needed. These three indications can be separately included or can also be represented by the single indication (e.g., PDCP re-establish indication).

In an embodiment, the network or communication system 100 may only support architecture option 2A. In this case only Key_Refresh_Indication and ROHC_Reset_Indication needs to be signaled by the network. These can be two independent indications. Alternately there can be single indication based on which the UE 102 decide to both refresh security keys and reset ROHC.

Figure 7A:
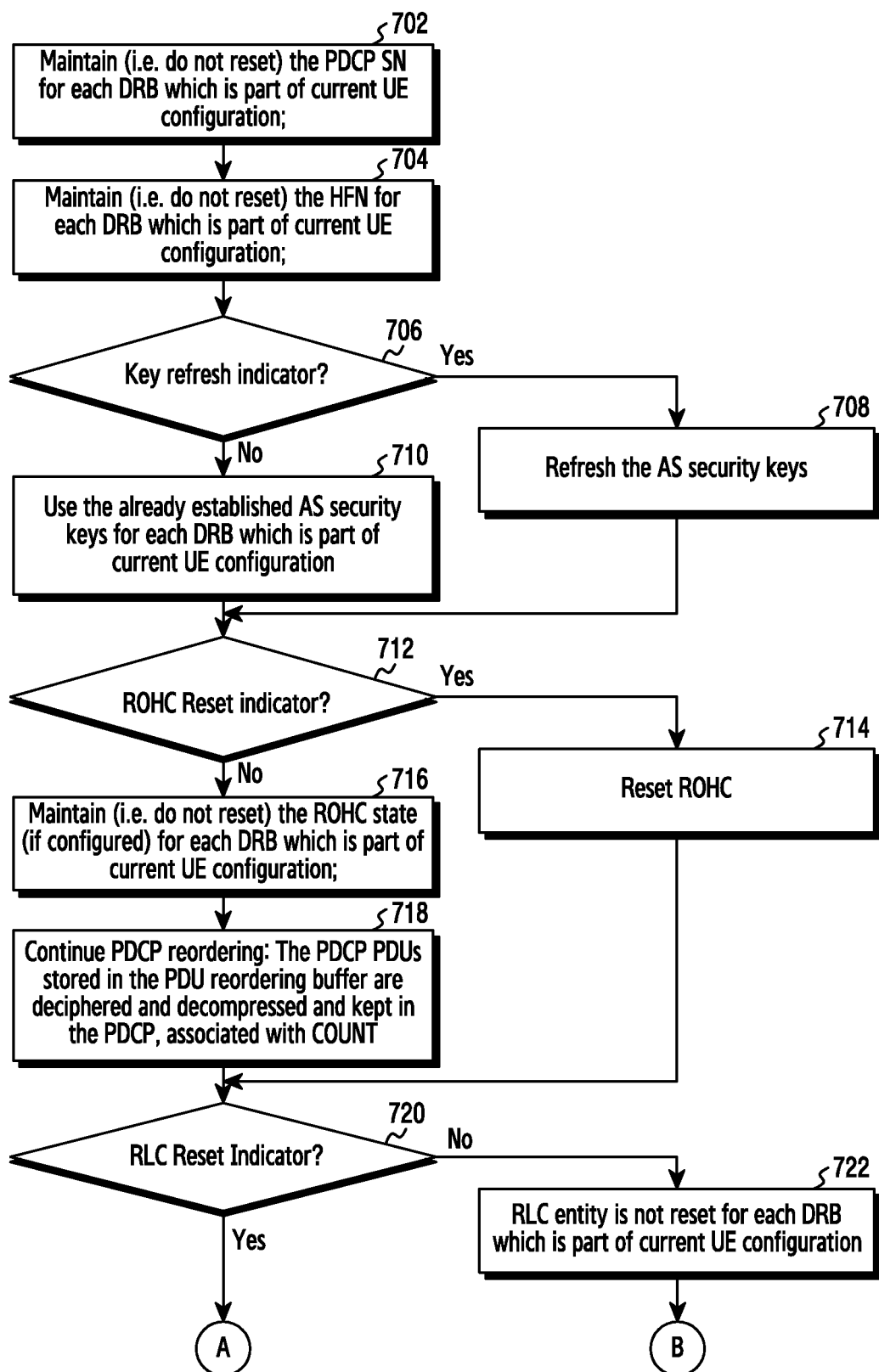
FIGS. 7A to 7C are depicting various operations performed by the UE when the UE switches from a source TRP/DU to a target TRP/DU, according to an embodiment as disclosed herein.
Figure 7B:
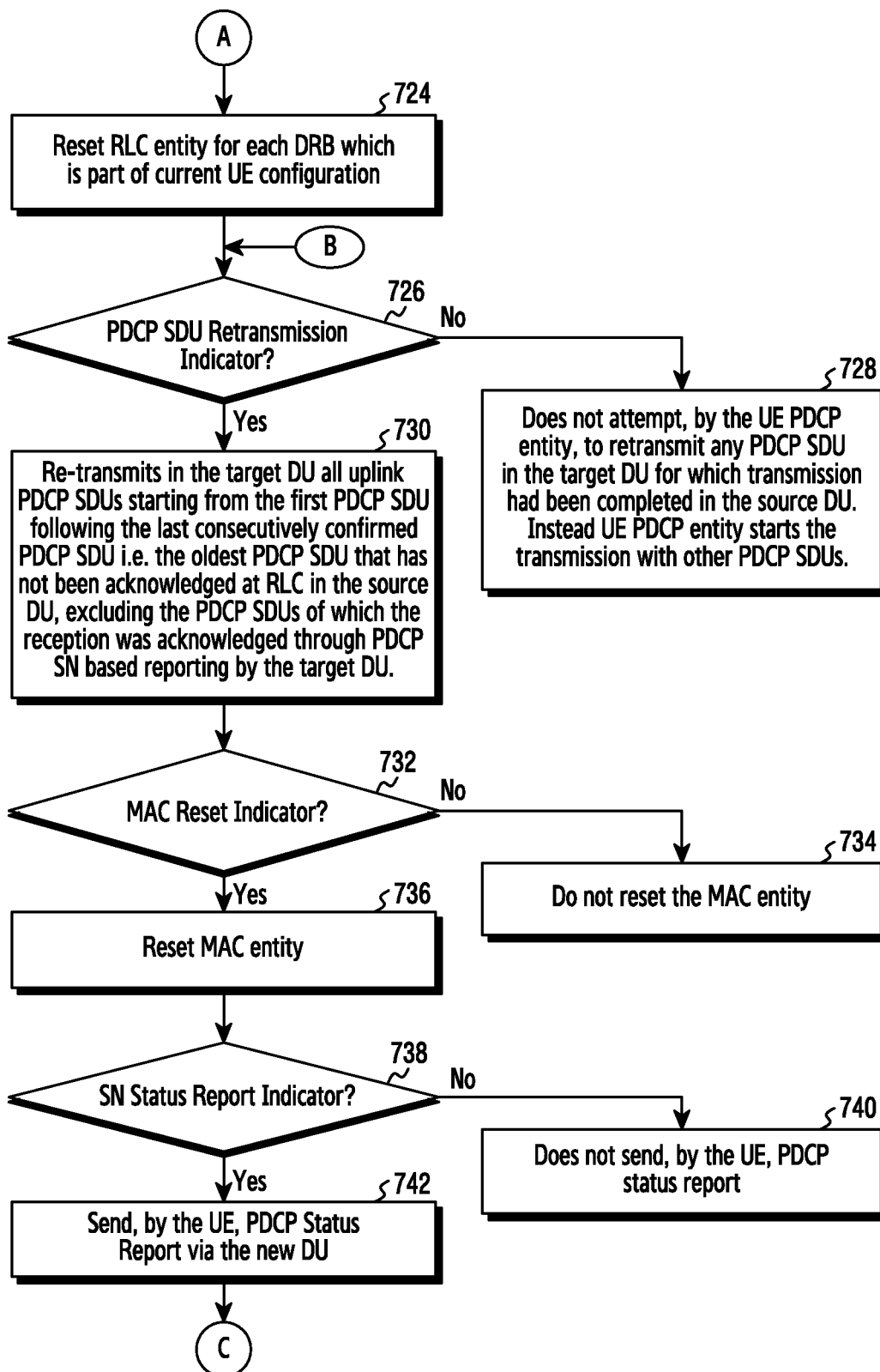
Figure 7C:
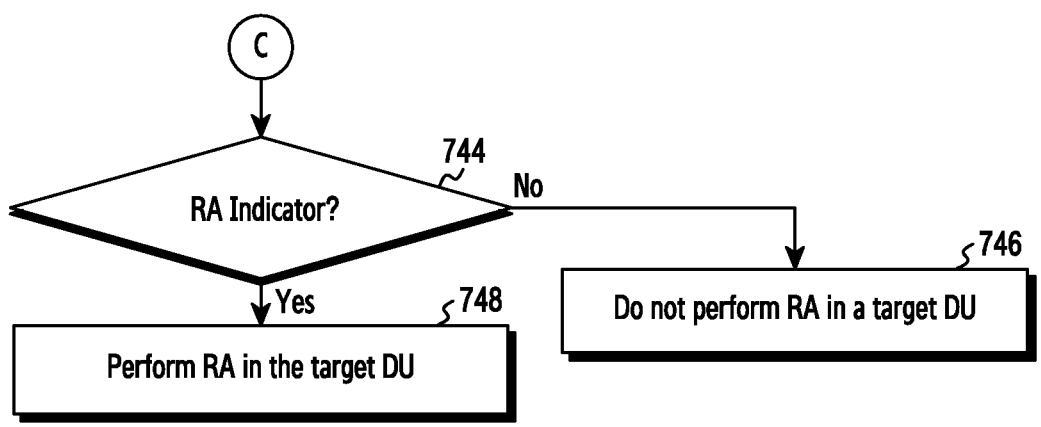
Figure 8A:
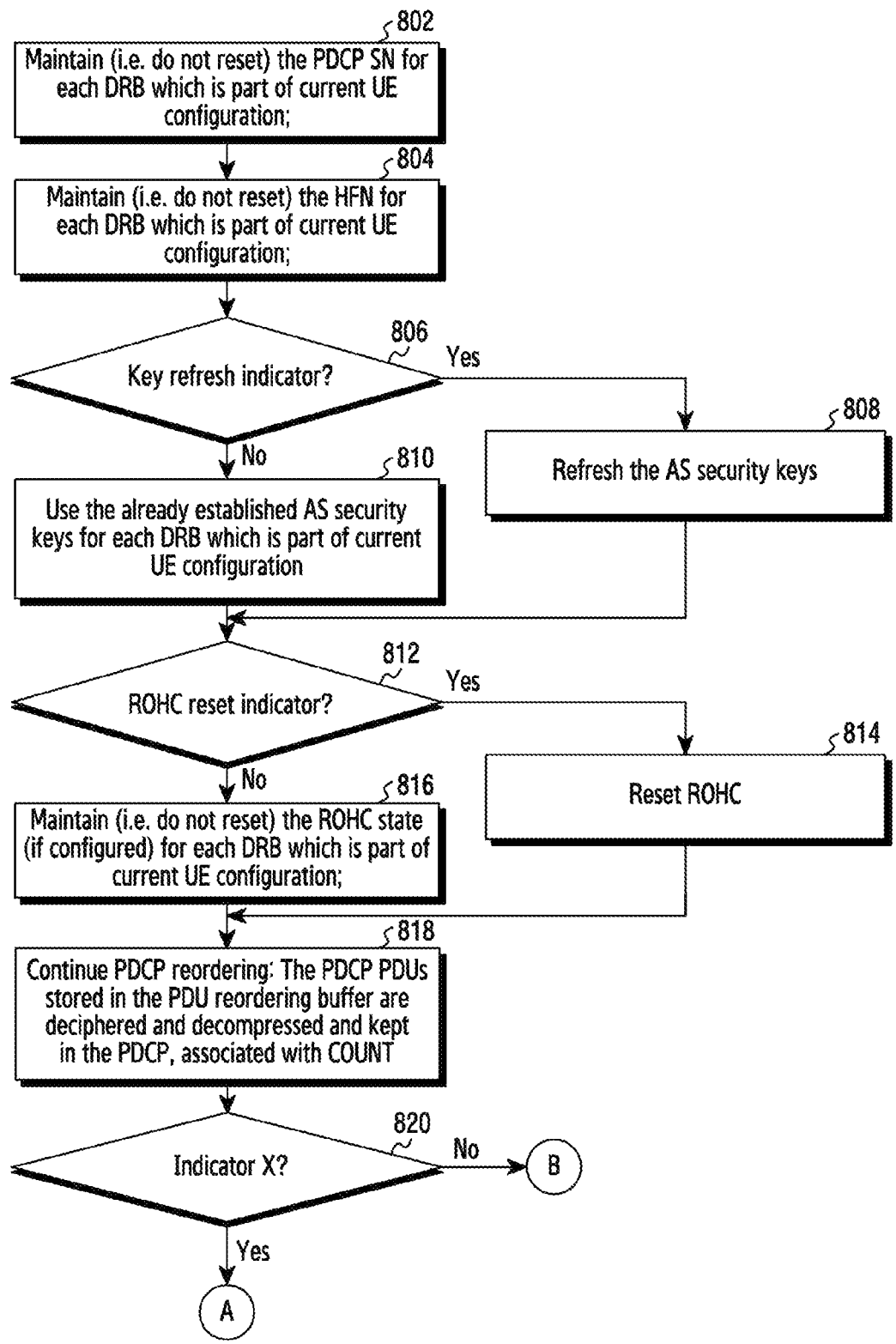
FIGS. 8A and 8B are depicting various operations performed by the UE when the UE switches from a source TRP/DU to a target TRP/DU, according to an embodiment as disclosed herein.
Figure 8B:
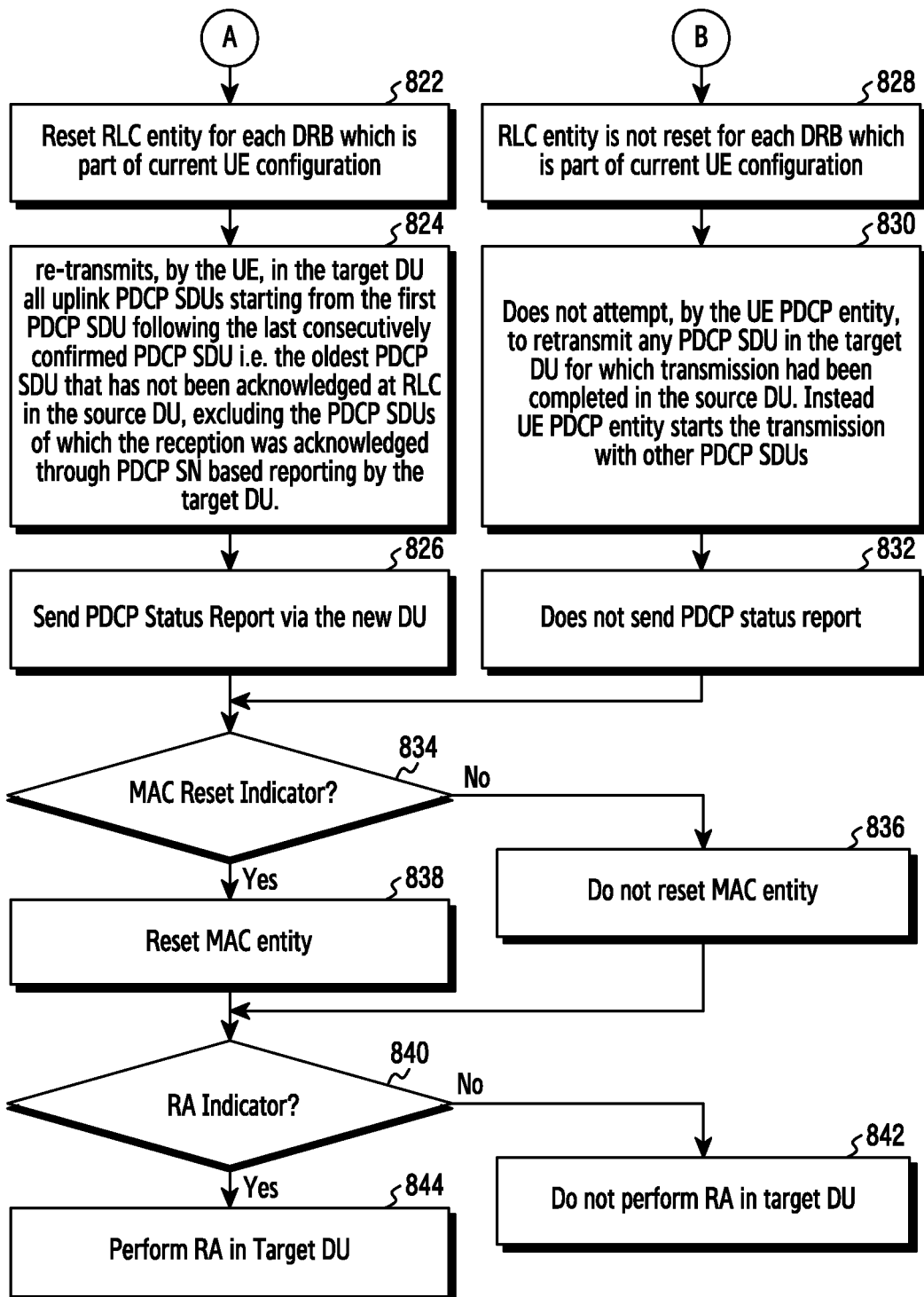

Referring to the FIGS. 7A to 7C, at 702, the UE 102 maintains (i.e. do not reset) the PDCP SN for each DRB which is part of current UE 102 configuration. At 704, the method includes maintains (i.e. do not reset) the HFN for each DRB which is part of current UE 102 configuration. At 706, the UE 102 determines that the Key refresh indication occurs. If the Key refresh indication occurs then, at 708, the UE 102 refreshes the AS security keys.

If the Key refresh indication does not occur then, at 710, the UE 102 uses the already established AS security keys for each DRB which is part of current UE 102 configuration.

At 712, the UE 102 determines that the ROHC reset indication occurs. If the ROHC reset indication occurs then, at 714, the UE 102 resets the ROHC.

If the ROHC reset indication does not occur then, at 716, the UE 102 maintains (i.e. do not reset) the ROHC state (if configured) for each DRB which is part of current UE 102 configuration.

At 718, the UE 102 continues the PDCP reordering (i.e., The PDCP PDUs stored in the PDU reordering buffer are deciphered and decompressed and kept in the PDCP, associated with COUNT).

At 720, the UE 102 determines whether the RLC reset indication occurs. If the RLC reset indication does not occur then, at 722, the UE 102 performs that the RLC entity is not reset for each DRB which is part of current UE 102 configuration.

If the RLC reset indication occurs then at 724, the UE 102 resets the RLC entity for each DRB which is part of current UE 102 configuration.

At 726, the UE 102 determines that the retransmission indication occurs. If the retransmission indication does not occur then at 728, the UE 102 allows that the UE PDCP entity does not attempt to retransmit any PDCP SDU in the

TABLE 2

| | DU change in same CU | | | | |
| --- | --- | --- | --- | --- | --- |
| Functional Indications from NB 103 | Arch 1 (FIG. 2A) | Arch 2 (FIG. 2B) | Arch 3 (FIG. 2C) | Arch 4 (FIG. 2D) | CU change |
| RLC_Reset_Indication | Yes | No | No | No | Yes |
| Retransmission_Indication | Yes | No | No | No | Yes |
| MAC_Reset_Indication | Yes | Yes | Yes | No | Yes |
| SN_Status_Report_Indication | Yes | No | No | No | Yes |
| Key_Refresh_Indication | No | No | No | No | Yes |
| ROHC_Reset_Indication | No | No | No | No | Yes |
| Parameter reset Indication for UM DRB | No | No | No | No | Yes |
| RA_Indication | Yes/No | Yes/No | Yes/No | Yes/No | Yes |

In an embodiment, the network or communication system 100 may only support some or one of the architecture options. A subset of the above indications can be defined in such system.

target DU for which transmission had been completed in the source DU instead UE PDCP entity starts the transmission with other PDCP SDUs.

If the retransmission indication does not occur then at 730, the UE 102 re-transmits in the target DU all uplink PDCP SDUs starting from the first PDCP SDU following the last consecutively confirmed PDCP SDU i.e. the oldest PDCP SDU that has not been acknowledged at RLC in the source DU, excluding the PDCP SDUs of which the reception was acknowledged through PDCP SN based reporting by the target DU.

At 732, the method includes determining whether MAC reset indication occurs. If the MAC reset indication does not occur then, at 734, the MAC entity is not reset.

If the MAC Reset indication occurs then at 736, the MAC entity is reset.

At 738, the UE 102 determines whether SN status report indication occurs. If the SN status report indication does not occur then at 740, the UE 102 does not send PDCP status report.

If the SN status report indication occurs, at 742, the UE 102 sends the PDCP status report via the new DU.

At 744, the UE 102 determines whether RA Indication occurs. If the RA indication does not occur then, at 746, the UE 102 does not perform the RA in target DU. If the RA Indication occurs then at 748, the UE 102 performs the RA in the target DU.

Embodiment 2: In one embodiment, in order to assist the UE 102 for performing appropriate action related to the user plane operation, the network may send one or more indications as listed in Table 3. These indications can be sent in the RRC connection reconfiguration message or any other signaling message (e.g., beam change command) used for the TRP/DU switching to indicate the UE 102 what action it has to take associated with the corresponding function of user plane processing.

eters or variables: Next_PDCP_TX_SN, Next_PDCP_RX_SN, TX_HFN and RX_HFN. In an alternate embodiment for the AM data radio bearers (i.e. data radio bearers configured with RLC in the AM mode), wherein the PDCP sublayer uses parameters or variables TX_NEXT, RX_NEXT and RX_REORD the UE 102 maintains (i.e. not reset to zero) the values of parameters or variables: TX_NEXT, RX_NEXT and RX_REORD. For the DRBs for which the RLC is configured in the UM mode, indication can be there to indicate whether to reset parameters or not.

b) Security Key Handling: the security keys are refreshed if the UE 102 receives an indication (i.e. Key_Refresh_Indication) from the NB to refresh the security keys wherein the key hierarchy associated with the user plane and the control plane is refreshed. Otherwise, the security keys are not refreshed. The UE 102 uses the already established AS security keys for each radio bearer or radio flow which is part of current UE 102 configuration. In an alternate embodiment, the security keys are not refreshed if the UE 102 receives the indication (i.e. Key_Continue_Indication) from the NB 103 to continue using the already established security keys. Otherwise it refreshed the security keys.

c) SN Status Report Handling: The UE 102 sends SN status report (e.g., PDCP SN status) if the UE 102 receives indication X from the NB 103. Otherwise it does not send status report.

d) Retransmission Handling: On receiving an indication (i.e., indication X) from the NB to retransmit, the UE 102 re-transmits in the target DU all uplink PDCP SDUs starting from the first PDCP SDU following the last consecutively confirmed PDCP SDU i.e. the oldest

TABLE 3

| Functional Indications from NB | Purpose |
| --- | --- |
| Indication X | Indicates whether The RLC entity needs to be reset/re-established. The UE 102 retransmits any SDU in the target DU for which transmission is completed in the source DU. Note that the transmission is completed does not mean it is received successfully by the receiver. The UE 102 needs to send the SN status (e.g., PDCP SN status) report. This indication is related to the radio bearer or the flow specific. |
| MAC_Reset_Indication | Indicates whether the MAC needs to be reset or re-established. This indication is related to the UE 102 specific. |
| Key_Refresh_Indication | Indicates whether the UE 102 needs to refresh security keys. This indication can be radio bearer or flow specific or UE 102 specific. |
| ROHC_Reset_Indication | Indicates whether the UE 102 needs to reset the ROHC. This indication is related to the radio bearer or the flow specific. |
| RA_Indication | Indicates whether the UE 102 perform the random access in the target DU for the UL timing. In case RA is not performed, the UL timing in the source DU is used. |

The UE 102 operation in this embodiment of proposed method as illustrated in the FIGS. 6A and 6B after switching from source TRP/DU/Cell to target TRP/DU/Cell is as follows:

a) SN Handling: In an embodiment, for the AM data radio bearers (i.e. data radio bearers configured with the RLC in the AM mode) wherein the PDCP sublayer uses parameters or variables Next_PDCP_TX_SN, Next_PDCP_RX_SN, TX_HFN and RX_HFN, the UE 102 maintains (i.e. not reset to zero) the values of param- PDCP SDU that has not been acknowledged (e.g., at RLC) in the source DU, excluding the PDCP SDUs for which the reception was acknowledged through the PDCP SN based reporting by the target DU.

e) Reordering Handling: The PDCP PDUs stored in the PDU reordering buffer are deciphered and decompressed and kept in the PDCP, associated with the COUNT.

f) ROHC Handling: On receiving the indication (i.e. ROHC_Reset_Indication) from the NB to reset the ROHC, the UE 102 resets ROHC. Otherwise, the UE 102 does not reset ROHC. In an embodiment, on receiving an indication (i.e. ROHC_Continue_Indication) from the NB 103 to not reset ROHC, the UE 102 continues ROHC. Otherwise it resets.

g) RLC Handling: The RLC is reset/re-established for each radio bearer or radio flow which is part of current UE 102 configuration if the UE 102 receives the indication (i.e. Indication X) from the NB 103 to reset RLC. Otherwise it does not reset the RLC.

h) MAC Handling: The MAC entity is reset or re-established if the UE 102 receives the indication from NB to reset the MAC. Otherwise it does not reset MAC.

i) RA Handling: In one embodiment, if the source DU and the target DU belongs to same TAG, the RA is not performed by the UE 102 in the target DU. In alternate embodiment, the network can indicate whether the UE 102 should perform the RA or not.

j) C-RNTI Handling: In one embodiment, if the source DU and the target DU belong to different CU, the C-RNTI is released by the UE. In alternate embodiment, the network can indicate whether the UE 102 should maintain or release the C-RNTI.

k) In one embodiment, if the UE 102 is able to detect itself that the CU 103 has changed then the UE 102 can refresh keys and reset the ROHC even without Key_Refresh_Indication and ROHC_Reset_Indication respectively. In one embodiment, if the UE 102 is able to detect that the cell 104 has changed, then the UE 102 can refresh the keys and reset the ROHC even without Key_Refresh_Indication and ROHC_Reset_Indication respectively.

In an embodiment, the NB can set the indications based on the mobility scenario and its architecture as shown in Table 4.

TABLE 4

| Functional Indications from NB 103 | DU change in same CU | | | | CU change |
|---|---|---|---|---|---|
| | Arch 1 | Arch 2 | Arch 3 | Arch 4 | |
| Indication X | Yes | No | No | No | Yes |
| MAC_Reset_Indication | Yes | Yes | Yes | No | Yes |
| Key_Refresh_Indication | No | No | No | No | Yes |
| ROHC_Reset_Indication | No | No | No | No | Yes |
| RA_Indication | Yes/No | Yes/No | Yes/No | Yes/No | Yes |
| Parameter reset Indication for UM DRB | No | No | No | No | Yes |

Embodiment 3: In an embodiment, in order to assist the UE 102 for performing appropriate action related to user plane operation, the network sends architectural indication as listed in Table 5. These indications can be sent in the RRCConnectionReconfiguration message or any other signaling message (e.g., beam change command) used for the TRP/DU switching or in broadcast signaling. The UE 102 performs the operation (as defined for respective architecture) after determining the architecture based on this indication.

TABLE 5

| Architectural Indications from the eNB | Purpose |
|---|---|
| CU_DU_Split_Type | Arch1<br>CU: PDCP; DU: RLC/MAC/PHY |

TABLE 5-continued

| Architectural Indications from the eNB | Purpose |
|---|---|
| | Arch 2<br>CU: PDCP/RLC; DU: MAC/PHY<br>Arch 3<br>CU: PDCP/RLC$_{low}$;<br>DU: RLC$_{high}$/MAC/PHY<br>Arch 4<br>CU: PDCP/RLC/MAC; DU: PHY |
| Indication Y | Indicates whether the UE 102 needs to perform operation as defined for the mobility scenario 1B. If this indication is not there then the UE 102 performs operation as defined for the mobility scenario 1A based on CU_DU_Split Type |

In an embodiment, a full re-configuration indication can be sent to the UE 102. If the UE 102 receives this indication then a) SN Handling: SN is reset.

b) Security Key Handling: Security keys are refreshed.

c) HFN Handling: Hyper frame number or COUNT is reset.

d) SN Status Report Handling: The UE 102 does not send the SN status report (e.g., PDCP SN status).

e) Retransmission Handling: The UE 102 does not attempt to retransmit any SDU in the target DU for which transmission had been completed in the source DU instead UE 102 starts the transmission with other SDUs.

f) Reordering Handling: Reordering buffer is emptied.

g) ROHC Handling: Reset ROHC.

h) RLC Handling: The RLC is reset/re-established for each radio bearer or radio flow which is part of current UE 102 configuration.

i) MAC Handling: The MAC entity is reset or re-established.

j) RA Handling: The RA is performed by the UE 102 in target DU.

k) All PDCP parameters/variables are reset

In an embodiment, the user plane layer i.e. L2 layer can be modelled with two sub-layers instead of three sub-layers i.e. PDCP, RLC and MAC sub-layers. If the L2 layer is modelled with two layers then it would resemble the architecture option as depicted in FIG. 2C wherein the PDCP and RLC upper forms the upper sub-layer and the RLC lower and MAC forms the lower sub-layer. Regardless of the user plane is modelled as three sub-layer structure or two sub-layer structures, the user plane processing during DU/TRP switching scenarios can be indicated to the UE 102 based on the functional indications as listed in Table 1 to Table 4. For example some functions like concatenation and segmentation which are implemented in the RLC sub-layer may be moved either to the RLC lower and/or the MAC sub-layer. The re-ordering function within the RLC sub-layer and the PDCP sub-layer may be merged together in the PDCP sub-layer and/or the RLC upper sub-layer. Therefore the functional indications listed in Table 1 to Table 4 are applicable for user plane operations regardless of where the corresponding function is implemented.

In one embodiment, the ROHC and the security functions may not be applied in the AS protocols since these functions can be implemented in the gateway node (GW) 101 or a core network (CN) node. In this case, the UP indications for the ROHC and the security may not be needed.

The UE 102 may be configured for the dual connectivity (DC) operation wherein the master cell group (MCG) comprises of one or more LTE carriers and the secondary cell group (SCG) comprises of one or more NR carriers. Alternately, the UE 102 may be configured with the DC operation wherein the MCG comprises the NR carriers while the SCG comprises one of: LTE or NR carriers.

In one embodiment, one or more of the UP indications described earlier can also be sent to the UE 102 configured with the DC operation in below scenarios and the UE 102 perform the operations as explained earlier.

a. When the bearer type is changed from a SCG Split to a SCG bearer (without SeNB change),
b. When the bearer type is changed from a Split to Split bearer
c. When the bearer type is changed from a SCG to SCG bearer
d. When the bearer type is changed from a MCG Split to MCG Split
e. When the bearer type is changed from a MCG Split to MCG bearer Referring to FIGS. 8A and 8B, at 802, the UE 102 maintains (i.e. do not reset) the PDCP SN for each DRB which is part of current UE 102 configuration. At 804, the method includes maintains (i.e. do not reset) the HFN for each DRB which is part of current UE 102 configuration. At 806, the UE 102 determines that the Key refresh indication occurs. If the Key refresh indication occurs then, at 808, the UE 102 refreshes the AS security keys.

If the key refresh indication does not occur then, at 810, the UE 102 uses the already established AS security keys for each DRB which is part of current UE 102 configuration.

At 812, the UE 102 determines that the ROHC reset indication occurs. If the ROHC reset indication occurs then, at 814, the UE 102 resets the ROHC.

If the ROHC reset indication does not occur then, at 816, the UE 102 maintains (i.e. do not reset) the ROHC state (if configured) for each DRB which is part of current UE 102 configuration.

At 818, the UE 102 continues the PDCP reordering (i.e., The PDCP PDUs stored in the PDU reordering buffer are deciphered and decompressed and kept in the PDCP, associated with COUNT).

At 820, the UE 102 determines whether the indication X occurs. If the indication X does not occur then, at 828, the UE 102 performs that the RLC entity is not reset for each DRB which is part of current UE 102 configuration.

At 830, the UE PDCP entity does not attempt to retransmit any PDCP SDU in the target DU for which transmission had been completed in the source DU instead UE PDCP entity starts the transmission with other PDCP SDUs. At 832, the UE 102 does not send PDCP status report.

If the indication X occurs then, at 822, the UE 102 resets the RLC entity for each DRB which is part of current UE 102 configuration.

At 824, the UE 102 re-transmits in the target DU all uplink PDCP SDUs starting from the first PDCP SDU following the last consecutively confirmed PDCP SDU i.e. the oldest PDCP SDU that has not been acknowledged at RLC in the source DU, excluding the PDCP SDUs of which the reception was acknowledged through PDCP SN based reporting by the target DU.

At 826, the UE 102 sends the PDCP status report via the new DU.

At 834, the method includes determining whether the MAC reset indication occurs. If the MAC reset indication does not occur then, at 836, the MAC entity is not reset.

If the MAC Reset indication occurs then at 838, the MAC entity is reset.

At 840, the UE 102 determines whether RA Indication occurs. If the RA indication does not occur then, at 842, the UE 102 does not perform the RA in target DU. If the RA Indication occurs then at 844, the UE 102 performs the RA in the target DU.

Figure 9:
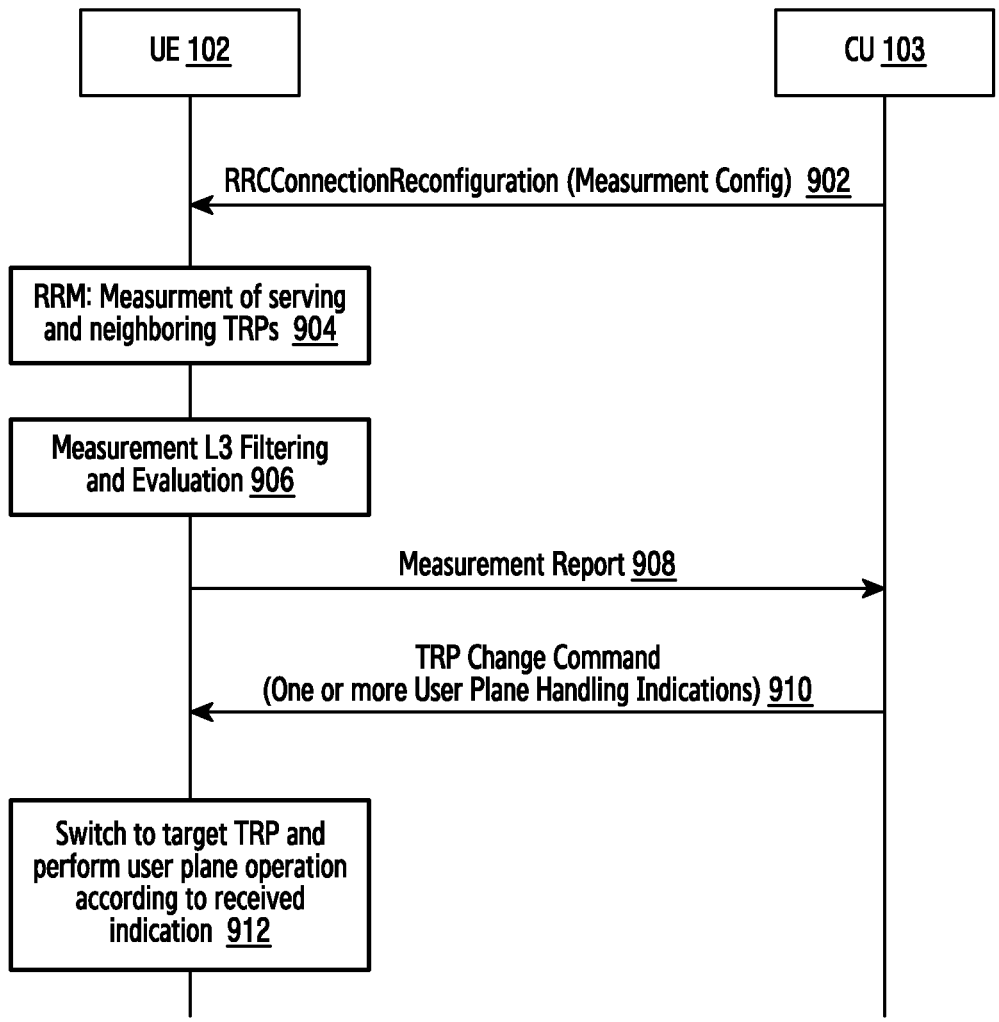
FIGS. 9-11 are illustrating sequence diagrams depicting various operations performed, by the UE, for switching from the source TRP/DU to the target TRP/DU, according to an embodiment as disclosed herein.
Figure 10:
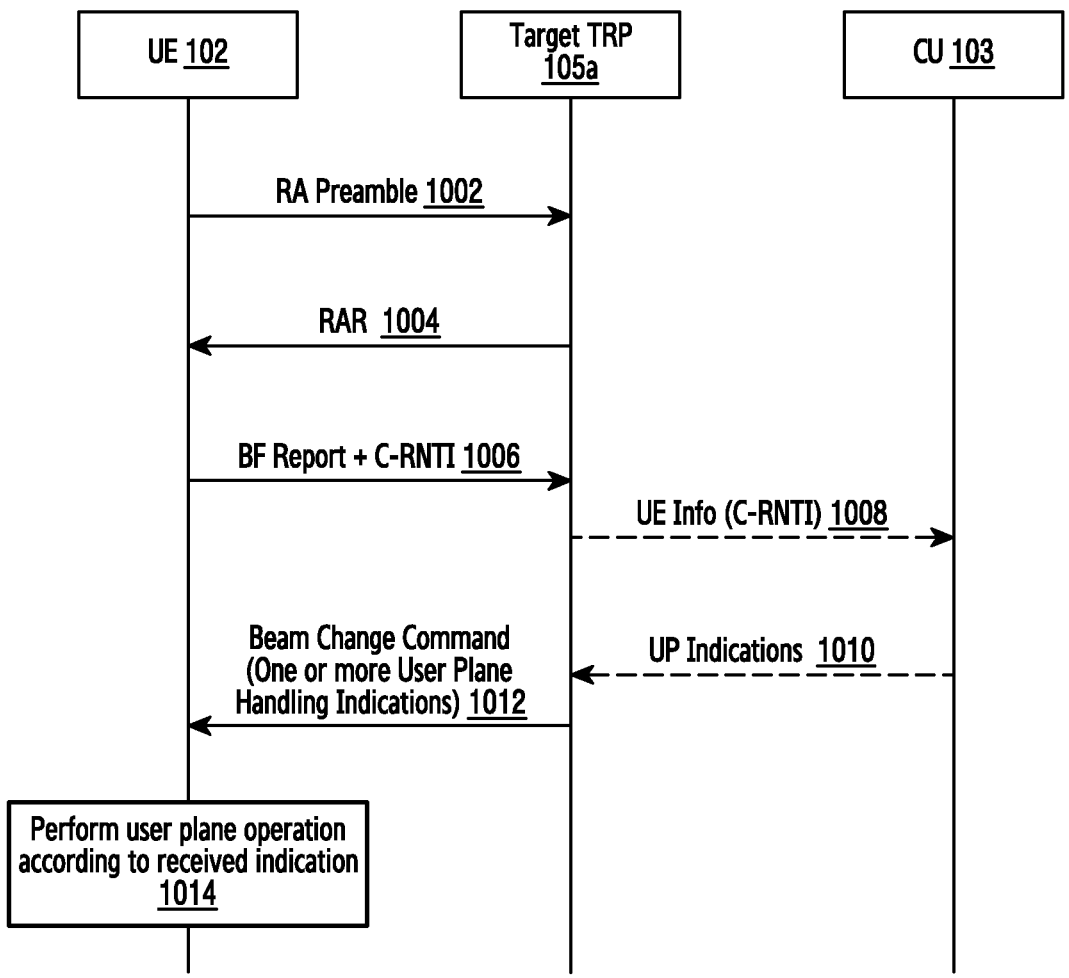
Figure 11:
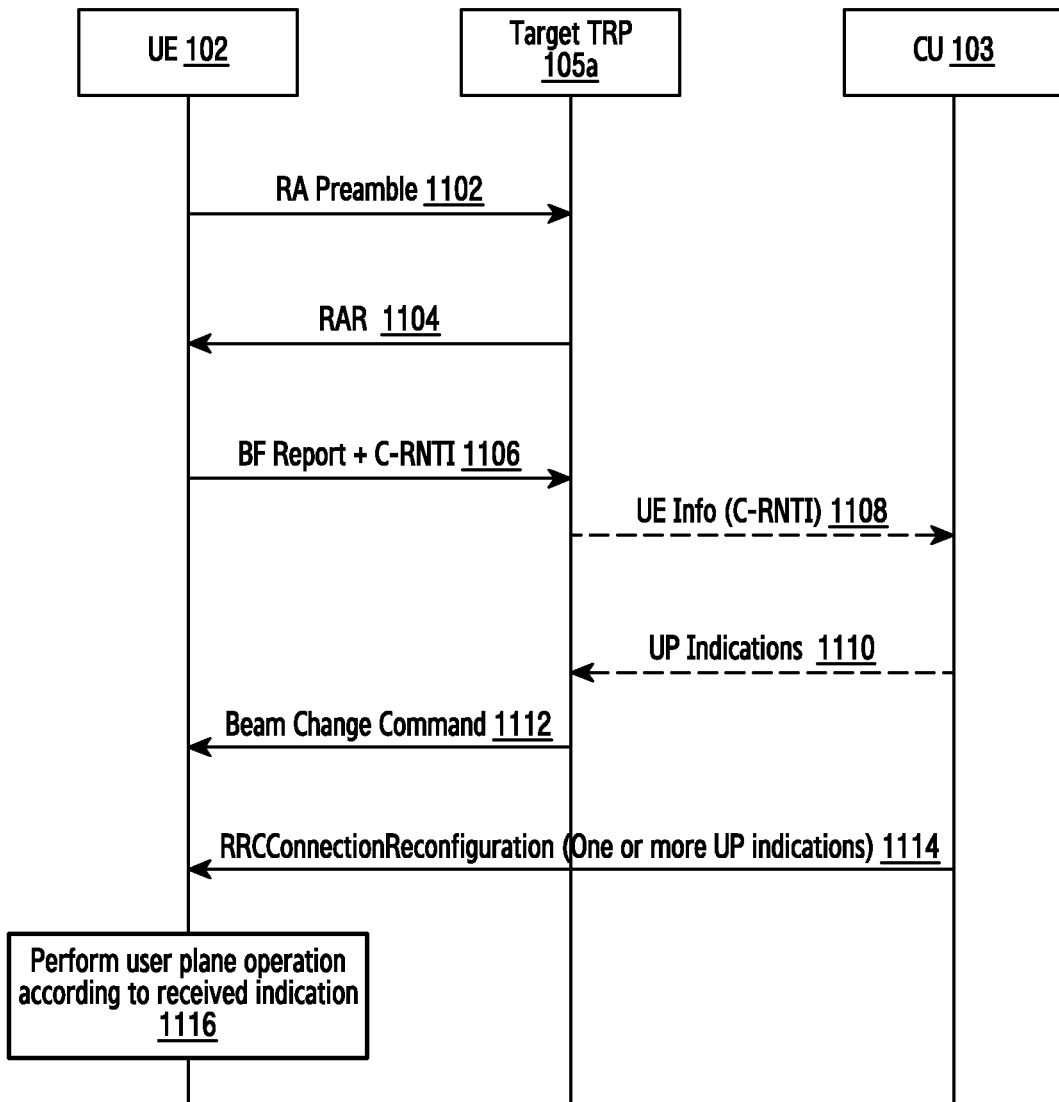
Figure 12A:
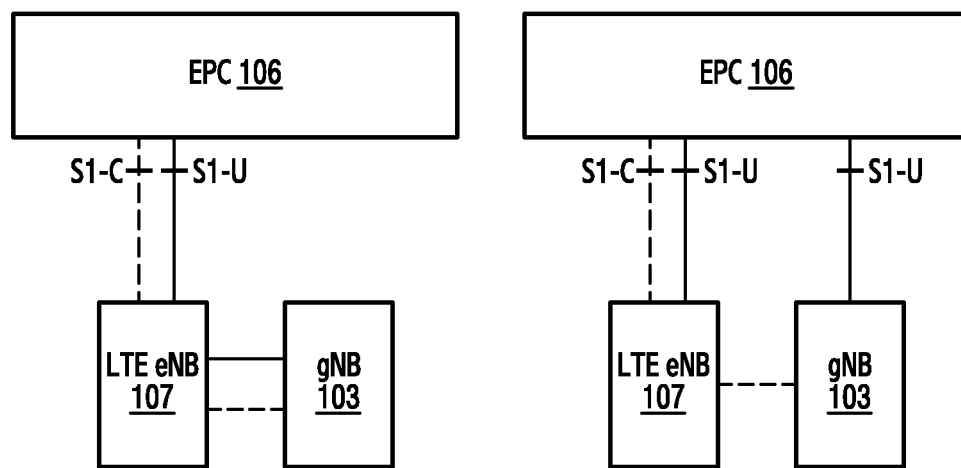
FIGS. 12A to 12E illustrate various architectures explained for a Service Data Adaptation Protocol (SDAP) configuration handling, according to an embodiment as disclosed herein.
Figure 12B:
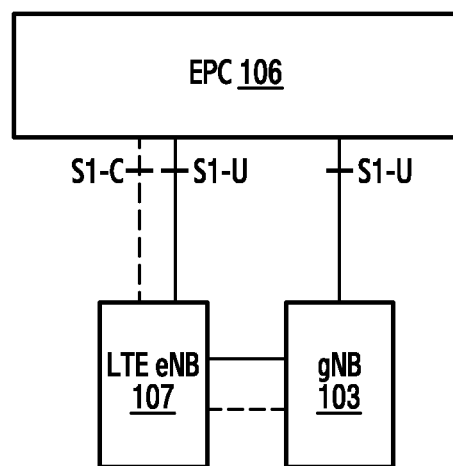
Figure 12C:
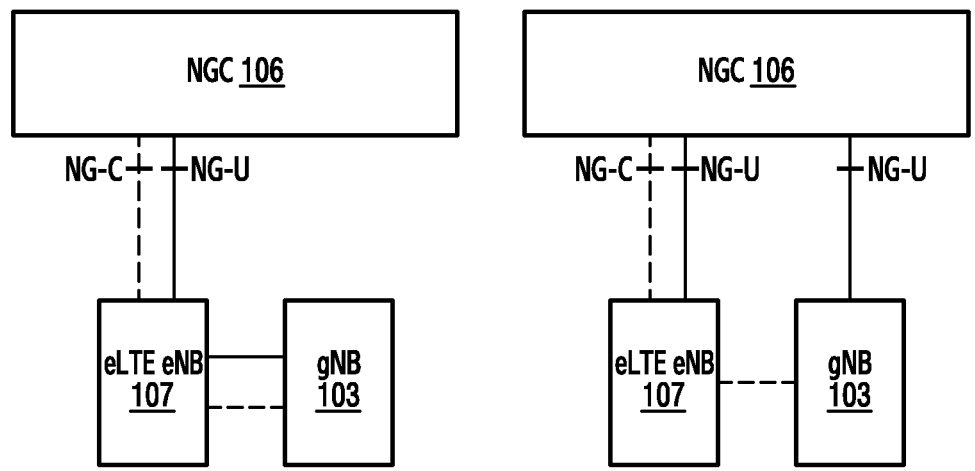
Figure 12D:
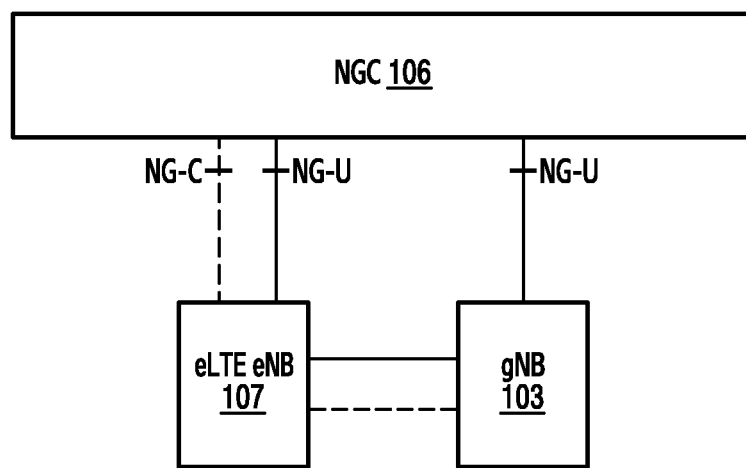
Figure 12E:
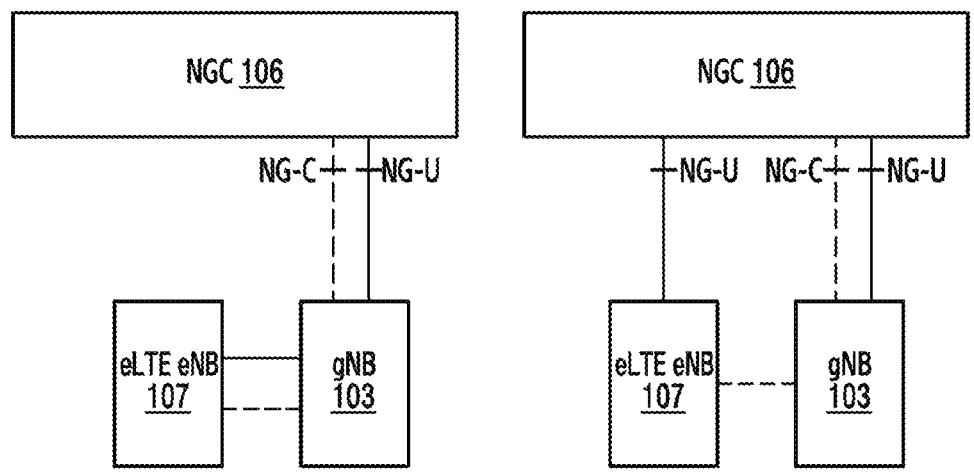

FIGS. 9-11 are illustrating sequence diagrams depicting various operations performed, by the UE 102, for switching from the source TRP/DU to the target TRP/DU, according to an embodiment as disclosed herein.

In one embodiment, the procedure for TRP/DU switching (as shown in the FIG. 9) can be as follows:

At 902, the measurement configuration is provided by the CU/eNB 103 to the UE 102 through the serving TRP for serving frequency. At 904, the UE 102 performs the BRS based or some other RS based measurements of neighbouring TRPs upon detecting neighbouring TRP/DU at the physical layer and determining the TRP-Ids. At 906, filtering of measurements is performed at the L3/RRC layer for newly detected TRP(s)/DU(s). Further, the UE 102 then evaluates the criteria for measurement comparison of the serving TRP/DU and one or more neighbouring TRP(s)/DU(s). If the criteria to send the measurement report are met then, at 908, the UE 102 sends the measurement report(s) associated with the serving and neighbouring TRP/DU. The measurement report is sent via the serving TRP to the CU/eNB 103. The measurement report may carry RSRP/RSRQ measurements based on the BRS or some other RS of the serving TRP and one or more neighbouring TRP staged with the TRP-Id and TRP-Group Id or Cell-Id. In case of the beamforming system, it may include the RSRP/RSRQ of N best DL beams of serving TRP tagged with Beam-Id where N is the number of DL beams whose RSRP/RSRQ exceeds a threshold. Alternately it may carry a TRP quality metric which is obtained by summation or averaging of RSRP/RSRQ of N best DL beams.

The measurement report is processed by the CU 103 and the CU 103 decides whether the TRP 105 needs to be switched or not. For switching the serving TRP, the CU 103 sends a signalling message i.e. RRC message including the target TRP-Id. At 910, the signalling message is sent to the UE 102 through the serving TRP. At 912, the signalling message may include one or more functional indications discussed earlier for handling the user plane operation in case of switching. It may also include information (e.g., DL beam ID, DL/UL PHY configuration and radio resource configuration, radio bearer/flow configuration etc.,) about the target TRP. It may also include the switching time.

In another embodiment, the procedure for the TRP/DU switching can be as shown in the FIG. 10 and the FIG. 11. In this case, the UE 102 performs the random access procedure with the target TRP. The UE 102 identity can be obtained by the target TRP from the UE 102 in MSG3. The target TRP forwards this to the CU 103 and the CU 103 then can send the UP indications to the UE 102 directly or via target TRP. In one embodiment, the target TRP itself can send the UP indications to the UE 102. Such approach where the target TRP sends the TRP switch/change command or beam change command to the UE 102 as shown in the FIGS. 8A and 8B and 9. The system information is categorized in the minimum system information which is broadcasted on the PBCH and other system information which may be broadcasted or sent through the dedicated UE-specific signalling on the PDSCH. The other system information comprises one or more system information blocks broadcasted during system information time window called SI-windows.

In an embodiment, the random access response (RAR) sent by the NB 103 or the TRP 105 upon detection of the RA preamble can include a broadcast indicator/FLAG. If the broadcast indicator is set to "1" or if the FLAG is set as 'TRUE' then one or more UEs 102 receiving the RAR can interpret the eNB 103 will broadcast one or more system information blocks associated with the other system information. If the broadcast indicator/FLAG is not included in the MIB or set to '0' or 'FALSE' then one or more UEs 102 receiving the RAR can interpret the NB will not broadcast one or more system information blocks of the other system information and UEs 102 need to acquire the other system information through explicit request/response mechanism. In another embodiment, the random access response (RAR) sent by the eNB 103 if it includes the broadcast indicator/ FLAG set to 1/TRUE shall also include the timing information of the one or more SI-windows associated with one or more SI blocks of the other system information. The SI-windows are indicated in terms of the system frame number with reference to SFN zero i.e. first radio frame.

UE Identity Handling and RLF Aspects: If the UE 102 is able to send the measurement report to the serving TRP comprising the RSRP/RSRQ associated with one or more TRP(s), the serving TRP needs to forward the measurement report to the NB/CU 103 for deciding the TRP switching. The eNB/CU 103 prepares the TRP switch/change command including the one or more functional indications, L1/12 configuration and radio resource configuration, radio bearer/ flow configuration and provides to the serving TRP to be sent to the UE 102. Due to poor signal quality or if the UE 102 is at an edge of the TRP/DU coverage area, then the UE 102 may not be able to receive the TRP switch/change command or may not be able to send the measurement report itself to the serving TRP/DU 105 for TRP switching. This situation is similar to the radio link failure (RLF) condition encountered by the UEs 102 in the LTE networks during handover from one cell to another cell. However, the situation is slightly different for the TRP switching within the same NB/CU (i.e. mobility scenario 1A) because the UE context is present in the CU/NB. If the TRP switching is between TRP(s) of different CU/NB (i.e. mobility scenario 1B) then the source CU needs to prepare the target CU by making the UE context available at the target CU.

Further, the processing time to prepare the TRP switch/ change command in mobility scenario 1A is relatively smaller than mobility scenario 1B. Therefore in the poor signal conditions or at the TRP/DU coverage area edge scenario the probability of receiving the TRP switch/change command is less in the mobility scenario 1B compared to the mobility scenario 1A. However, in the mobility scenario 1A even if the UE 102 does not receive the TRP switch/change command and the UE 102 try to connect with target TRP (i.e. UE based mobility) the UE 102 connection can be resumed in the target TRP by sending the TRP switch/ change command from the target TRP. The UE based mobility can be supported without waiting for the TRP switch/change command from the serving TRP. This is feasible if the UE 102 is provided with the list of TRP-Group Id and associated TRP-Ids so that if the newly detected TRP by the UE 102 for which the evaluation criteria is met belongs to list of TRP-Group Id/TRP Id provided by CU/NB 103 then the UE 102 is allowed to connect to the target TRP by initiating random access in the target TRP without waiting for the TRP switch/change command from the source TRP. In such scenario, along with the measurement report, the UE 102 sends the indication to the source TRP. This indication can also be sent by the UE 102 after sending the measurement report. This indication can be sent through the RRC signalling or the MAC level signalling. The source TRP interprets the indication as the UE 102 will not wait for the reception of the TRP switch command and the source TRP can stop scheduling the UE 102. Most user plane operation at the UE 102 is frozen temporarily, however, the UE 102 can initiate random access at the target TRP autonomously selected by the UE 102 from one of the TRPs reported in the measurement report.

If the target TRP does not belong to the list of TRP-Group Id/TRP Id provided by the CU/NB 103, the UE 102 is not allowed to connect to the target TRP autonomously just after sending the measurement report. In this scenario, the UE 102 shall wait for the TRP switch/change command. If the UE 102 does not receive the TRP switch/change command and the UE 102 had declared RLF based on the expiry of the RLF timer (i.e. T310 like timer of LTE) at the RRC level, the UE 102 shall then try to re-establish the RRC connection with the target TRP. Most user plane operation at the UE 102 is frozen or suspended temporarily at the UE 102 except for initiating the random access at the target TRP autonomously selected by the UE 102 from one of the TRPs reported in the measurement report. The difference between the two procedures is as follows:

a) If target TRP belong to the TRP-Group id/TRP-Id then the UE 102 sends indication to the source TRP and can autonomously connect to the target TRP without waiting for TRP switch/change command. The UE 102 suspends or freezes the user plane operation and receives the TRP switch/change command from the target TRP to resume the data exchange with the target TRP based on the functional indications received from target TRP.

b) If the target TRP does not belong to the TRP-Group id/TRP-Id then the UE 102 sends the measurement report to source TRP and waits for the reception of TRP switch/change command. If the RLF condition is declared by the UE RRC and the TRP switch/change command not received then the UE 102 sends RRC re-establishment request message to target TRP and either receives RRC re-establishment message or RRC re-establishment reject message from the target TRP. The UE 102 suspends or freezes the user plane operation and upon reception of the RRC re-establishment message The UE 102 resumes the RRC connection with the target TRP. If RRC re-establishment reject message received then UE 102 enters the idle mode and performs cell selection and sends RRC connection request on TRP of selected cell.

In both case, the UE 102 is required to send the C-RNTI allocated by the source TRP and the source TRP-Group Id and source TRP Id (i.e. source Cell-Id) to the target TRP. In the RRC re-establishment case, the UE 102 is also required to include the short MAC-I to resume the security context whereas in the UE 102 based autonomous mobility the UE 102 is not required to include the short MAC-I.

Referring to the FIG. 10, at 1002, the UE 102 sends the RA Preamble to the target TRP 105*a*. At 1004, the target TRP 105*a* sends the RAR to the UE 102. At 1006, the UE 102 sends the BF Report along with the C-RNTI to the target TRP 105*a*. At 1008, the target TRP 105*a* sends the UE Info along with the C-RNTI to the CU 103. At 1010, the CU 103 sends the UP Indications to the target TRP 105*a*. At 1012, the target TRP 105*a* sends the beam change command including one or more user plane handling indications to the UE 102. At 1014, the UE 102 performs the user plane operation according to the received indication Referring to the FIG. 11, at 1102, the UE 102 sends the RA preamble to the target TRP 105*a*. At 1104, the target TRP 105*a* sends the RAR to the UE 102. At 1106, the UE 102 sends the BF report along with the C-RNTI to the target TRP 105*a*. At 1108, the target TRP 105*a* sends the UE Info along with the C-RNTI to the CU 103. At 1110, the CU 103 sends the UP Indications to the target TRP 105*a*. At 1112, the target TRP 105*a* sends the beam change command to the UE 102. At 1114, the CU 103 sends the RRCConnectionReconfiguration including one or more UP indications to the UE 102. At 1116, the UE 102 performs the user plane operation according to the received indication.

FIGS. 12A to 12E illustrate various architectures explained for the SDAP configuration handling, according to an embodiment as disclosed herein.

SDAP Configuration Handling: The 5G system introduces the concept of QoS flows replacing the EPS bearer concept in the core network. This means the user plane between the CU/NB 103 and the gateway 101 is based on the QoS flow instead of the S1 bearer in the LTE system. For the particular UE 102, there can be one or more QoS flows between the CU/NB 103 and the data gateway 101 depending on the characteristics of the application/service and the QoS handling of the traffic. The EPS bearer handles all the user packets mapped to the EPS bearer with the same QoS. Within the EPS bearer, there is no further differentiated handling of the user plane packets. The QoS flow concept of the 5G system overcomes this drawback of the EPS bearer concept of the LTE system. The packets mapped to the different QoS flows belonging to the UE 102 traffic can be handled differently. To achieve the same differentiated handling in the LTE system, multiple EPS bearers with different QoS parameters need to be created. In the 5G system, all the different QoS flows of the UE 102 are handled by the PDU session between the CU/NB 103 and the data gateway 101. The UE 102 may have more than one PDU session depending on the number of the PDN connections. However, for one PDN connection one PDU session is created. At high level, the PDU session can be analogous with the EPS bearer in the LTE system.

However, on the radio interface, the 5G system 100 has retained the DRB concept for user plane handling. This requires that the one or more QoS flow belonging to the PDU session of the UE 102 is mapped to the DRB depending on the QoS requirement. The mapping of the QoS flow to the DRB is done in the RAN node i.e. the CU/NB 103 within the new user plane protocol layer called SDAP (Service Data Adaptation Protocol) layer which is placed above the PDCP. The SDAP entities are located in the SDAP sublayer. Several SDAP entities may be defined for the UE. There is the SDAP entity configured per cell group for each individual PDU session. The SDAP entity in the SDAP sublayer performs mapping between the QoS flow and the data radio bearer for both the DL and the UL.

For non-standalone deployments of the 5G system 100 where inter-working between the LTE and the NR is envisioned within the dual connectivity framework there are several options to deploy the LTE-NR DC. In an architecture (also referred as architecture option 3 in the 3GPP (as shown in the FIG. 12A)), a LTE eNB 107 is Master node (MN), a NR gNB 103 is Secondary node (SN), and the MN is connected to an EPC 106. In this option, the MCG split bearer is configured to use the gNB 103.

In another architecture option i.e. 3A, the LTE eNB 107 is Master node (MN), the NR gNB 103 is Secondary node (SN) and the MN and SN are connected to the EPC 106. In option 3A, there is a direct SCG bearer to use the gNB 103. In another architecture option 3X (as shown in the FIG. 12B), the LTE eNB 107 is Master node (MN), the NR gNB 103 is Secondary node (SN) and the MN and SN are connected to the EPC 106. In this option, the SCG split bearer is configured to use the gNB 103. The architecture option3/3a/3x is also called E-UTRAN NR dual connectivity i.e. EN-DC.

In another architecture, the LTE eNB 107 is Master node (MN), the NR gNB 103 is Secondary node (SN), and the MN is connected to the 5G Core. In this option MCG split bearer is configured to use the gNB 103. In another architecture option i.e. 7A, LTE eNB 107 is Master node (MN), the NR gNB 103 is Secondary node (SN) and the MN and SN are connected to the 5G core. In option 7A (as shown in the FIG. 12C), there is a direct SCG bearer to use the gNB 103. In another architecture option 7X (as shown in the FIG. 12D), the LTE eNB 107 is Master node (MN), the NR gNB 103 is Secondary node (SN) and the MN and SN are connected to the 5G core. In this option SCG split bearer is configured to use gNB 103.

In another architecture (also referred as architecture option 4 (as shown in the FIG. 12E)) the NR gNB 103 is Master node (MN) and the LTE eNB 107 is Secondary node (SN), and the MN is connected to the 5G Core. In this option, the MCG split bearer is configured to use the eNB. In another architecture option i.e. 4A, the NR gNB 103 is Master node (MN), the LTE eNB 107 is Secondary node (SN) and the MN and SN are connected to the 5G core. In option 4A, there is a direct SCG bearer to use the eNB.

The SDAP layer may not be needed in all architecture options, so that the SDAP layer configuration should be optional for EN-DC from the QoS mapping perspective. This is because the EN-DC architecture will retain the EPS bearer concept because the core is the EPC 106. However, the NR UE which supports the LTE-NR interworking is not aware of the architecture option the operator has deployed and in roaming scenarios different architecture options may be supported by different network operators. In other words this means the network architecture is not exposed to the NR UE and hence some kind of indication is required to the UE, whether the UE 102 creates SDAP entity or not.

If the 5G CU/NB 103 or the gNB 103 is connected to legacy 4G nodes i.e. the EPC 106 then the SDAP entity is not required. The question is how the UE 102 knows in what scenario the SDAP entity is required and in what scenario it is not required.

In an embodiment, for architecture option 3/3a/3x: SDAP layer is not needed as core network is the EPC 106 which does not support QoS Flows In an embodiment, for architecture option 4/4a: SDAP layer is needed as core network is 5G core which support QoS Flows In an embodiment, for architecture option 7/7a/7x: SDAP layer is needed as core network is 5G core which support QoS Flows In the architecture option 3/3a/3x from the UE 102 point of view there is one to one mapping between the DRB and the EPS bearer so the SDAP layer is not needed. There is no PDU session nor QoS flow concept for architecture option 3/3a/3x.

In an example (as in architecture option 3/3a/3x), the LTE is master node and the NR gNB 103 is secondary node or slave. For the MCG bearer i.e. DRB handled by the MN (i.e., LTE eNB 107): the SDAP layer is not needed in the LTE UP stack because the DRB is mapped to the EPS bearer in the EPC 106. For the MCG split bearer i.e. DRB handled by the MN (i.e., LTE eNB 107): SDAP layer is not needed in LTE UP stack because the DRB is mapped to EPS bearer in the EPC 106. For the SCG bearer i.e. DRB handled by the SN (i.e., NR gNB 103): The SDAP layer is not needed in the NR UP stack because the DRB is mapped to the EPS bearer in the EPC 106. Similarly for the SCG split bearer, the SDAP layer is not needed in the NR UP stack because the DRB is mapped to the EPS bearer in the EPC 106. In another example, (as in architecture option 7/7a/7x): the LTE is master node and the NR gNB 103 is secondary node or slave. For the MCG or MCG split bearer i.e. DRB handled by the MN: the SDAP layer is needed in the UP stack of the LTE because the DRB needs to be mapped to appropriate QoS flow which is handled by the PDU session towards the data gateway in the 5G Core. For the SCG bearer i.e. DRB handled by the SN (i.e., NR gNB 103): the SDAP layer is needed in NR UP stack because the DRB needs to be mapped to appropriate QoS flow which is handled by the PDU session towards the data gateway in the 5G Core. Similarly for the SCG split bearer, the SDAP layer is needed in the NR UP stack because the DRB needs to be mapped to appropriate QoS flow which is handled by the PDU session towards the data gateway 101 in the 5G core.

Based on the above explanation, in case of LTE-NR dual connectivity, the SDAP layer needs to be created for the radio bearer (MCG or SCG or SCG split or MCG split) depending on the network architecture. A method is needed which enables the UE 102 to decide whether to create SDAP entity or not in UP stack for a radio bearer (MCG or SCG or SCG split or MCG split). For SCG and SCG split, the UP stack is the NR UP stack. For MCG and MCG split, the UP stack is LTE UP stack.

In an embodiment when the DRB (MCG or SCG or MCG split or SCG Split) is configured, the EPS bearer ID is included in the DRB configuration. Since the EPS bearer ID is included in the DRB configuration, the UE 102 implicitly understands that there is no need to create the new SDAP layer entity. Further, the network signals the EPS bearer ID for the architecture option (e.g., 3/3a/3x) in which the MN/SN are connected to the EPC 106. Further, the network does not signal the EPS bearer ID for the architecture option (e.g., 7/7a/7x or 4/4a) in which the MN/SN are connected to 5G core. If the EPS bearer ID is not included in DRB configuration, the UE 102 creates the SDAP layer entity. This solution requires that the EPS bearer ID should be made optional in the LTE DRB configuration. It also requires that the EPS bearer ID should be optionally included in the NR DRB configuration. Further, the SDAP layer entity is associated with the PDU session. In an embodiment, if the PDU session ID is included in the DRB configuration then the UE 102 creates the SDAP layer entity and if the EPS bearer ID is included in the DRB configuration then the UE 102 does not create SDAP layer entity. This solution requires that PDU session ID should be optionally included in the LTE DRB configuration. In an embodiment, if the SDAP configuration (includes the PDU Session ID, QoS flow to DRB mapping, etc.,) is included in the DRB configuration then the UE 102 creates the SDAP layer entity. This solution requires that the SDAP configuration should be optionally included in the LTE DRB configuration.

In an embodiment, when the DRB (MCG or SCG or MCG split or SCG Split) is configured, the DRB to QoS flow mapping is included in the DRB configuration. Since the DRB to QoS flow mapping is included in the DRB configuration, the UE 102 implicitly understands that there is need to create the new SDAP layer entity. The network signals the DRB to QoS flow mapping for the architecture option (e.g., 7/7a/7x or 4/4a) in which the MN/SN are connected to the 5G core. The network does not signal DRB to QoS flow mapping for the architecture option (e.g., 3/3a/3x) in which MN/SN are connected to the EPC 106. If the DRB to QoS flow mapping is not included in the DRB configuration, the UE 102 does not create the SDAP layer entity. This solution requires that the DRB to the QoS flow mapping should be made optional in the LTE DRB configuration. It also requires that the DRB to QoS flow mapping should be optionally included in the NR DRB configuration.

In another embodiment, when the DRB (MCG or SCG or MCG split or SCG Split) is configured, if no EPS bearer ID is included in the DRB configuration, but if the DRB to QoS flow mapping is included in the DRB configuration, then the UE 102 creates SDAP layer entity.

In another embodiment, when the DRB (MCG or SCG or MCG split or SCG Split) is configured, there can be explicit indication in the DRB configuration to create the SDAP layer entity. In an embodiment, the network signals this indication to create the SDAP layer entity for the architecture option. (e.g., 7/7a/7x or 4/4a). It is to be noted that above methods can be applied for both MCG and SCG irrespective of whether CG is LTE or NR.

In another embodiment, the network may indicate the CN connectivity (EPC 106 or 5GC) in dedicated signalling (e.g., RRC connection reconfiguration or NAS signalling) or in broadcast signalling (e.g., system information). Further, the UE 102 creates the SDAP layer entity if the CN connectivity is the 5GC otherwise not. If the LTE eNB 107 is the MN and the CN connectivity is the 5GC, the UE 102 creates the SDAP layer entity in the LTE UP stack. If the LTE eNB 107 is MN and the NR gNB 103 is SN and CN connectivity is 5GC, the UE 102 creates the SDAP layer entity in the NR UP stack if the SCG bearer or SCG split bearer is configured.

In another scenario (scenario 2), for architecture Option 3a, LTE is Master node (MN) and the NR gNB 103 is secondary node or slave; the SCG bearer is the DRB handled by the NR gNB 103: the SDAP layer is not needed in the UP stack of the NR because the SCG DRB is terminated as the EPS bearer i.e. 51 bearer towards the SGW.

For architecture option 7a: the LTE is Master node (MN) and the NR gNB 103 is secondary node (SN) or slave; SCG bearer is the DRB handled by the NR gNB 103: The SDAP layer is needed in the UP stack of the NR because the SCG DRB needs to be mapped to respective QoS flow which is handled by the PDU session towards the data gateway in the 5G Core. In an embodiment, when the DRB is configured i.e. SCG DRB is created, the DRB to QoS flow mapping is included, then the UE 102 creates the SDAP later entity in the NR UP stack. If the DRB to QoS flow mapping is not included, then the UE 102 does not create the SDAP later entity in the NR UP stack. In another embodiment, when the DRB is configured i.e. SCG DRB is created, then explicit indication to create the SDAP layer entity in the NR UP stack is included in the DRB configuration.

In another scenario (scenario 3) for architecture option, 3x the LTE is Master node (MN) and the NR gNB 103 is secondary node or slave; SCG split bearer i.e. DRB having PDCP entity in SCG i.e. the NR gNB 103 and two RLC entities; one RLC entity in NR and another RLC entity in LTE: SDAP layer is not needed in UP stack of NR because the SCG split DRB is terminated as EPS bearer i.e. S1 bearer towards the SGW in EPC 106. For architecture Option 7x: LTE is master node (MN) and the NR gNB 103 is secondary node (SN) or slave; SCG split bearer i.e. DRB having PDCP entity in SCG i.e. NR gNB 103 and two RLC entities; one RLC entity in NR and another RLC entity in LTE: SDAP layer is needed in UP stack of NR. The same approaches mentioned above for scenario 2 can be reused in the third scenario.

For option 3a in an example, when the SCG bearer is created i.e. DRB handled by the NR gNB 103, the SDAP layer is not needed because the SCG DRB is terminated as the EPS bearer i.e. 51 bearer towards the SGW in the EPC 106. However, how to indicate that with QoS flow mapping in the NR RRC signalling needs to be defined. In an embodiment, absence of QoS flow to DRB mapping indicates that the SDAP entity is not created in the NR UP stack by the UE 102.

Even if the QoS flow mapping is present then such mapping is one-to-one mapping between the QoS flow and the DRB which implicitly means the DRB is mapped with EPS bearer (DRB-to-EPS bearer is one-to-one mapping) but there either needs the EPS bearer ID or the explicit indication.

For the SCG bearer configuration which can be done via direct SCG SRB, there is needed to indicate the EPS bearer ID even in the NR signalling. Presence or absence of EPS bearer ID or E-RAB can indicate whether to create the SDAP layer or not in NR UP stack.

All options are feasible including supporting the EPS bearer ID in the NR RRC signalling because the NAS is the LTE NAS for EN-DC. Further, the NR RRC and the LTE NAS need to inter-work. In RRC signalling for the NR, the option to include the EPS bearer ID in the DRB configuration. If present, no need to create the SDAP layer entity, otherwise create if not present. Anyway since LTE NAS will be modified to support the QoS flows the impacts should either be in the LTE NAS or the NR RRC and not at both protocol layers.

In the LTE RRC signalling, there is needed to make the EPS bearer ID optional whereas the Rel-14 LTE RRC signalling EPS bearer ID is mandatory.

Figure 13:
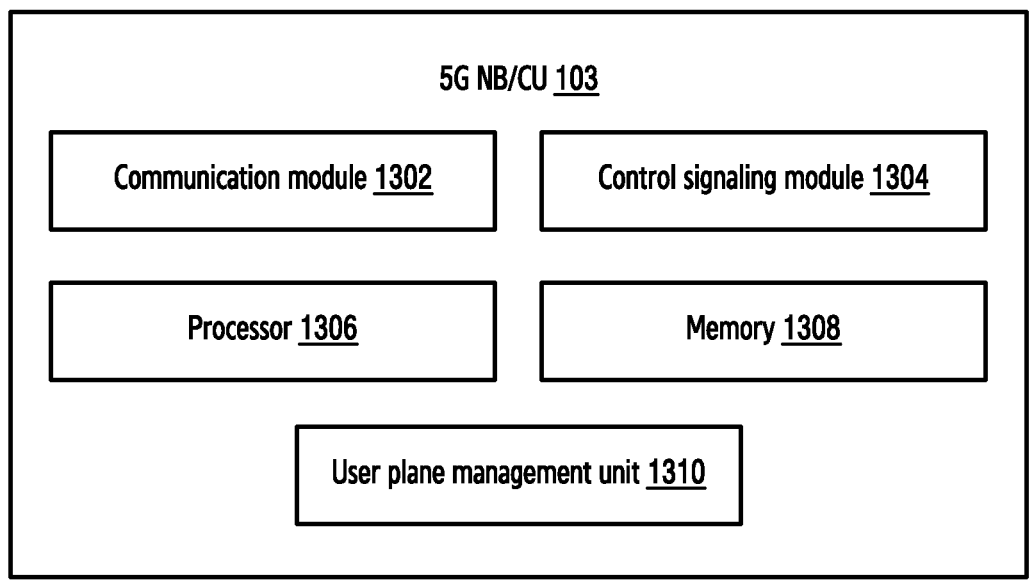
FIG. 13 illustrates various units of the gNodeB, according to an embodiment as disclosed herein.

FIG. 13 illustrates various modules of the gNodeB, according to an embodiment as disclosed herein. The primary blocks present in the gNodeB for communication with the UE 102 include a communication module 1302, a control signaling module 1304, a processor 1306, a memory 1308 and a user plane management unit 1310.

The 5G NB comprises the CU 103 and TRP/DU 105 implemented either is distributed manner or centralized manner. In an embodiment, the communication module 1302 is configured to broadcast synchronization signal i.e. PSS/SSS and beam index sequence and minimum system information on PBCH to the plurality of UEs 102. In an embodiment, the communication module 1302 is configured to perform the user plane operations corresponding to the PDCP, the RLC, the MAC and the PHY layers for transmission/reception to/from the plurality of UEs 102. In another embodiment, the communication module 1302 is configured to transmit one or more functional indications to the plurality of UEs 102. In an embodiment, the communication module 1302 is configured to communicate the RRC signaling to and from the UE 102.

For example, the wireless communication module in the CU 103 can be configured to communicate the TRP switch/change command to one or more UEs 102. Further, the communication module 1302 in the CU 103 can be configured to transmit and receive data from one or more UEs 102 according to physical layer waveform and coding for next generation wireless system.

Further, the control signaling module 1304 in the CU 103 can be configured to prepare the related RRC messages to be transmitted to the UE 102 and also can be configured to parse the related RRC message received from the UE 102. Further, the control signaling module 1304 in the CU 103 can be configured to determine the bearer to be transmitted over within respective cells 104 in the NB's. The bearer described herein can either be the DRB or a Signaling Radio Bearer (SRB). The selection of the bearer is based on several variables, which include for example, but are not limited to, Quality of Service requirements (QoS), traffic characteristics of the bearer, and load and coverage area of the serving cell of the NB.

The processor 1306 is configured to synchronize the operations and executes the instructions based on the timing signals generated by a clock chip. The processor 1306 is in communication with the communication module 1302, the control signaling module 1304, the memory 1308 and the user plane management unit 1310.

Further, the memory 1308 is also configured to store information related to operation of the 5G NB/CU 103 and the UE 102. The memory 1308 can be configured to store various UE related configurations when the UE 102 is in connected mode and the UE capabilities for one or more UEs 102 etc.

Further, the user plane management unit 1310 is responsible for various aspects like beam level mobility, TRP switching and cell level mobility etc. The user plane management unit 1310 in the CU 103 may be configured to evaluate the TRP switch and handover decisions based on the BRS measurement reports sent by one or more UEs 102. The CU 103 receives the measurement reports from one or more UEs 102 and decides to perform TRP switch and/or handover for that particular UE 102. Similarly, the user plane management unit 1310 in the CU 103 can be configured to receive the measurement reports for handling the TRP switching for one or more UEs 102.

The user plane management unit 1310 is configured to determine whether the anchor point in the network for the PDCP entity associated with the at least one data radio bearer established for the UE 102 is changed. Further, the user plane management unit 1310 is configured to transmit the signaling message including the control information to the UE 102. The control information includes one of the PDCP re-establish indication and the security key change indication if the anchor point in the network for the PDCP entity associated with the at least one data radio bearer established for the UE 102 is changed.

Although the FIG. 13 shows the hardware components of the gNodeB but it is to be understood that other embodiments are not limited thereon. In other embodiments, the gNodeB may include less or more number of components. Further, the labels or names of the components are used only for illustrative purpose and does not limit the scope of the invention. One or more components can be combined together to perform same or substantially similar function to manage the user plane operation in the wireless communication system 100.

Figure 14:
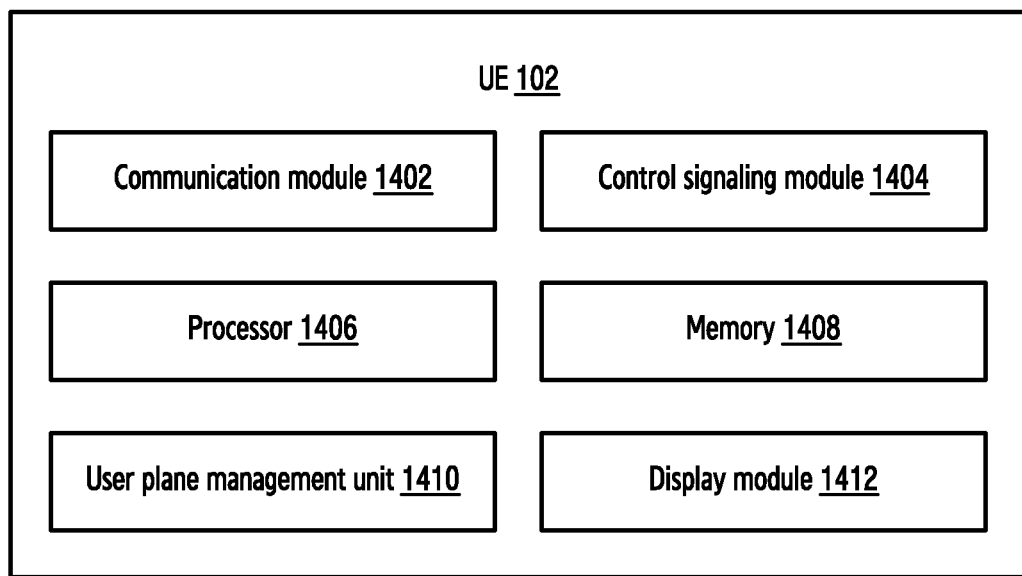
FIG. 14 illustrates various units of the UE, according to an embodiment as disclosed herein.

FIG. 14 illustrates various units in the UE 102, according to an embodiment as disclosed herein. The UE 102 includes a communication module 1402, a control signaling module 1404, a processor 1406, a memory 1408, a user plane management unit 1410 and a display module 1412. The processor 1406 is in communication with the communication module 1402, the control signaling module 1404, the memory module 1308, the user plane management unit 1410 and the display module 1412.

In an embodiment, the communication module 1402 is configured to decode the synchronization signal, the beam index sequence, and the minimum system information broadcasted on the PBCH by the 5G NB 103. In an embodiment, the communication module 1402 is configured to receive one or more functional indications from the. In yet another embodiment, the communication module 1402 is configured to receive the TRP switch/change command transmitted by the 5G NB 103. In an embodiment, the communication module 1402 is configured to communicate the RRC signaling to and from the 5G NB 103.

In an example, the wireless communication module 1402 in the UE 102 can be configured to communicate to transmit the measurement report or the RRC re-establishment request message to the 5G NB 103 and receive the TRP switch/change command or RRC re-establishment message from the 5G eNB 103. Further, the communication module 1402 in the UE 102 can perform random access procedure on the TRP/cell of the next generation RAT served by the 5G NB 103.

Further, the communication module 1402 in the UE 102 can be configured to transmit and receive data from the 5G NB 103 according to the physical layer waveform and coding assumed for next generation wireless system 100. The control signaling module 1404 in the UE 102 can be configured to prepare the related RRC messages to be transmitted to the 5G NB 103 and also can be configured to parse the related RRC message received from the 5G NB 103.

The memory 1408 is also configured to store information related to UE 102 operation. The memory 1408 can be configured to store various configurations like minimum system configuration received in the MIB, measurement configuration, etc. received from the 5G NB 103. The user plane management unit 1410 in the UE 102 is responsible for various aspects like TRP switching, cell level mobility and beam level mobility etc. The user plane management unit 1410 in the UE 102 may be configured to evaluate the TRP switching criteria, handover events based on the BRS measurements and perform CSI-RS RSRP measurements respectively.

The user plane management unit 1410 is configured to receive the signaling message from the gNodeB. Further, the user plane management unit 1410 is configured to determine whether the signaling message includes the control information comprising one of the PDCP re-establish indication and the security key change indication. Further, the user plane management unit 1410 is configured to perform the at least one operation for the at least one data radio bearer if the UE 102 determines that signaling message includes one of the PDCP re-establish indication and the security key change indication.

The display module 1412 in the UE 102 can be configured so that user can input information or information can output on the display for the user to understand some UE operations when the UE 102 is operating in the dual connectivity mode of operation. Most of the UE operations are transparent to the user and may not need user input or output on the display.

Although the FIG. 14 shows the hardware components of the UE 110 but it is to be understood that other embodiments are not limited thereon. In other embodiments, the UE 110 may include less or more number of components. Further, the labels or names of the components are used only for illustrative purpose and does not limit the scope of the invention. One or more components can be combined together to perform same or substantially similar function to manage the user plane operation in the wireless communication system 100.

The various actions, acts, blocks, steps, or the like in the flow diagrams may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein can be implemented using at least one software program running on at least one hardware device and performing network management functions to control the elements. The elements shown in the FIGS. 1A through 14 include blocks which can be at least one of a hardware device, or a combination of hardware device and software module.

The architecture options shown in the FIGS. 2A to 2E include various units, blocks, modules, or steps described in relation with methods, processes, algorithms, or systems of the present disclosure, which can be implemented using any general purpose processor and any combination of programming language, application, and embedded processor.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, the method comprising:
   receiving, from a base station, a message associated with a data radio bearer (DRB);
   identifying whether the message includes a packet data convergence protocol (PDCP) data recovery indicator;
   if the message includes the PDCP data recovery indicator, performing a PDCP data recovery for the DRB; and
   if the message does not include the PDCP data recovery indicator, not performing the PDCP data recovery for the DRB.

2. The method of claim 1, wherein the DRB is an acknowledge mode (AM) DRB.

3. The method of claim 1, wherein the PDCP data recovery comprises a retransmission of at least one PDCP data protocol data unit (PDU) for the DRB.

4. The method of claim 3, wherein the at least one PDCP data PDU includes at least one PDCP data PDU previously submitted to re-established AM radio link control (RLC) entity.

5. The method of claim 1, further comprising:
identifying whether the message includes a PDCP re-establish indicator associated with a PDCP re-establish;
if the message includes the PDCP re-establish indicator, performing a PDCP re-establishment; and
if the message does not include the PDCP re-establish indicator, not performing the PDCP re-establishment.

6. The method of claim 1, further comprising:
identifying whether the message includes a radio link control (RLC) re-establish indicator associated with an RLC re-establish; and
if the message includes the RLC re-establish indicator, performing an RLC re-establishment.

7. A method performed by a base station in a wireless communication system, the method comprising:
identifying whether a packet data convergence protocol (PDCP) data recovery for a data radio bearer (DRB);
transmitting, to a user equipment (UE), a message including a packet data convergence protocol (PDCP) data recovery indicator for requesting the UE to perform the PDCP data recovery; and
transmitting, to the UE, a message without the PDCP data recovery indicator, if the PDCP data recovery is not triggered.

8. The method of claim 7, wherein the DRB is an acknowledge mode (AM) DRB.

9. The method of claim 7, wherein the PDCP data recovery comprises a retransmission of at least one PDCP data protocol data unit (PDU) for the DRB.

10. The method of claim 9, wherein the at least one PDCP data PDU includes at least one PDCP data PDU previously submitted to re-established AM radio link control (RLC) entity.

11. The method of claim 7, further comprising:
identifying whether a PDCP re-establishment is triggered or not;
transmitting, to the UE, a message including a PDCP re-establish indicator in order to request the UE to perform the PDCP re-establishment if the PDCP re-establishment is triggered; and
transmitting, to the UE, a message without the PDCP re-establish indicator, if the PDCP re-establishment is not triggered.

12. The method of claim 7, further comprising:
identifying whether a radio link control (RLC) re-establishment is triggered or not;
transmitting, to the UE, a message including an RLC re-establish indicator in order to request the UE to perform the RLC re-establishment if the RLC re-establishment is triggered; and
transmitting, to the UE, a message without the RLC re-establish indicator, if the RLC re-establishment is not triggered.

13. A user equipment (UE) in a wireless communication system, the UE comprising:
a transceiver; and
at least one processor coupled to the transceiver and configured to:
receive, from a base station, a message associated with a data radio bearer (DRB),
identify whether the message includes a packet data convergence protocol (PDCP) data recovery indicator,
if the message includes the PDCP data recovery indicator, perform a packet data convergence protocol (PDCP) data recovery for the DRB, and
if the message does not include the PDCP data recovery indicator, not perform the PDCP data recovery.

14. The UE of claim 13, wherein the DRB is an acknowledge mode (AM) DRB.

15. The UE of claim 13, wherein the PDCP data recovery comprises a retransmission of at least one PDCP data protocol data unit (PDU) for the DRB.

16. The UE of claim 15, wherein the at least one PDCP data PDU includes at least one PDCP data PDU previously submitted to re-established AM radio link control (RLC) entity.

17. The UE of claim 13, wherein the at least one processor is further configured to:
identify whether the message includes a PDCP re-establish indicator associated with a PDCP re-establish;
if the message includes the PDCP re-establish indicator, perform a PDCP re-establishment; and
if the message does not include the PDCP re-establish indicator, not perform the PDCP re-establishment.

18. The UE of claim 13, wherein the at least one processor is further configured to:
identify whether the message includes a radio link control (RLC) re-establish indicator associated with an RLC re-establish; and
if the message includes the RLC re-establish indicator, perform an RLC re-establishment.

19. A base station in a wireless communication system, the base station comprising:
a transceiver; and
at least one processor coupled to the transceiver and configured to:
identify whether a packet data convergence protocol (PDCP) data recovery for a data radio bearer (DRB),
transmit, to a user equipment (UE), a message including a packet data convergence protocol (PDCP) data recovery indicator for requesting the UE to perform the PDCP data recovery, and
transmit, to the UE, a message without the PDCP data recovery indicator, if the PDCP data recovery is not triggered.

20. The base station of claim 19, wherein the DRB is an acknowledge mode (AM) DRB.

21. The base station of claim 19, wherein the PDCP data recovery comprises a retransmission of at least one PDCP data protocol data unit (PDU) for the DRB.

22. The base station of claim 19, wherein the at least one PDCP data PDU includes at least one PDCP data PDU previously submitted to re-established AM radio link control (RLC) entity.

23. The base station of claim 19, wherein the at least one processor further configured to:
identify whether a PDCP re-establishment is triggered or not;
transmit, to the UE, a message including a PDCP re-establish indicator in order to request the UE to perform the PDCP re-establishment if the PDCP re-establishment is triggered; and transmit, to the UE, a message without the PDCP re-establish indicator, if the PDCP re-establishment is not triggered.

24. The base station of claim 19, wherein the at least one processor further configured to:
identify whether a radio link control (RLC) re-establishment is triggered or not;
transmit, to the UE, a message including an RLC re-establish indicator in order to request the UE to perform the RLC re-establishment if the RLC re-establishment is triggered; and
transmit, to the UE, a message without the RLC re-establish indicator, if the RLC re-establishment is not triggered.

* * * * *